（12) United States Patent
Tohi et al.

(10) Patent No.: US 6,369,177 B1
(45) Date of Patent: Apr. 9, 2002

(54) CATALYST FOR OLEFIN POLYMERIZATION AND METHOD OF POLYMERIZING OLEFIN

(75) Inventors: Yasushi Tohi; Shigekazu Matsui; Terunori Fujita, all of Yamaguchi (JP)

(73) Assignee: Mitsui Chemicals Inc, Tokyo (JP)

( * ) Notice: Subject to any disclaimer, the term of this patent is extended or adjusted under 35 U.S.C. 154(b) by 0 days.

(21) Appl. No.: 09/485,792

(22) PCT Filed: Jun. 16, 1999

(86) PCT No.: PCT/JP99/03205

§ 371 Date: Feb. 15, 2000

§ 102(e) Date: Feb. 15, 2000

(87) PCT Pub. No.: WO99/65951

PCT Pub. Date: Dec. 23, 1999

(30) Foreign Application Priority Data

Jun. 16, 1998 (JP) .............................. 10-169047

(51) Int. Cl.$^7$ .............................. C08F 4/44; B01J 31/22

(52) U.S. Cl. ................. 526/172; 526/352; 502/155

(58) Field of Search ................ 526/172, 161; 502/155

(56) References Cited

U.S. PATENT DOCUMENTS 5,955,555 A * 9/1999 Bennett ....................... 526/133
6,150,482 A * 11/2000 Brookhart et al. .......... 526/161

\* cited by examiner

*Primary Examiner*—David W. Wu
*Assistant Examiner*—R. Harlan

(57) ABSTRACT

The present invention is intended to provide an olefin polymerization catalyst exhibiting excellent olefin polymerization activity and capable of producing polyolefins of excellent properties and to provide a process for olefin polymerization using this catalyst. The olefin polymerization catalyst comprises a transition metal imine compound (A) represented by the following formula (I-a) or (I-b) and at least one compound (B) selected from an organometallic compound (B-1), an organoaluminum oxy-compound (B-2) and a compound (B-3) which reacts with the transition metal imine compound (A) to form an ion pair;

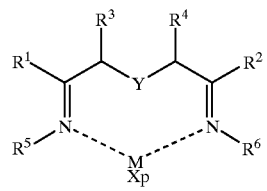

(I-a)

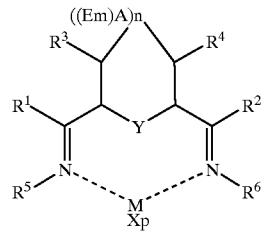

(I-b)

wherein M is a transition metal atom of Group 8 to Group 11 of the periodic table; $R^1$ to $R^4$ are each a hydrogen atom, a hydrocarbon group or the like; $R^5$ and $R^6$ are each a hydrocarbon group or the like; $R^1$ and $R^5$, $R^2$ and $R^6$, $R^1$ and $R^3$, or $R^2$ and $R^4$ may be bonded to each other to form a ring; m is an integer of 0 to 2; n is 0 or 2; A is an atom of Group 13 to Group 16 of the periodic table; E is a substituent group having carbon or the like; p is a number satisfying a valence of M; X is a halogen atom or the like; and Y is an atom of Group 15 of the periodic table.

10 Claims, 1 Drawing Sheet

Fig. 1

Transition metal component

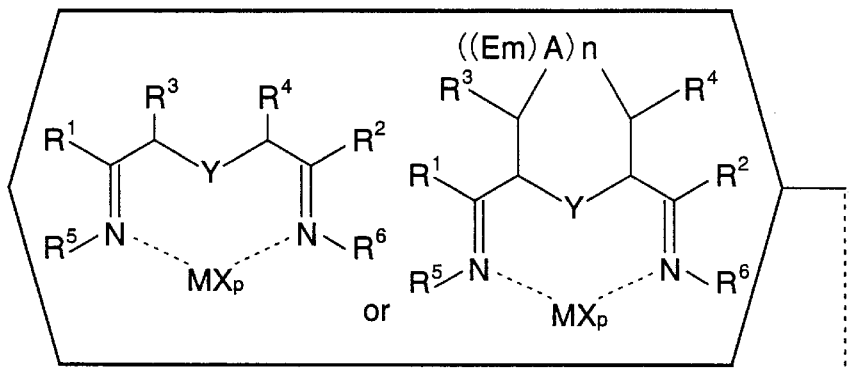

M : Transition metal atom of Groups 8−11 of the periodic table
$R^1 - R^4$ : Hydrogen atom, hydrocarbon group or the like
$R^5, R^6$ : Hydrocarbon group or the like
Y : Atom of Group 15 of the periodic table
A : Atom of Groups 13−16 of the periodic table
E : Substituent group having carbon or the like
p : Number satisfying a valence of M
X : Halogen atom or the like
m : Integer of 0−2    n : 0 or 2

Organometallic component ( Organometallic compound ) ---------- Olefin ( Organoaluminum oxy-compound ) ----------

( Ionizing ionic compound ) ----------

The third component
    ( Particulate carrier ) ----------

CATALYST FOR OLEFIN POLYMERIZATION AND METHOD OF POLYMERIZING OLEFIN

TECHNICAL FIELD

The present invention relates to a novel olefin polymerization catalyst and a process for olefin polymerization using the olefin polymerization catalyst.

BACKGROUND ART

"Kaminsky catalysts" are well known as olefin polymerization catalysts. The Kaminsky catalysts exhibit extremely high polymerization activity, and by the use of them, polymers of narrow molecular weight distribution can be obtained.

Transition metal compounds known as employable for the Kaminsky catalysts are, for example, bis(cyclopentadienyl) zirconium dichloride (see Japanese Patent Laid-Open Publication No. 19309/1983) and ethylenebis(4,5,6,7-tetrahydroindenyl)zirconium dichloride (see Japanese Patent Laid-Open Publication No. 130314/1986). It is also known that the olefin polymerization activity and the properties of the resulting polyolefins greatly vary when different transition metal compounds are used in the polymerization.

Recently, an olefin polymerization catalyst comprising a titanium amide compound having a titanium-nitrogen bond and an aluminoxane has been proposed as a novel olefin polymerization catalyst in, for example, Japanese Patent Laid-Open Publication No. 245713/1996.

Further, an organometallic complex having a metal of Group 4 of the periodic table, which contains a bis (borylamido) ligand represented by $(Mes_2BNCH_2CH_2NBMes_2)^{-2}$, is described in "Organometallics", 1996, 15, 562-569. It is also described that this complex slightly exhibits ethylene polymerization activity.

By the way, polyolefins generally have excellent mechanical properties, so that they are used in many fields such as fields of various molded products. With the diversification of requirements for the properties of the polyolefins, polyolefins of various properties have been desired in recent years. Moreover, increase of productivity has been also desired.

Under such circumstances as mentioned above, there has been desired development of olefin polymerization catalysts exhibiting excellent olefin polymerization activity and capable of producing polyolefins of excellent properties.

DISCLOSURE OF THE INVENTION

The olefin polymerization catalyst according to the invention comprises:

(A) a transition metal imine compound represented by the following formula (1-a) or (I-b), and (B) at least one compound selected from:
(B-1) an organometallic compound,
(B-2) an organoaluminum oxy-compound, and
(B-3) a compound which reacts with the transition metal imine compound (A) to form an ion pair;

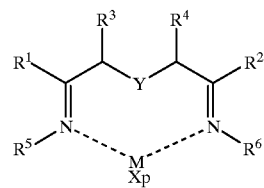
(I-a)

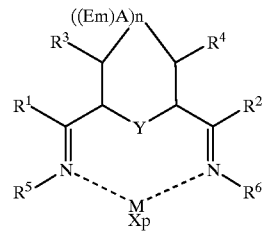
(I-b)

wherein M is a transition metal atom of Group 8 to Group 11 of the periodic table,.

$R^1$ to $R^4$ may be the same or different and are each a hydrogen atom, a halogen atom, a halogenated hydrocarbon group, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group, a tin-containing group or the like, $R^5$ and $R^6$ may be the same or different and are each a halogen atom, a halogenated hydrocarbon group, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group, a tin-containing group or the like, $R^1$ and $R^5$ may be bonded to each other to form a ring, $R^2$ and $R^6$ may be bonded to each other to form a ring, $R^1$ and $R^3$ may be bonded to each other to form a ring, and $R^2$ and $R^4$ may be bonded to each other to form a ring, m is an integer of 0 to 2, n is an integer of 0 or 2, each A may be the same or different and is an atom of Group 13 to Group 16 of the periodic table, E is a substituent group having at least one element selected from carbon, hydrogen, oxygen, halogen, nitrogen, sulfur, phosphorus, boron and silicon, and when plural groups indicated by E are present, they may be the same or different, and two or more groups indicated by E may be bonded to each other to form a ring, p is a number satisfying a valence of M, X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or the like, and when n is 2 or greater, plural groups indicated by X may be the same or different, and Y is an atom of Group 15 of the periodic table.

A preferred example of the transition metal imine compound represented by the formula (I-a) or (I-b) is a transition metal imine compound represented by the following formula (II-a) or (II-b):

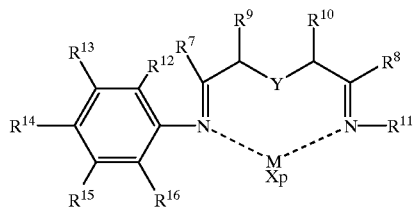

(II-a)

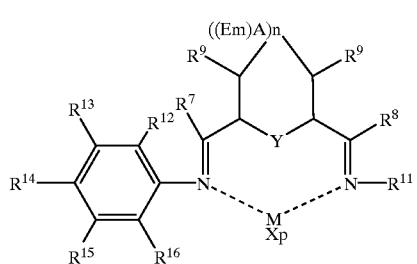

(II-b)

wherein M is a transition metal atom of Group 8 to Group 11 of the periodic table,

- $R^7$ to $R^{10}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonate ester group, a sulfonamido group, a cyano group, a nitro group, a carboxyl group, a sulfonyl group, a mercapto group, a hydroxyl group or the like,

- each $R^{11}$ may be the same or different and is a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonate ester group, a sulfonamido group, a cyano group, a nitro group, a carboxyl group, a sulfonyl group, a mercapto group, a hydroxyl group or the like,

- $R^7$ and $R^9$ may be bonded to each other to form a ring, $R^8$ and $R^{10}$ may be bonded to each other to form a ring, and $R^8$ and $R^{10}$ may be bonded to each other to form a ring,

- $R^{12}$ to $R^{16}$ may be the same or different, they are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonate ester group, a sulfonamido group, a cyano group, a nitro group, a carboxyl group, a sulfonyl group, a mercapto group, a hydroxyl group or the like, at least one of $R^{12}$ to $R^{16}$ is a group other than a hydrogen atom, and two or more of the groups indicated by $R^{12}$ to $R^{16}$ may be bonded to each other to form a ring,

- m is an integer of 0 to 2,
- n is an integer of 0 or 2,
- each A may be the same or different and is an atom of Group 13 to Group 16 of the periodic table,
- E is a substituent group having at least one element selected from carbon, hydrogen, oxygen, halogen, nitrogen, sulfur, phosphorus, boron and silicon, and when plural groups indicated by E are present, they may be the same or different, and two or more groups indicated by E may be bonded to each other to form a ring,
- p is a number satisfying a valence of M,
- X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or the like, and when n is 2 or greater, plural groups indicated by X may be the same or different, and
- Y is an atom of Group 15 of the periodic table.

Another preferred example of the transition metal imine compound represented by the formula (I-a) or (I-b) is a transition metal imine compound represented by the following formula (III-a) or (III-b):

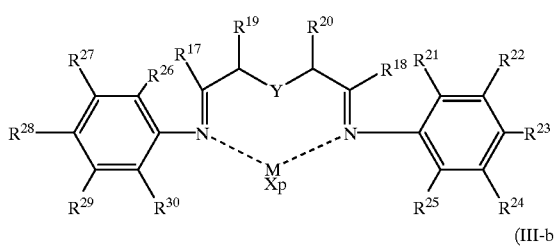

(III-a)

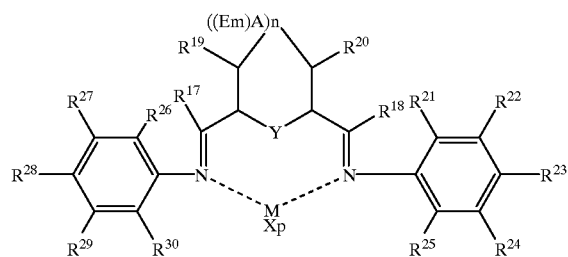

(III-b)

wherein M is a transition metal atom of Group 8 to Group 11 of the periodic table,

- $R^{17}$ to $R^{20}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonate ester group, a sulfonamido group, a cyano group, a nitro group, a carboxyl group, a sulfonyl group, a mercapto group, a hydroxyl group or the like,

- $R^{17}$ and $R^{19}$ may be bonded to each other to form a ring, and $R^{18}$ and $R^{20}$ may be bonded to each other to form a ring,

- $R^{21}$ to $R^{30}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonate ester group, a sulfonamido group, a cyano group, a nitro group, a carboxyl group, a sulfonyl group, a mercapto group, a hydroxyl group or the like, at least one of $R^{21}$ to $R^{25}$ is a group other than a hydrogen atom, at least one of $R^{26}$ to $R^{30}$ is a group other than a hydrogen atom, two or more of the groups indicated by $R^{21}$ to $R^{25}$ may be bonded to each other to form a ring, and two or more of the groups indicated by $R^{26}$ to $R^{30}$ may be bonded to each other to form a ring, m is an integer of 0 to 2, n is an integer of 0 or 2, each A may be the same or different and is an atom of Group 13 to Group 16 of the periodic table, E is a substituent group having at least one element selected from carbon, hydrogen, oxygen, halogen, nitrogen, sulfur, phosphorus, boron and silicon, and when plural groups indicated by E are present, they may be the same or different, and two or more groups indicated by E may be bonded to each other to form a ring, p is a number satisfying a valence of M, X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or the like, and when n is 2 or greater, plural groups indicated by X may be the same or different, and Y is an atom of Group 15 of the periodic table.

The process for olefin polymerization according to the invention comprises polymerizing or copolymerizing an olefin in the presence of the above-mentioned olefin polymerization catalyst.

BRIEF DESCRIPTION OF THE DRAWING

FIG. 1 is an explanatory view showing steps for preparing the olefin polymerization catalyst according to the invention.

BEST MODE FOR CARRYING OUT THE INVENTION

The olefin polymerization catalyst according to the invention and the process for olefin polymerization using this catalyst are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The olefin polymerization catalyst according to the invention comprises:

(A) a transition metal imine compound, and (B) at least one compound selected from:

(B-1) an organometallic compound, (B-2) an organoaluminum oxy-compound, and (B-3) a compound which reacts with the transition metal imine compound (A) to form an ion pair.

First, the components of the olefin polymerization catalyst of the invention are described.

(A) Transition Metal Imine Compound

The transition metal imine compound (A) for use in the invention is a compound represented by the following formula (I-a) or (I-b).

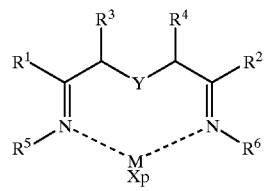

(I-a)

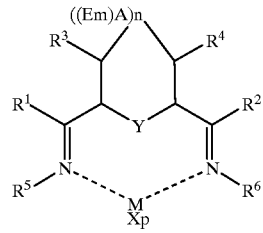

(I-b)

In the above formulas, M is a transition metal atom of Group 8 to Group 11 of the periodic table, preferably a transition metal atom of Group 8 and Group 9 of the periodic table such as iron, ruthenium, osmium, cobalt, rhodium or iridium, particularly preferably iron or cobalt.

$R^1$ to $R^4$ may be the same or different and are each a hydrogen atom, a halogen atom, a hydrocarbon group, a halogenated hydrocarbon group, a heterocyclic compound residual group, an oxygen-containing group, a nitrogen-containing group, a boron-containing group, a sulfur-containing group, a phosphorus-containing group, a silicon-containing group, a germanium-containing group, a tin-containing group or the like.

The halogen atom is fluorine, chlorine, bromine or iodine.

Examples of the hydrocarbon groups include straight-chain or branched alkyl groups of 1 to 20 carbon atoms, such as methyl, ethyl, n-propyl, isopropyl, n-butyl, isobutyl, sec-butyl, tert-butyl, pentyl and hexyl; aryl groups of 6 to 20 carbon atoms, such as phenyl, naphthyl and anthryl; substituted aryl groups wherein these aryl groups are substituted with 1 to 5 substituent groups such as the above alkyl groups of 1 to 20 carbon atoms; cycloalkyl groups, such as cyclopentyl, cyclohexyl, norbornyl and adamantyl; alkenyl groups, such as vinyl, propenyl and cyclohexenyl; and arylalkyl groups, such as benzyl, phenylethyl and phenylpropyl, without limiting thereto.

Examples of the halogenated hydrocarbon groups include groups wherein the above hydrocarbon groups are substituted with halogens, without limiting thereto.

Examples of the heterocyclic compound residual groups include a nitrogen-containing heterocyclic ring, an oxygen-containing heterocyclic ring and a sulfur-containing heterocyclic ring, without limiting thereto.

Examples of the oxygen-containing groups include an alkoxy group, an aryloxy group, an ester group, an ether group, an acyl group, a carboxyl group, a carbonate group, a hydroxyl group, a peroxy group and an acid anhydride group, without limiting thereto.

Examples of the nitrogen-containing groups include an amino group, an imino group, an amido group, an imido group, a hydrazino group, a hydrazono group, a nitro group, a nitroso group, a cyano group, an isocyano group, a cyanate ester group, an amidino group, a diazo group and ammonium salts, without limiting thereto.

Examples of the boron-containing groups include a boranediyl group, a boranetriyl group and a diboranyl group, without limiting thereto.

Examples of the sulfur-containing groups include a mercapto group, a thioester group, a dithioester group, an alkylthio group, an arylthio group, a thioacyl group, a thioether group, a thiocyanate ester group, an isothiocyanate ester group, a sulfonic acid ester group, a sulfonamido group, a thiocarboxyl group, a dithiocarboxyl group, a sulfo group, a sulfonyl group, a sulfinyl group and a sulfenyl group, without limiting thereto.

Examples of the phosphorus-containing groups include a phosphido group, a phosphoryl group, a thiophosphoryl group and a phosphato group, without limiting thereto.

Examples of the silicon-containing groups include a hydrocarbon-substituted silyl group, a silyl ether group of hydrocarbon-substituted silyl, a silicon-substituted alkyl group and a silicon-substituted aryl group, without limiting thereto.

Examples of the germanium-containing groups include a hydrocarbon-substituted germyl group, a germyl ether group of hydrocarbon-substituted germyl, a germanium-substituted alkyl group and a germanium-substituted aryl group, without limiting thereto.

Examples of the tin-containing groups include a hydrocarbon-substituted stannyl group, a stannyl ether group of hydrocarbon-substituted stannyl, a tin-substituted alkyl group and a tin-substituted aryl group, without limiting thereto.

$R^1$ and $R^5$, $R^2$ and $R^6$, $R^1$ and $R^3$, or $R^2$ and $R^4$ may be bonded to each other to form an aromatic ring, an aliphatic ring or a hydrocarbon ring containing a hetero atom such as a nitrogen atom, a sulfur atom or an oxygen atom. These rings may further have a substituent group.

m is an integer of 0 to 2.

n is an integer of 0 or 2.

Each A may be the same or different and is an atom of Group 13 to Group 16 of the periodic table, specifically a boron atom, a carbon atom, a nitrogen atom, an oxygen atom, a silicon atom, a phosphorus atom, a sulfur atom, a germanium atom, a selenium atom, a tin atom or the like.

E is a substituent group having at least one element selected from carbon, hydrogen, oxygen, halogen, nitrogen, sulfur, phosphorus, boron and silicon. When plural groups indicated by E are present, they may be the same or different, and two or more groups indicated by E may be bonded to each other to form a ring.

p is a number satisfying a valence of M, specifically an integer of 1 to 8, preferably an integer of 1 to 5, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. When n is 2 or greater, plural groups indicated by X may be the same or different.

The halogen atom is fluorine, chlorine, bromine or iodine.

Examples of the hydrocarbon groups of 1 to 20 carbon atoms include alkyl groups, cycloalkyl groups, alkenyl groups, arylalkyl groups and aryl groups. Specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl.

Examples of the halogenated hydrocarbon groups of 1 to 20 carbon atoms include groups wherein the above hydrocarbon groups of 1 to 20 carbon atoms are substituted with halogens.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituent groups wherein oxygen is replaced with sulfur in the above oxygen-containing groups; sulfonic acid ester groups, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfonic acid ester groups, such as methylsulfinate, phenylsulfinate, benzylsulfinate, p-toluenesulfinate, trimethylbenzenesulfinate and pentafluorobenzenesulfinate.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Of the above atoms and groups, preferable are halogen atoms, hydrocarbon groups of 1 to 20 carbon atoms and sulfonic acid ester groups.

Y is an atom of Group 15 of the periodic table, specifically a nitrogen atom, a phosphorus atom, an arsenic atom, an antimony atom or the like, preferably a nitrogen atom or a phosphorus atom, more preferably a nitrogen atom. To such an atom is sometimes bonded to hydrogen, a hydrocarbon group or the like. Further, such an atom is sometimes bonded to the transition metal atom indicated by M.

A preferred example of the transition metal imine compound represented by the formula (I-a) or (I-b) for use in the invention is a transition metal imine compound represented by the following formula (II-a) or (II-b).

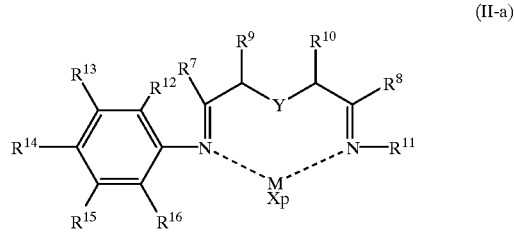

(II-a)

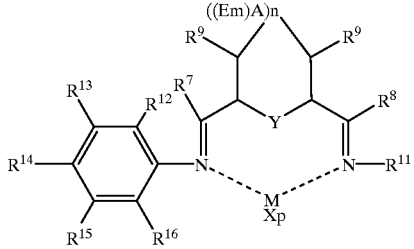

(II-b)

In the above formulas, M is a transition metal atom of Group 8 to Group 11 of the periodic table, preferably a transition metal atom of Group 8 and Group 9 of the periodic table such as iron, ruthenium, osmium, cobalt, rhodium or iridium, particularly preferably iron or cobalt.

$R^7$ to $R^{10}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group, a hydroxyl group or the like.

The halogen atom is fluorine, chlorine, bromine or iodine.

Examples of the hydrocarbon groups include straight-chain or branched alkyls of 1 to 20 carbon atoms, such as methyl, ethyl, n-propyl, isopropyl, n-butyl, isobutyl, sec-butyl, tert-butyl, pentyl and hexyl; straight-chain or branched alkynyls of 2 to 20 carbon atoms, such as vinyl, allyl and isopropenyl; straight-chain or branched alkynes of 2 to 20 carbon atoms, such as propargyl; cyclic hydrocarbons of 3 to 20 carbon atoms, such as. cyclopropanyl, cyclobutanyl, cyclopentanyl, cyclohexyl and adamantyl; aryl groups of 6 to 20 carbon atoms, such as phenyl, naphthyl, cyclopentadienyl and indenyl; and substituted aryl groups wherein these aryl groups are substituted with 1 to 5 substituent groups such as the aforesaid alkyl groups of 1 to 20 carbon atoms, aryl groups of 6 to 20 carbon atoms, alkoxy groups and aryloxy groups.

Examples of the halogenated hydrocarbon groups include groups wherein the above hydrocarbon groups are substituted with halogens Examples of the heterocyclic compound residual groups include nitrogen-containing heterocyclic rings, such as pyridine, pyrimidine and quinoline; oxygen-containing heterocyclic rings, such as furan and pyran; and sulfur-containing heterocyclic rings, such as thiophene. These rings may have a substituent group containing a hetero atom.

Examples of the hydrocarbon-substituted silyl groups include methylsilyl, dimethylsilyl, trimethylsilyl, ethylsilyl, diethylsilyl, triethylsilyl, diphenylmethylsilyl and triphenylsilyl.

Examples of the hydrocarbon-substituted siloxy groups include trimethylsiloxy.

Examples of the alkoxy groups include methoxy, ethoxy, n-propoxy, isopropoxy, n-butoxy, isobutoxy and tert-butoxy.

Examples of the alkylthio groups include thiomethyl and thioethyl.

Examples of the aryloxy groups include phenoxy, 2,6-dimethylphenoxy and 2,4,6-trimethylphenoxy.

Examples of the arylthio groups include thiophenyl, methylthiophenyl and thionaphthyl.

Examples of the acyl groups include formyl, benzoyl, p-chlorobenzoyl and p-methoxybenzoyl.

Examples of the ester groups include acetyloxy, benzoyloxy, methoxycarbonyl, phenoxycarbonyl and p-chlorophenoxycarbonyl.

Examples of the thioester groups include thioacetyl, thiobenzoyl, thiomethoxycarbonyl and thiophenoxycarbonyl.

Examples of the amido groups include acetamido, N-methylacetamido and N-methylbenzamido.

Examples of the imido groups include acetimido and benzimido.

Examples of the amino groups include dimethylamino, ethylmethylamino and diphenylamino.

Examples of the imino groups include methylimino, ethylimino, propylimino, butylimino and phenylimino.

Examples of the sulfonic acid ester groups include methylsulfonate, ethylsulfonate and phenylsulfonate.

Examples of the sulfonamido groups include phenylsulfonamido, N-methylsulfonamido and N-methyl-p-toluenesulfonamido.

Each $R^{11}$ may be the same or different and is a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group, a hydroxyl group or the like.

The halogen atom is fluorine, chlorine, bromine or iodine.

Examples of the hydrocarbon groups include the same groups as previously described with respect to $R^7$ to $R^{10}$. More specifically, there can be mentioned straight-chain or branched alkyls of 1 to 20 carbon atoms, such as methyl, ethyl, n-propyl, isopropyl, n-butyl, isobutyl, sec-butyl, tert-butyl, pentyl and hexyl; straight-chain or branched alkenyls of 2 to 20 carbon atoms, such as vinyl, allyl and isopropenyl; straight-chain or branched alkynyls or 2 to 20 carbon atoms, such as propargyl; cyclic hydrocarbons of 3 to 20 carbon atoms, such as cyclopropanyl, cyclobutanyl, cyclopentanyl, cyclohexyl and adamantyl; aryl group of 6 to 20 carbon atoms, such as phenyl, naphthyl, cyclopentadienyl and indenyl; and substituted aryl groups wherein these aryl groups are substituted with 1 to 5 substituent groups such as the aforesaid alkyl groups of 1 to 20 carbon atoms, aryl groups of 6 to 20 carbon atoms, alkoxy groups and aryloxy groups.

Examples of the halogenated hydrocarbon groups include the same groups as previously described with respect to $R^7$ to $R^{10}$. More specifically, there can be mentioned groups wherein the above hydrocarbon groups are substituted with halogens.

Examples of the heterocyclic compound residual groups include the same groups as previously described with respect to $R^7$ to $R^{10}$. More specifically, there can be mentioned nitrogen-containing heterocyclic rings, such as pyridine, pyrimidine and quinoline; oxygen-containing heterocyclic rings, such as furan and pyran; and sulfur-containing heterocyclic rings, such as thiophene. These rings may have a substituent group containing a hetero atom.

Examples of the hydrocarbon-substituted silyl groups include the same groups as previously described with respect to $R^7$ to $R^{10}$. More specifically, there can be mentioned methylsilyl, dimethylsilyl, trimethylsilyl, ethylsilyl, diethylsilyl, triethylsilyl, diphenylmethylsilyl and triphenylsilyl.

Examples of the hydrocarbon-substituted siloxy groups include the same groups as previously described with respect to $R^7$ to $R^{10}$. More specifically, there can be mentioned trimethylsiloxy.

Examples of the alkoxy groups include the same groups as previously described with respect to $R^7$ to $R^{10}$. More specifically, there can be mentioned methoxy, ethoxy, n-propoxy, isopropoxy, n-butoxy, isobutoxy and tert-butoxy.

Examples of the alkylthio groups include the same groups as previously described with respect to $R^7$ to $R^{10}$. More specifically, there can be mentioned thiomethyl and thioethyl.

Examples of the aryloxy groups include the same groups as previously described with respect to $R^7$ to $R^{10}$. More specifically, there can be mentioned phenoxy, 2,6-dimethylphenoxy and 2,4,6-trimethylphenoxy.

Examples of the arylthio groups include the same groups as previously described with respect to $R^7$ to $R^{10}$. More specifically, there can be mentioned thiophenyl, methylthiophenyl and thionaphthyl.

Examples of the acyl groups include the same groups as previously described with respect to $R^1$ to $R^{10}$. More specifically, there can be mentioned formyl, benzoyl, p-chlorobenzoyl and p-methoxybenzoyl.

Examples of the ester groups include the same groups as previously described with respect to $R^7$ to $R^{10}$. More specifically, there can be mentioned acetyloxy, benzoyloxy, methoxycarbonyl, phenoxycarbonyl and p-chlorophenoxycarbonyl.

Examples of the thioester groups include the same groups as previously described with respect to $R^7$ to $R^{10}$. More specifically, there can be mentioned thioacetyl, thiobenzoyl, thiomethoxycarbonyl and thiophenoxycarbonyl.

Examples of the amido groups include the same groups as previously described with respect to $R^7$ to $R^{10}$. More specifically, there can be mentioned acetamido, N-methylacetamido and N-methylbenzamido.

Examples of the imido groups include the same groups as previously described with respect to $R^7$ to $R^{10}$. More specifically, there can be mentioned acetimido and benzimido.

Examples of the amino groups include the same groups as previously described with respect to $R^7$ to $R^{10}$. More specifically, there can be mentioned dimethylamino, ethylmethylamino and diphenylamino.

Examples of the imino groups include the same groups as previously described with respect to $R^7$ to $R^{10}$. More specifically, there can be mentioned methylimino, ethylimino, propylimino, butylimino and phenylimino.

Examples of the sulfonic acid ester groups include the same groups as previously described with respect to $R^7$ to $R^{10}$. More specifically, there can be mentioned methylsulfonate, ethylsulfonate and phenylsulfonate.

Examples of the sulfonamido groups include the same groups as previously described with respect to $R^7$ to $R^{10}$. More specifically, there can be mentioned phenylsulfonamido, N-methylsulfonamido and N-methyl-p-toluenesulfonamido.

$R^7$ and $R^9$, $R^8$ and $R^{10}$, or $R^8$ and $R^{11}$ may be bonded to each other to form an aromatic ring, an aliphatic ring or a hydrocarbon ring containing a hetero atom such as a nitrogen atom, a sulfur atom or an oxygen atom. These rings may further have a substituent group.

$R^{12}$ to $R^{16}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group.

The halogen atom is fluorine, chlorine, bromine or iodine.

Examples of the hydrocarbon groups include straight-chain or branched alkyls of 1 to 20 carbon atoms, such as methyl, ethyl, n-propyl, isopropyl, n-butyl, isobutyl, sec-butyl, tert-butyl, pentyl and hexyl; straight-chain or branched alkenyls of 2 to 20 carbon atoms, such as vinyl, allyl and isopropenyl; straight-chain or branched alkynyls of 2 to 20 carbon atoms, such as propargyl; cyclic hydrocarbons of 3 to 20 carbon atoms, such as cyclopropanyl, cyclobutanyl, cyclopentanyl, cyclohexyl and adamantyl; aryl groups of 6 to 20 carbon atoms, such as phenyl, naphthyl, cyclopentadienyl and indenyl; and substituted aryl groups wherein these aryl groups are substituted with 1 to 5 substituent groups such as the aforesaid alkyl groups of 1 to 20 carbon atoms, aryl groups of 6 to 20 carbon atoms, alkoxy groups and aryloxy groups.

Examples of the halogenated hydrocarbon groups include groups wherein the above hydrocarbon groups are substituted with halogens Examples of the heterocyclic compound residual groups include nitrogen-containing heterocyclic rings, such as pyridine, pyrimidine and quinoline; oxygen-containing heterocyclic rings, such as furan and pyran; and sulfur-containing heterocyclic rings, such as thiophene. These rings may have a substituent group containing a hetero atom.

Examples of the hydrocarbon-substituted silyl groups include methylsilyl, dimethylsilyl, trimethylsilyl, ethylsilyl, diethylsilyl, triethylsilyl, diphenylmethylsilyl and triphenylsilyl.

Examples of the hydrocarbon-substituted siloxy groups include trimethylsiloxy.

Examples of the alkoxy groups include methoxy, ethoxy, n-propoxy, isopropoxy, n-butoxy, isobutoxy and tert-butoxy.

Examples of the alkylthio groups include thiomethyl and thioethyl.

Examples of the aryloxy groups include phenoxy, 2,6-dimethylphenoxy and 2,4,6-trimethylphenoxy.

Examples of the arylthio groups include thiophenyl, methylthiophenyl and thionaphthyl.

Examples of the acyl groups include formyl, benzoyl, p-chlorobenzoyl and p-methoxybenzoyl.

Examples of the ester groups include acetyloxy, benzoyloxy, methoxycarbonyl, phenoxycarbonyl and p-chlorophenoxycarbonyl.

Examples of the thioester groups include thioacetyl, thiobenzoyl, thiomethoxycarbonyl and thiophenoxycarbonyl.

Examples of the amido groups include acetamido, N-methylacetamido and N-methylbenzamido.

Examples of the imido groups include acetimido and benzimido.

Examples of the amino groups include dimethylamino, ethylmethylamino and diphenylamino.

Examples of the imino groups include methylimino, ethylimino, propylimino, butylimino and phenylimino.

Examples of the sulfonic acid ester groups include methylsulfonate, ethylsulfonate and phenylsulfonate.

Examples of the sulfonamido groups include phenylsulfonamido, N-methylsulfonamido and N-methyl-p-toluenesulfonamido.

At least one of $R^{12}$ to $R^{16}$ is a group other than a hydrogen atom, and two or more of the groups indicated by $R^{12}$ to $R^{16}$ may be bonded to each other to form a ring. Preferably, neighboring groups are bonded to each other to form an aliphatic ring, an aromatic ring or a hydrocarbon ring containing a hetero atom such as a nitrogen atom. These rings may further have a substituent group.

m is an integer of 0 to 2.

n is an integer of 0 or 2.

Each A may be the same or different and is an atom of Group 13 to Group 16 of the periodic table, specifically a boron atom, a carbon atom, a nitrogen atom, an oxygen atom, a silicon atom, a phosphorus atom, a sulfur atom, a germanium atom, a selenium atom, a tin atom or the like.

E is a substituent group having at least one element selected from carbon, hydrogen, oxygen, halogen, nitrogen, sulfur, phosphorus, boron and silicon. When plural groups indicated by E are present, they may be the same or different, and two or more groups indicated by E may be bonded to each other to form a ring.

p is a number satisfying a valence of M, specifically an integer of 1 to 8, preferably an integer of 1 to 5, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group. When n is 2 or greater, plural groups indicated by X may be the same or different.

The halogen atom is fluorine, chlorine, bromine or iodine.

Examples of the hydrocarbon groups of 1 to 20 carbon atoms include alkyl groups, cycloalkyl groups, alkenyl groups, arylalkyl groups and aryl groups. Specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl.

Examples of the halogenated hydrocarbon groups of 1 to 20 carbon atoms include groups wherein the above hydrocarbon groups of 1 to 20 carbon atoms are substituted with halogens.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituent groups wherein oxygen is replaced with sulfur in the above oxygen-containing groups; sulfonic acid ester groups, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinic acid ester groups, such as methylsulfinate, phenylsulfinate, benzylsulfinate, p-toluenesulfinate, trimethylbenzenesulfinate and pentafluorobenzenesulfinate.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Of the above atoms and groups, preferable are halogen atoms, hydrocarbon groups of 1 to 20 carbon atoms and sulfonic acid ester groups.

Y is an atom of Group 15 of the periodic table, specifically a nitrogen atom, a phosphorus atom, an arsenic atom, an antimony atom or the like, preferably a nitrogen atom or a phosphorus atom, more preferably a nitrogen atom. To such an atom is sometimes bonded hydrogen, a hydrocarbon group or the like. Further, such an atom is sometimes bonded to the transition metal atom indicated by M.

Another preferred example of the transition metal imine compound represented by the formula (I-a) or (I-b) for use in the invention is a transition metal imine compound represented by the following formula (III-a) or (III-b).

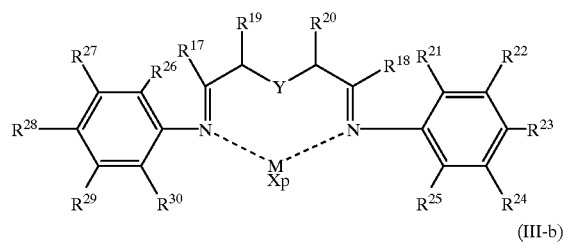

(III-a)

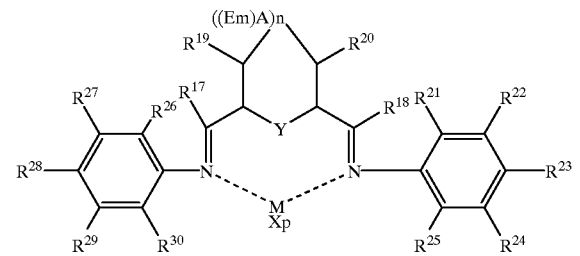

(III-b)

In the above formulas, M is a transition metal atom of Group 8 to Group 11 of the periodic table, preferably a transition metal atom of Group 8 and Group 9 of the periodic table such as iron, ruthenium, osmium, cobalt, rhodium or iridium, particularly preferably iron or cobalt.

$R^{17}$ to $R^{20}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonate ester group, a sulfonamido group, a cyano group, a nitro group, a carboxyl group, a sulfonyl group, a mercapto group, a hydroxyl group or the like.

The halogen atom is fluorine, chlorine, bromine or iodine.

Examples of the hydrocarbon groups include straight-chain or branched alkyls of 1 to 20 carbon atoms, such as methyl, ethyl, n-propyl, isopropyl, n-butyl, isobutyl, sec-butyl, tert-butyl, pentyl and hexyl; straight-chain or branched alkenyls of 2 to 20 carbon atoms, such as vinyl, allyl and isopropenyl; straight-chain or branched alkynyls of 2 to 20 carbon atoms, such as propargyl; cyclic hydrocarbons of 3 to 20 carbon atoms, such as cyclopropanyl, cyclobutanyl, cyclopentanyl, cyclohexyl and adamantyl; aryl groups of 6 to 20 carbon atoms, such as phenyl, naphthyl, cyclopentadienyl and indenyl; and substituted aryl groups wherein these aryl groups are substituted with 1 to 5 substituent groups such as the aforesaid alkyl groups of 1 to 20 carbon atoms, aryl groups of 6 to 20 carbon atoms, alkoxy groups and aryloxy groups.

Examples of the halogenated hydrocarbon groups include groups wherein the above hydrocarbon groups are substituted with halogens Examples of the heterocyclic compound residual groups include nitrogen-containing heterocyclic rings, such as pyridine, pyrimidine and quinoline; oxygen-containing heterocyclic rings, such as furan and pyran; and sulfur-containing heterocyclic rings, such as thiophene. These rings may have a substituent group containing a hetero atom.

Examples of the hydrocarbon-substituted silyl groups include methylsilyl, dimethylsilyl, trimethylsilyl, ethylsilyl, diethylsilyl, triethylsilyl, diphenylmethylsilyl and triphenylsilyl.

Examples of the hydrocarbon-substituted siloxy groups include trimethylsiloxy.

Examples of the alkoxy groups include methoxy, ethoxy, n-propoxy, isopropoxy, n-butoxy, isobutoxy and tert-butoxy.

Examples of the alkylthio groups include thiomethyl and thioethyl.

Examples of the aryloxy groups include phenoxy, 2,6-dimethylphenoxy and 2,4,6-trimethylphenoxy.

Examples of the arylthio groups include thiophenyl, methylthiophenyl and thionaphthyl.

Examples of the acyl groups include formyl, benzoyl, p-chlorobenzoyl and p-methoxybenzoyl.

Examples of the ester groups include acetyloxy, benzoyloxy, methoxycarbonyl, phenoxycarbonyl and p-chlorophenoxycarbonyl.

Examples of the thioester groups include thioacetyl, thiobenzoyl, thidmethoxycarbonyl and thiophenoxycarbonyl.

Examples of the amido groups include acetamido, N-methylacetamido and N-methylbenzamido.

Examples of the imido groups include acetimido and benzimido.

Examples of the amino groups include dimethylamino, ethylmethylamino and diphenylamino.

Examples of the imino groups include methylimino, ethylimino, propylimino, butylimino and phenylimino.

Examples of the sulfonate ester groups include methylsulfonate, ethylsulfonate and phenylsulfonate esters.

Examples of the sulfonamido groups include phenylsulfonamido, N-methylsulfonamido and N-methyl-p-toluenesulfonamido.

$R^{17}$ and $R^{19}$, or $R^{18}$ and $R^{20}$ may be bonded to each other to form an aromatic ring, an aliphatic ring or a hydrocarbon ring containing a hetero atom such as a nitrogen atom, a sulfur atom or an oxygen atom. These rings may further have a substituent group.

$R^{21}$ to $R^{30}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group, a hydroxyl group or the like.

The halogen atom is fluorine, chlorine, bromine or iodine.

Examples of the hydrocarbon groups include straight-chain or branched alkyls of 1 to 20 carbon atoms, such as methyl, ethyl, n-propyl, isopropyl, n-butyl, isobutyl, sec-butyl, tert-butyl, pentyl and hexyl; straight-chain or branched alkenyls of 2 to 20 carbon atoms, such as vinyl, allyl and isopropenyl; straight-chain or branched alkynyls of 2 to 20 carbon atoms, such as propargyl; cyclic hydrocarbons of 3 to 20 carbon atoms, such as cyclopropanyl, cyclobutanyl, cyclopentanyl, cyclohexyl and adamantyl; aryl groups of 6 to 20 carbon atoms, such as phenyl, naphthyl, cyclopentadienyl and indenyl; and substituted aryl groups wherein these aryl groups are substituted with 1 to 5 substituent groups such as the aforesaid alkyl groups of 1 to 20 carbon atoms, aryl groups of 6 to 20 carbon atoms, alkoxy groups and aryloxy groups.

Examples of thehalogenated hydrocarbon groups include groups wherein the above hydrocarbon groups are substituted with halogens Examples of the heterocyclic compound residual groups include nitrogen-containing heterocyclic rings, such as pyridine, pyrimidine and quinoline; oxygen-containing heterocyclic rings, such as furan and pyran; and sulfur-containing heterocyclic rings, such as thiophene. These rings may have a substituent group containing a hetero atom.

Examples of the hydrocarbon-substituted silyl groups include methylsilyl, dimethylsilyl, trimethylsilyl, ethylsilyl, diethylsilyl, triethylsilyl, diphenylmethylsilyl and triphenylsilyl.

Examples of the hydrocarbon-substituted siloxy groups include trimethylsiloxy.

Examples of the alkoxy groups include methoxy, ethoxy, n-propoxy, isopropoxy, n-butoxy, isobutoxy and tert-butoxy.

Examples of the alkylthio groups include thiomethyl and thioethyl.

Examples of the aryloxy groups include phenoxy, 2,6-dimethylphenoxy and 2,4,6-trimethylphenoxy.

Examples of the arylthio groups include thiophenyl, methylthiophenyl and thionaphthyl.

Examples of the acyl groups include formyl, benzoyl, p-chlorobenzoyl and p-methoxybenzoyl.

Examples of the ester groups include acetyloxy, benzoyloxy, methoxycarbonyl, phenoxycarbonyl and p-chlorophenoxycarbonyl.

Examples of the thioester groups include thioacetyl, thiobenzoyl, thiomethoxycarbonyl and thiophenoxycarbonyl.

Examples of the amido groups include acetamido, N-methylacetamido and N-methylbenzamido.

Examples of the imido groups include acetimido and benzimido.

Examples of the amino groups include dimethylamino, ethylmethylamino and diphenylamino.

Examples of the imino groups include methylimino, ethylimino, propylimino, butylimino and phenylimino.

Examples of the sulfonic acid ester groups include methylsulfonate, ethylsulfonate and phenylsulfonate.

Examples of the sulfonamido groups include phenylsulfonamido, N-methylsulfonamido and N-methyl-p-toluenesulfonamido.

At least one of $R^{21}$ to $R^{25}$ is a group other than a hydrogen atom, and at least one of $R^{26}$ to $R^{30}$ is a group other than a hydrogen atom. Two or more of the groups indicated by $R^{21}$ to $R^{25}$ may be bonded to each other to form a ring, and two or more of the groups indicated by $R^{26}$ to $R^{30}$ may be bonded to each other to form a ring. Preferably, neighboring groups are bonded to each other to form an aliphatic ring, an aromatic ring or a hydrocarbon ring containing a hetero atom such as a nitrogen atom. These rings may further have a substituent group.

m is an integer of 0 to 2.

n is an integer of 0 or 2.

Each A may be the same or different and is an atom of Group 13 to Group 16 of the periodic table, specifically a boron atom, a carbon atom, a nitrogen atom, an oxygen atom, a silicon atom, a phosphorus atom, a sulfur atom, a germanium atom, a selenium atom, a tin atom or the like.

E is a substituent group having at least one element selected from carbon, hydrogen, oxygen, halogen, nitrogen, sulfur, phosphorus, boron and silicon. When plural groups indicated by E are present, they may be the same or different, and two or more groups indicated by E may be bonded to each other to form a ring, p is a number satisfying a valence of M, specifically an integer of 1 to 8, preferably an integer of 1 to 5, more preferably an integer of 1 to 3.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or asilicon-containing group. When n is 2 or greater, plural groups indicated by X may be the same or different.

The halogen atom is fluorine, chlorine, bromine or iodine.

Examples of the hydrocarbon groups of 1 to 20 carbon atoms include alkyl groups, cycloalkyl groups, alkenyl groups, arylalkyl groups and aryl groups. Specifically, there can be mentioned alkyl groups, such as methyl, ethyl, propyl, butyl, hexyl, octyl, nonyl, dodecyl and eicosyl; cycloalkyl groups, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl.

Examples of the halogenated hydrocarbon groups of 1 to 20 carbon atoms include groups wherein the above hydrocarbon groups of 1 to 20 carbon atoms are substituted with halogens.

Examples of the oxygen-containing groups include a hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituent groups wherein oxygen is replaced with sulfur in the above oxygen-containing groups; sulfonic acid ester groups, such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinic acid ester groups, such as methylsulfinate, phenylsulfinate, benzylsulfinate, p-toluenesulfinate, trimethylbenzenesulfinate and pentafluorobenzenesulfinate.

Examples of the silicon-containing groups include monohydrocarbon-substituted silyls, such as methylsilyl and phenylsilyl; dihydrocarbon-substituted silyls, such as dimethylsilyl and diphenylsilyl; trihydrocarbon-substituted silyls, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of hydrocarbon-substituted silyls, such as trimethylsilyl ether; silicon-substituted alkyl groups, such as trimethylsilylmethyl; and silicon-substituted aryl groups, such as trimethylsilylphenyl.

Of the above atoms and groups, preferable are halogen atoms, hydrocarbon groups of 1 to 20 carbon atoms and sulfonic acid ester groups.

Y is an atom of Group 15 of the periodic table, specifically a nitrogen atom, a phosphorus atom, an arsenic atom, an antimony atom or the like, preferably a nitrogen atom or a phosphorus atom, more preferably a nitrogen atom. To such an atom is sometimes bonded hydrogen, a hydrocarbon group or the like. Further, such an atom is sometimes bonded to the transition metal atom indicated by M.

Examples of the transition metal imine compounds represented by any of the formulas (I-a), (I-b), (II-a), (II-b), (III-a) and (III-b) are given below.

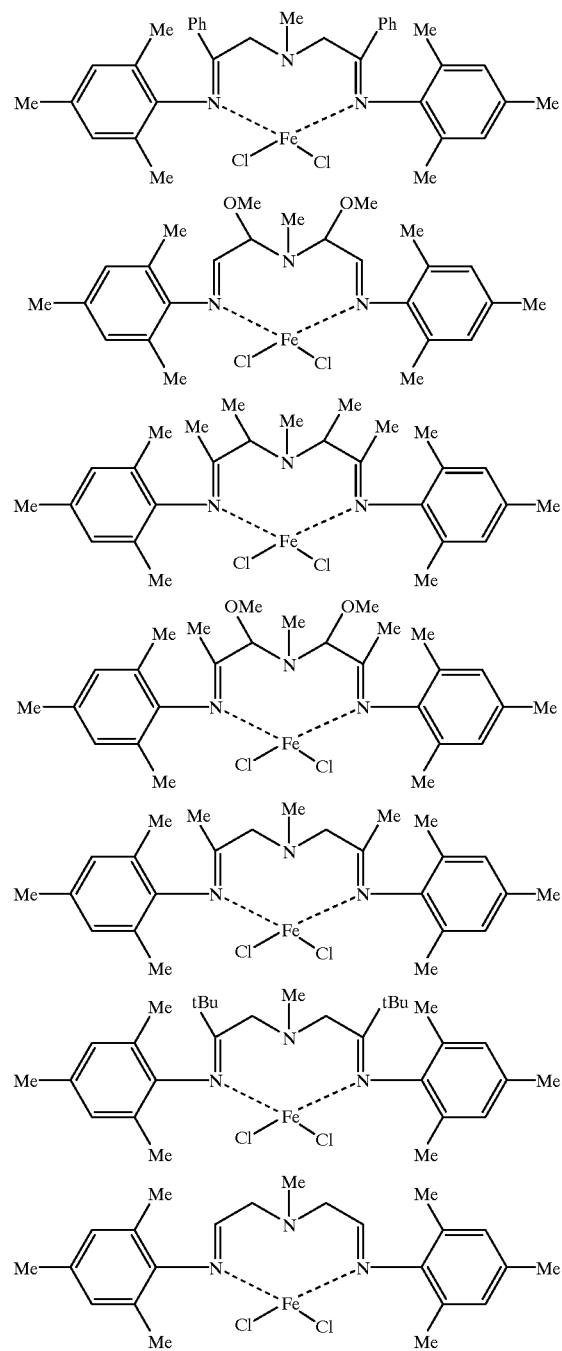

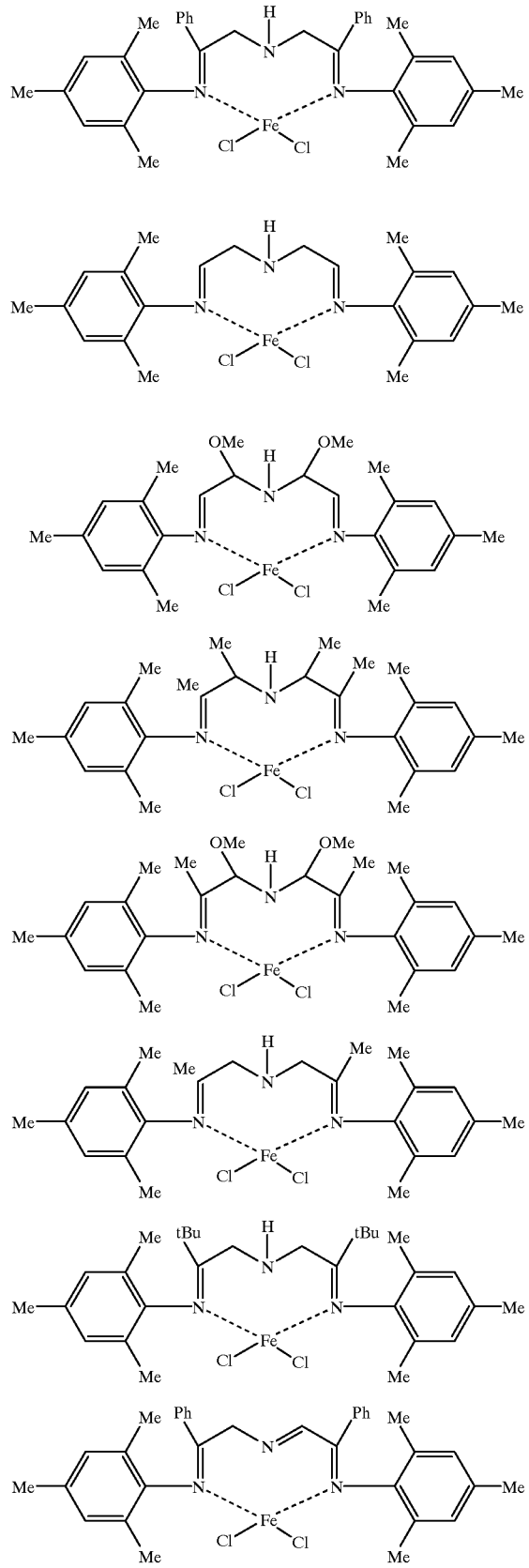
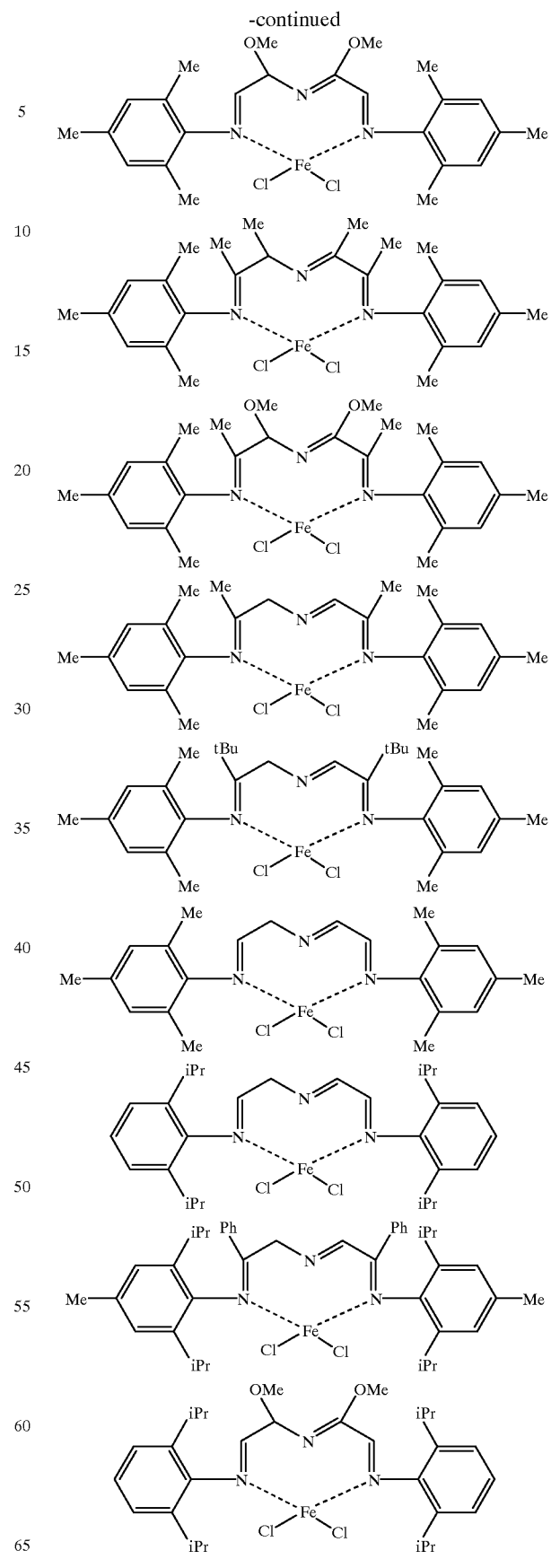

-continued
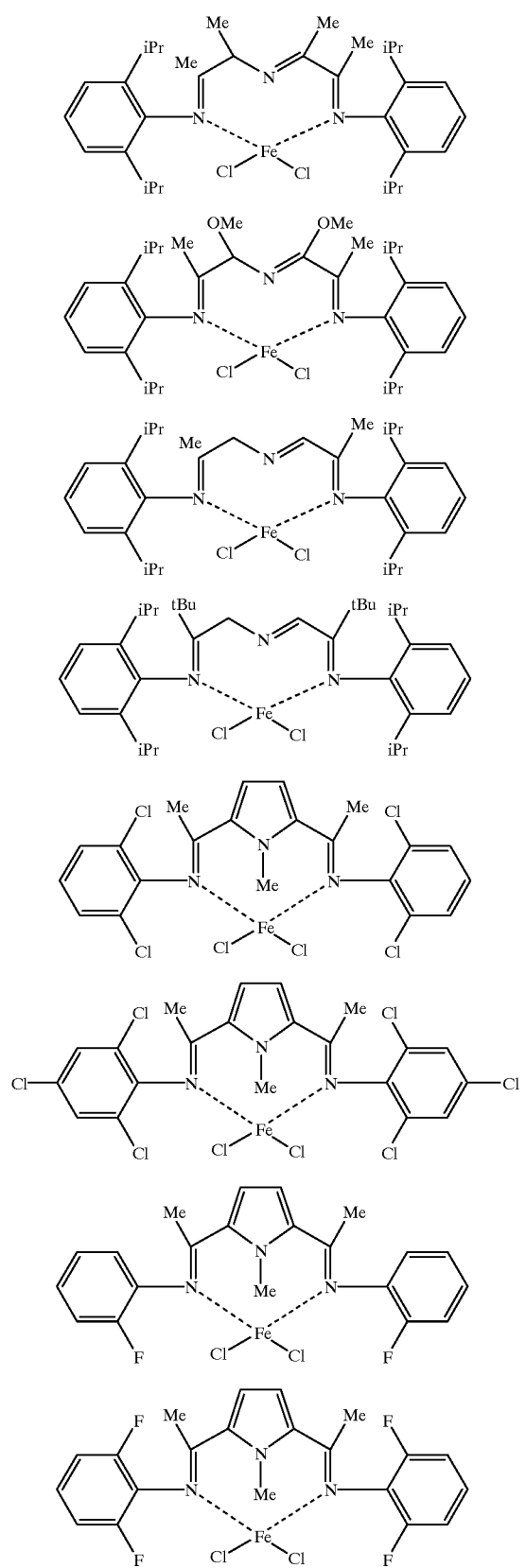
-continued
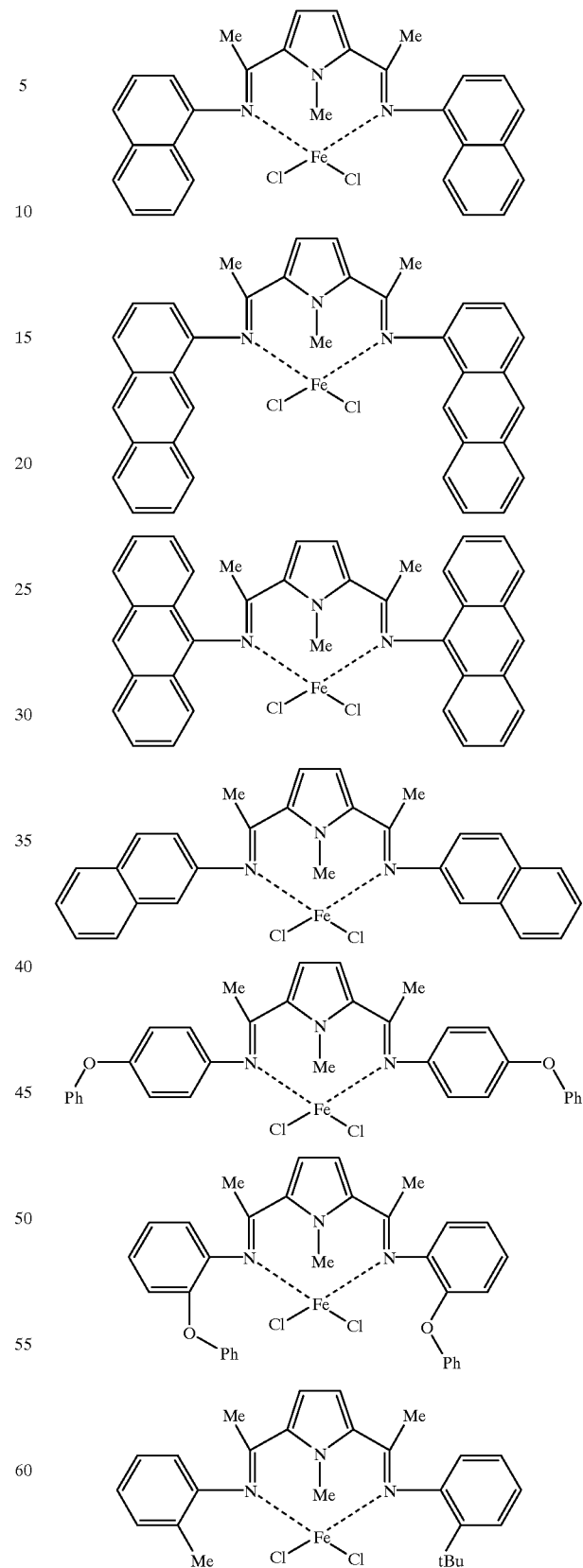

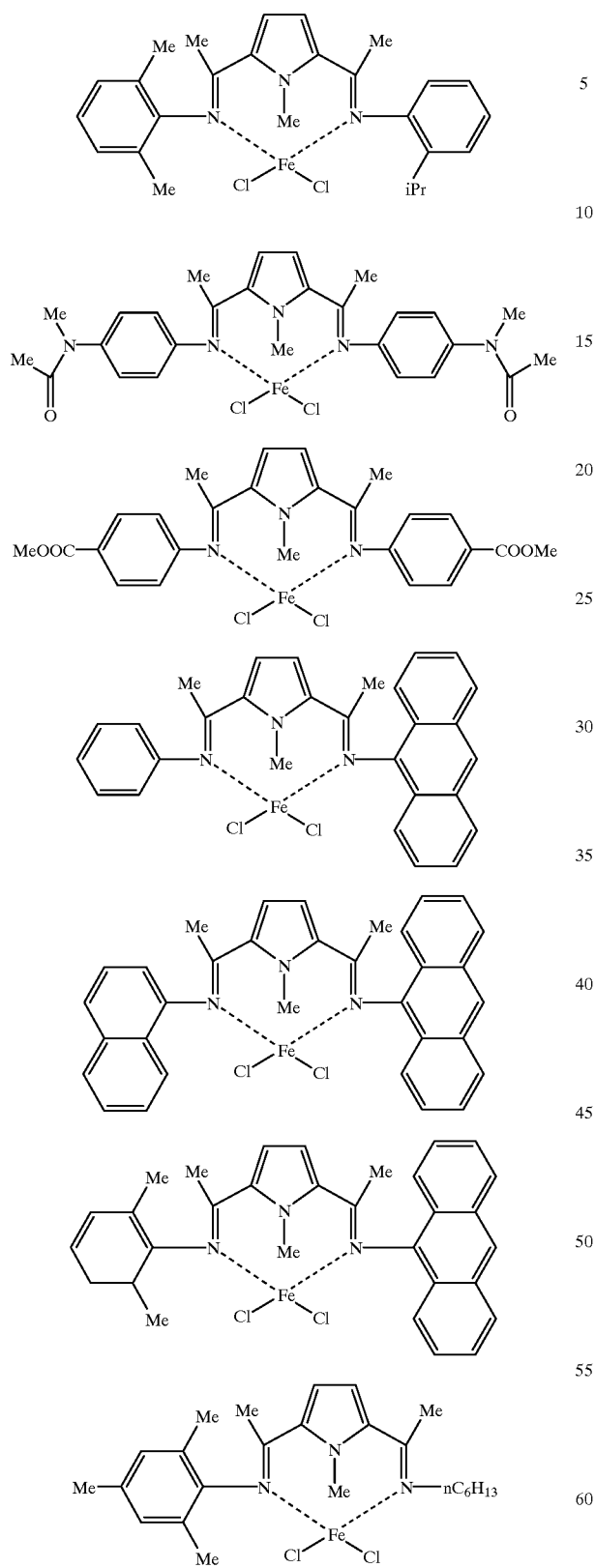
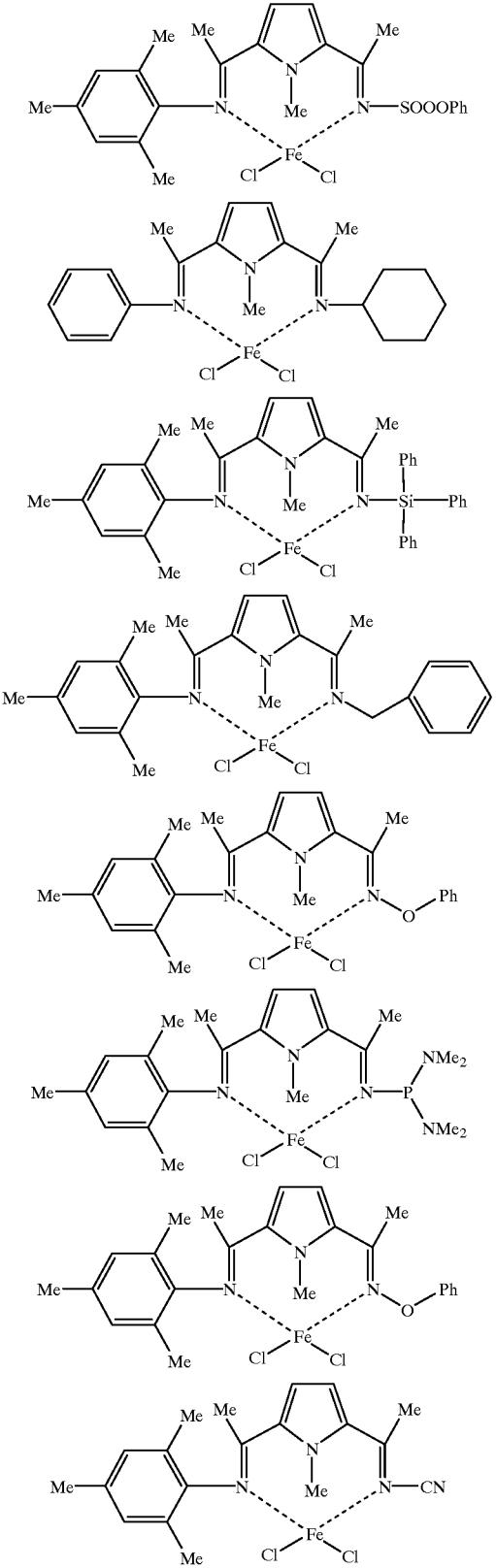

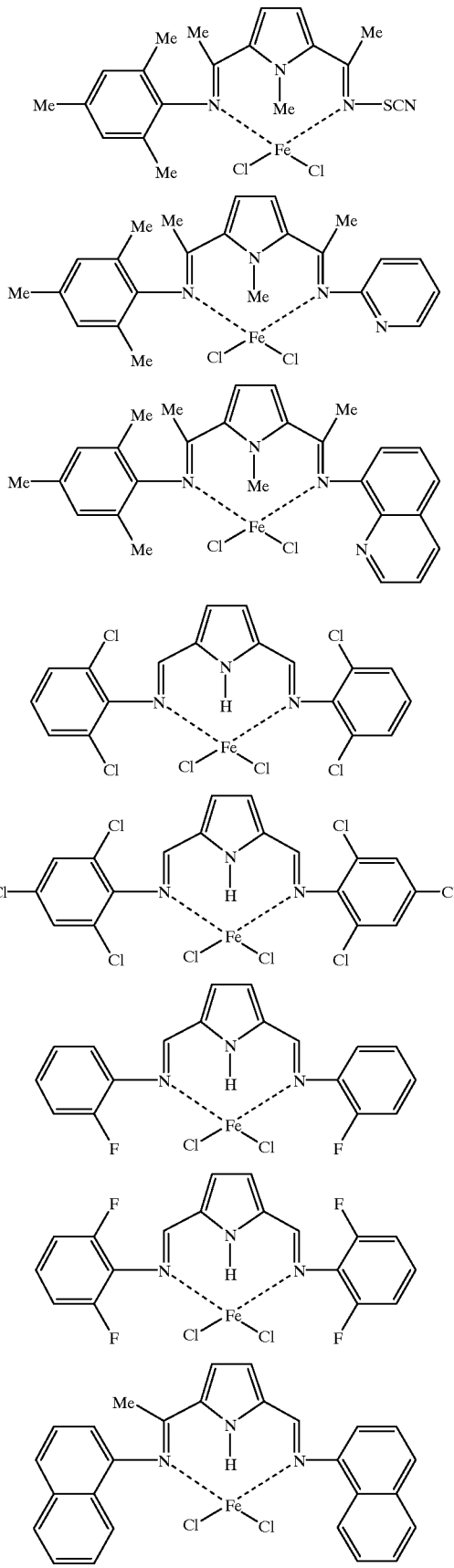
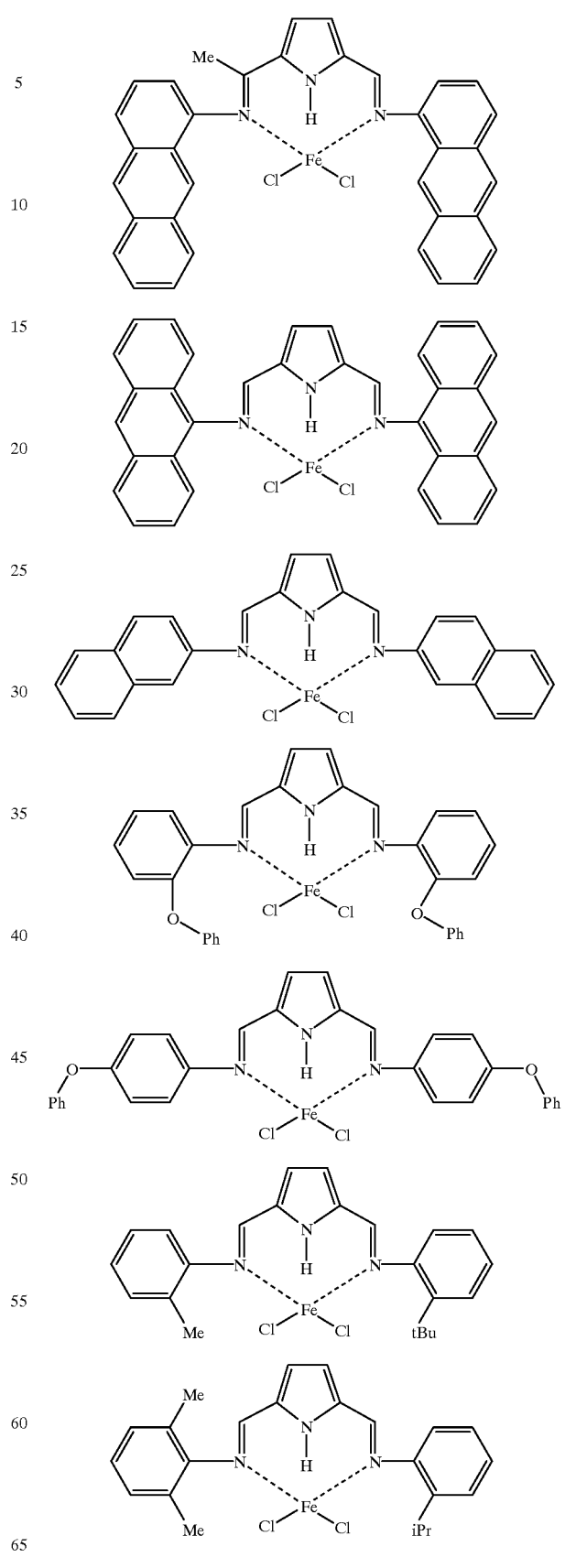

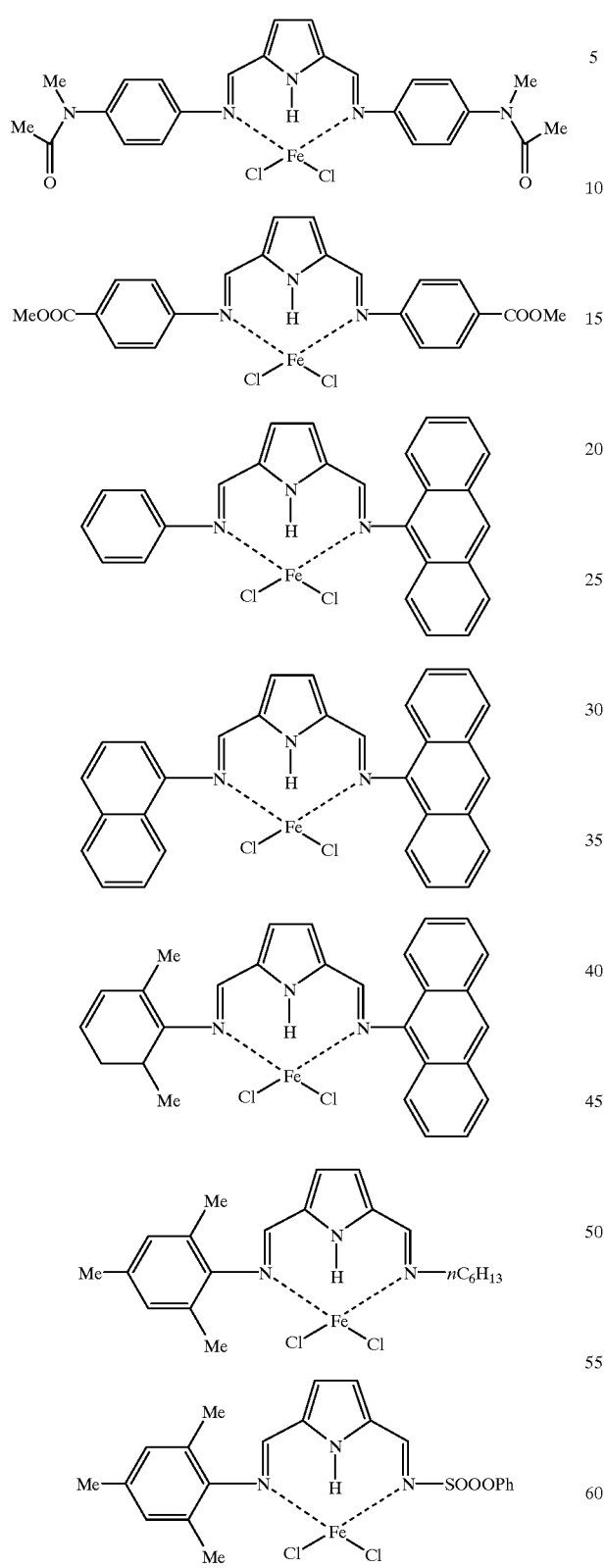
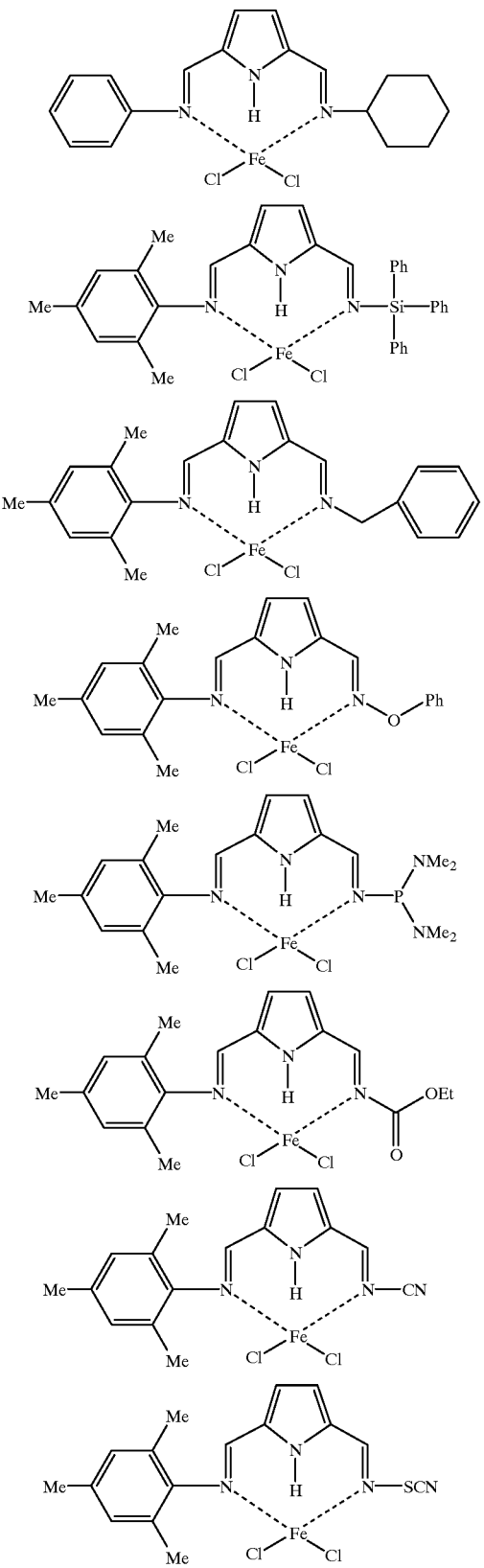

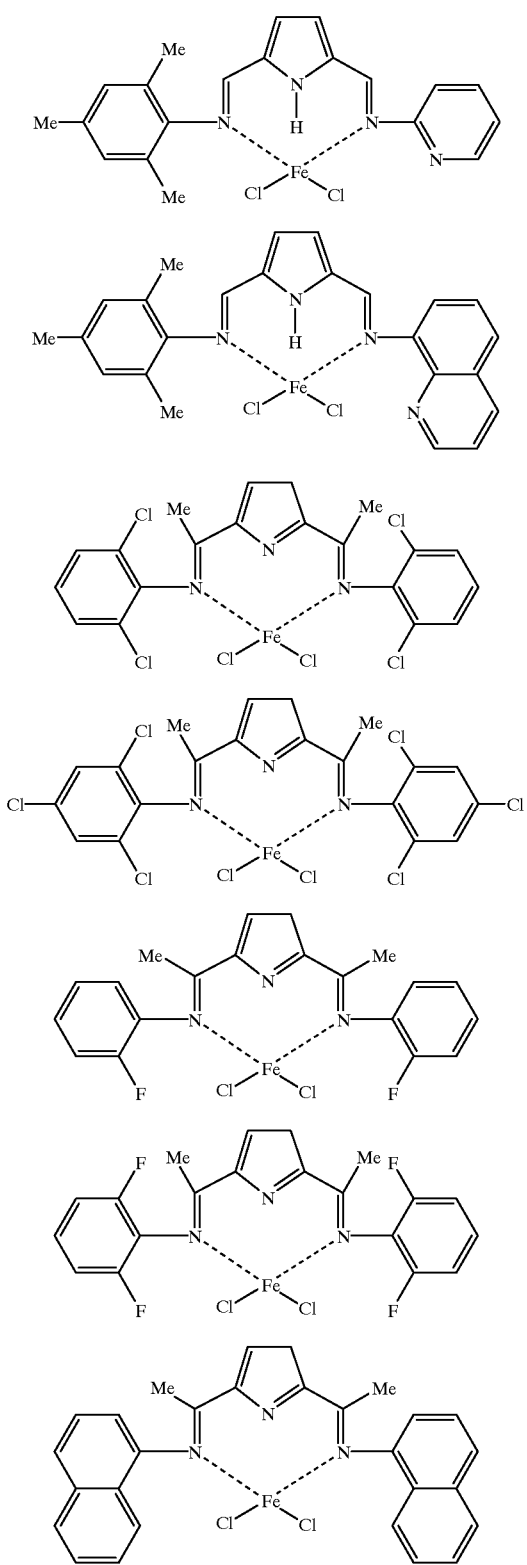
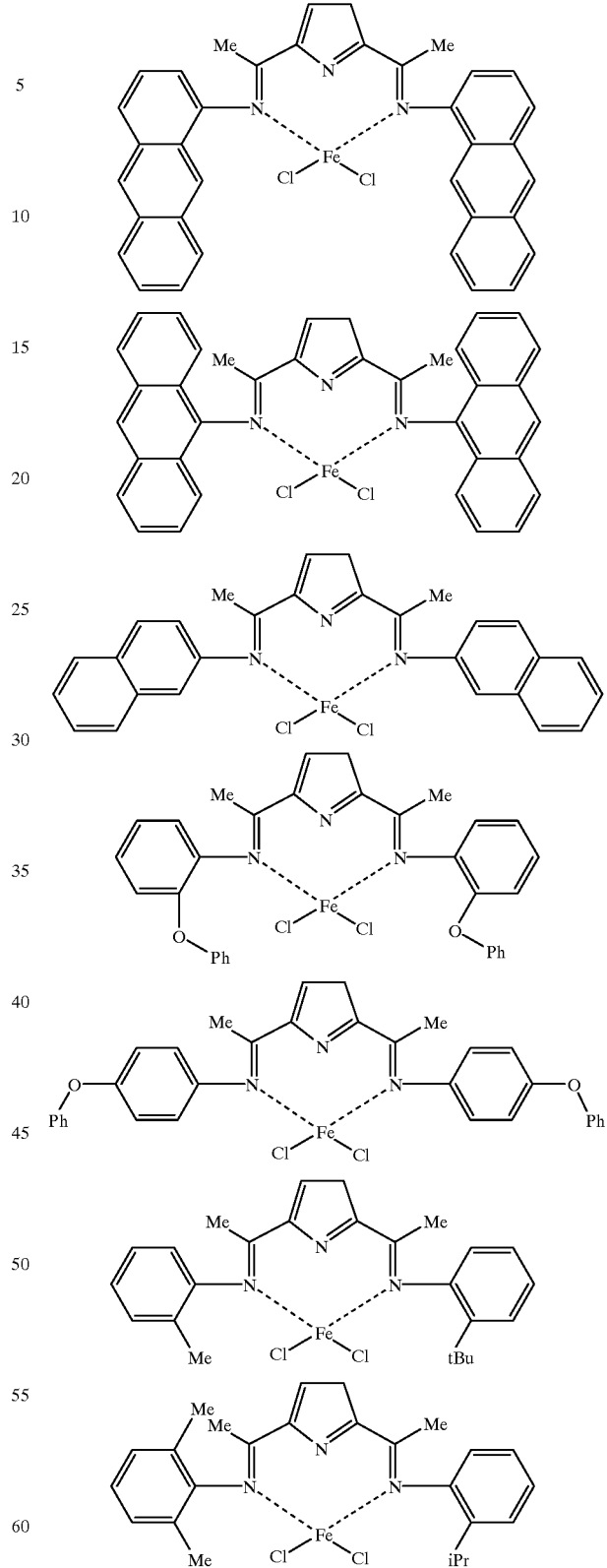

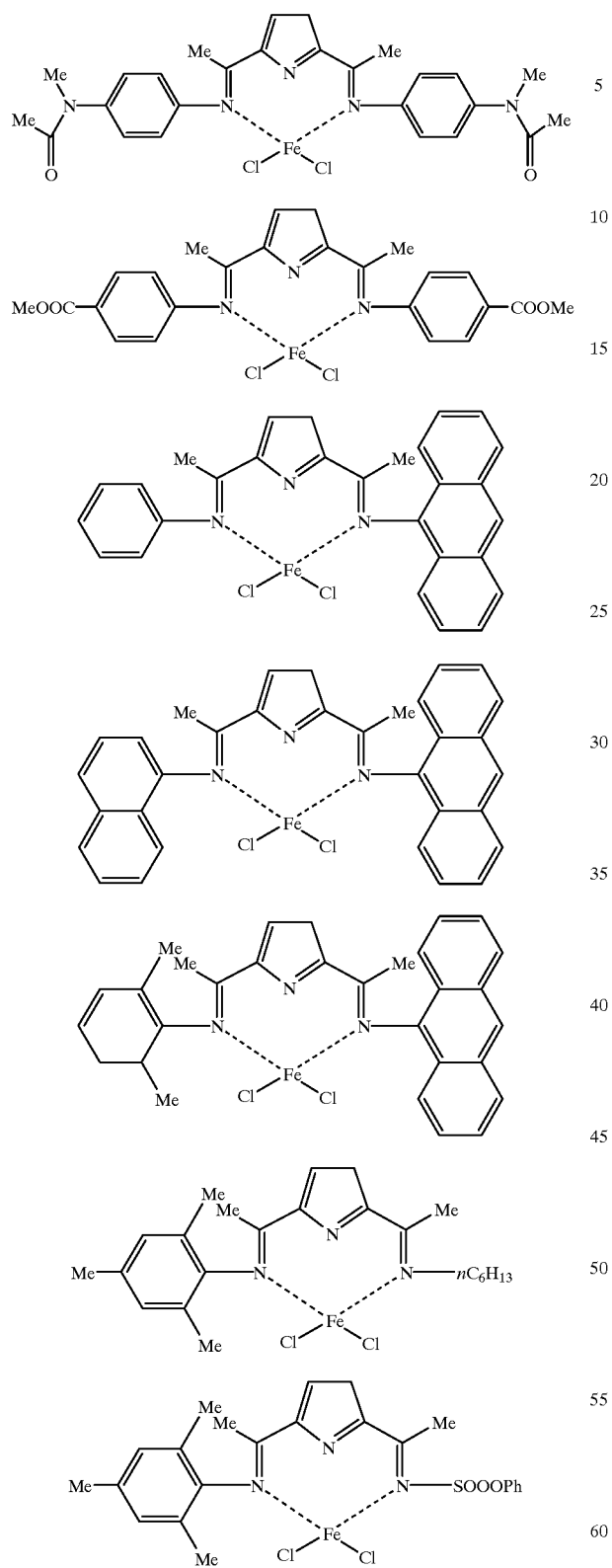
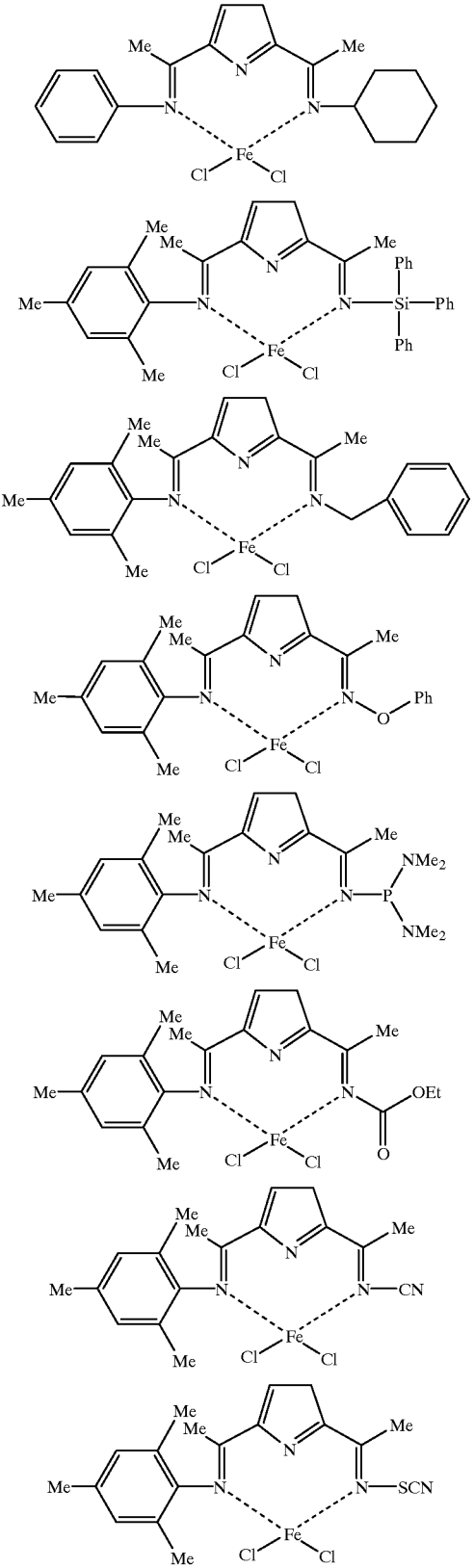

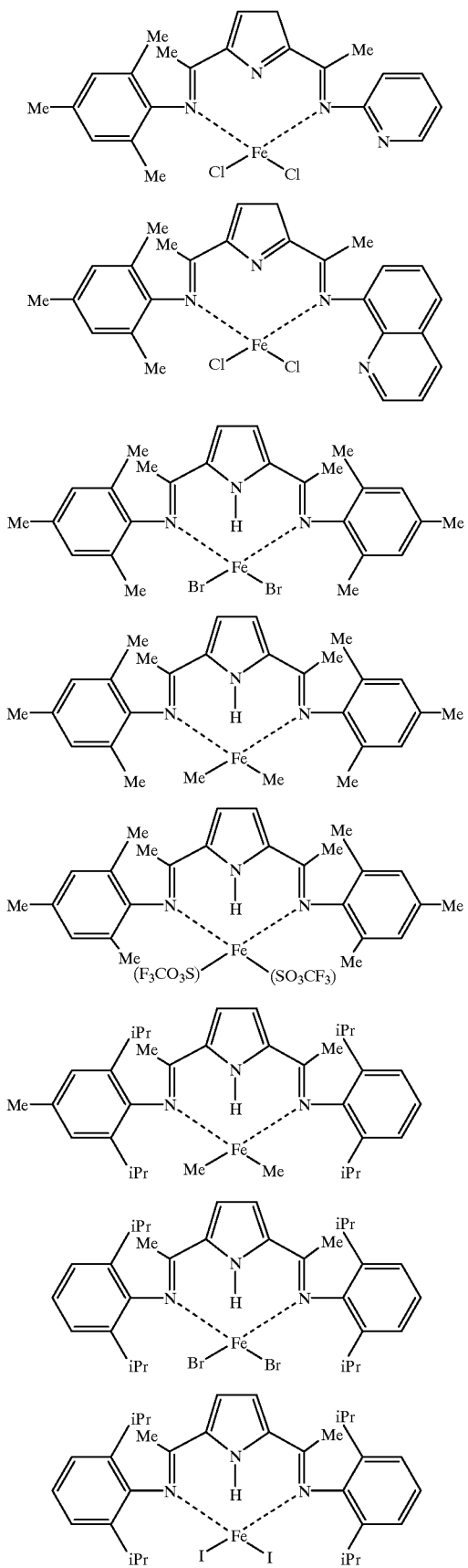
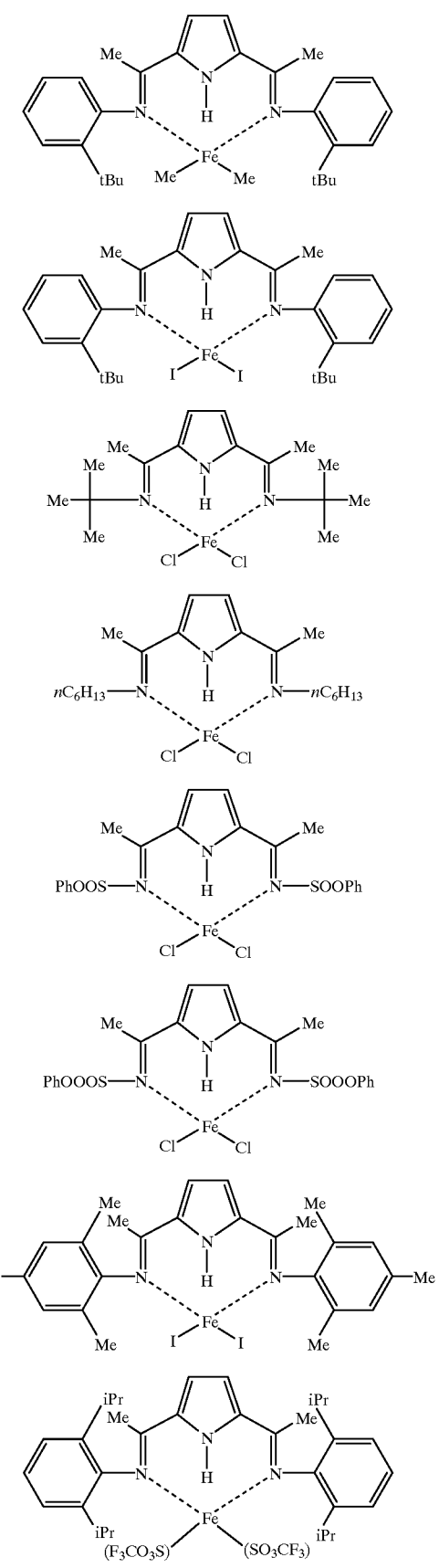

-continued
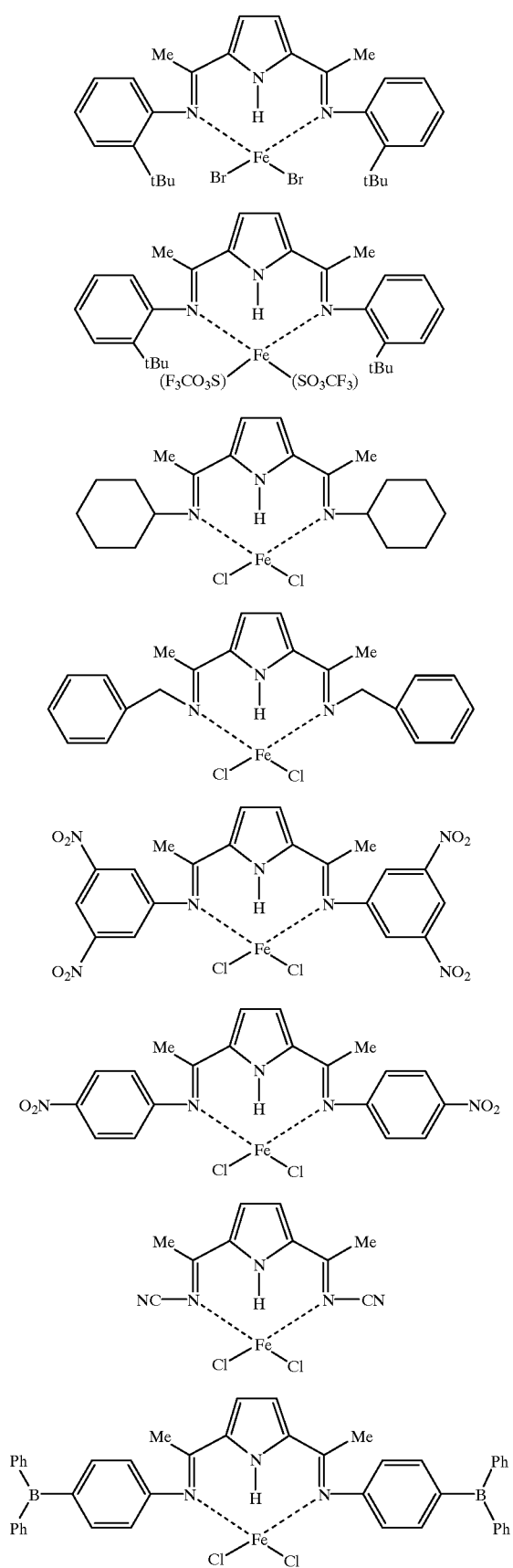
-continued
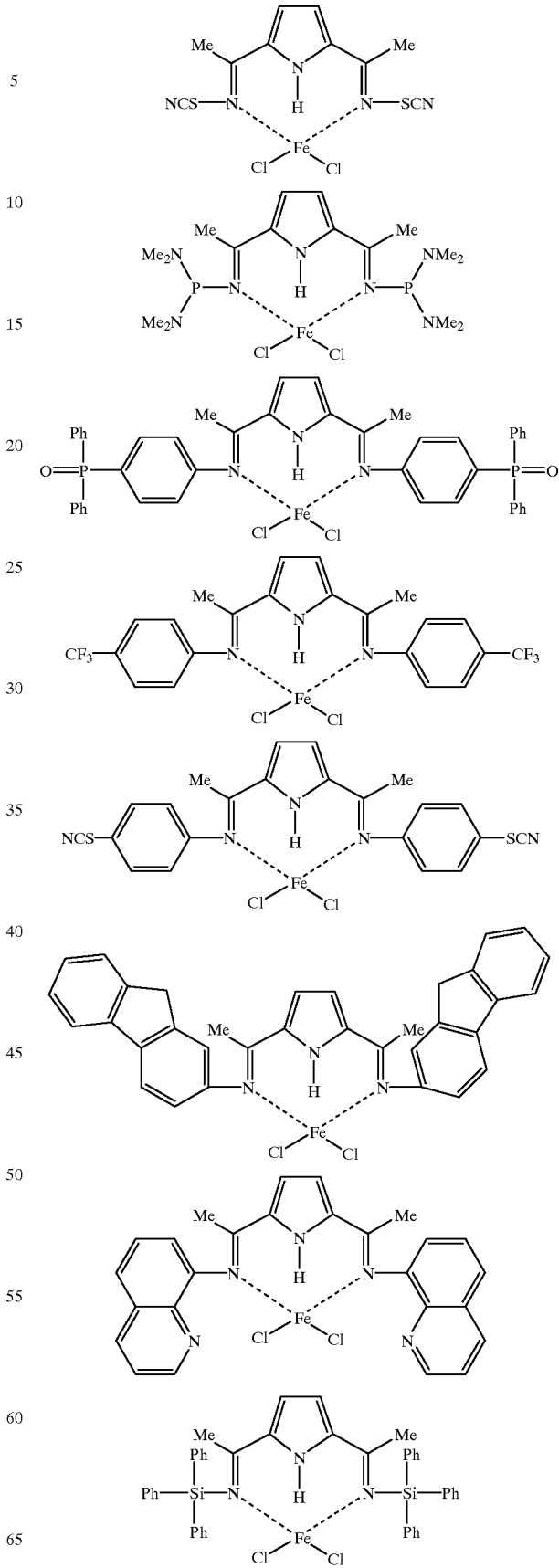

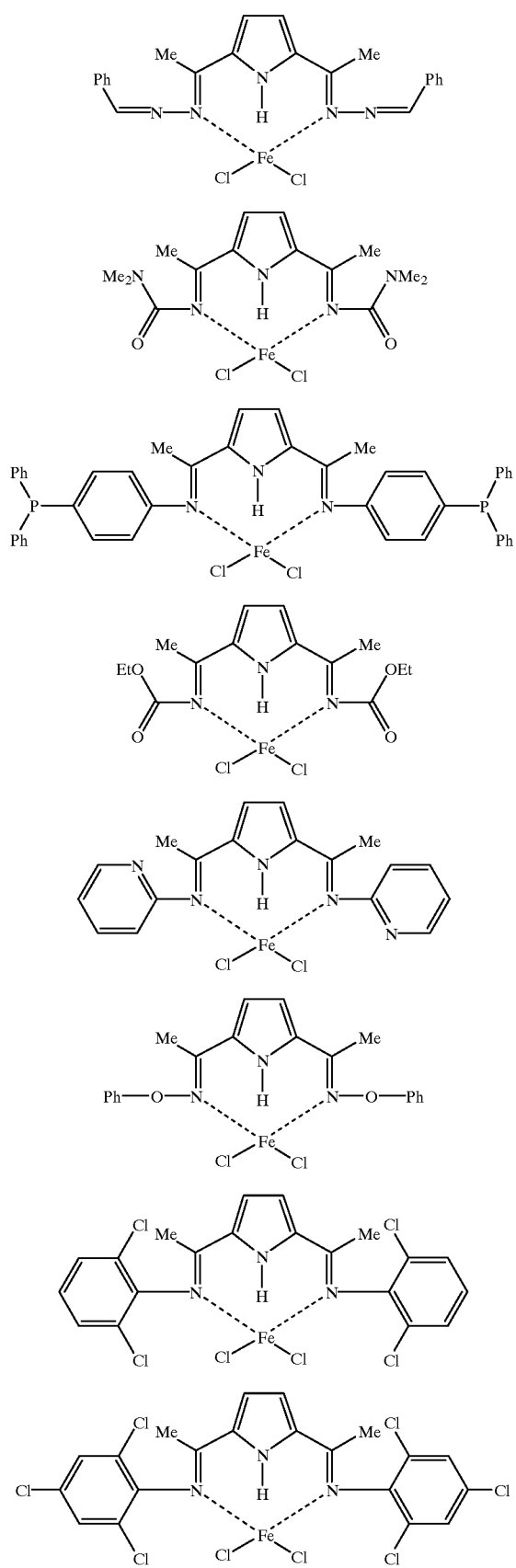
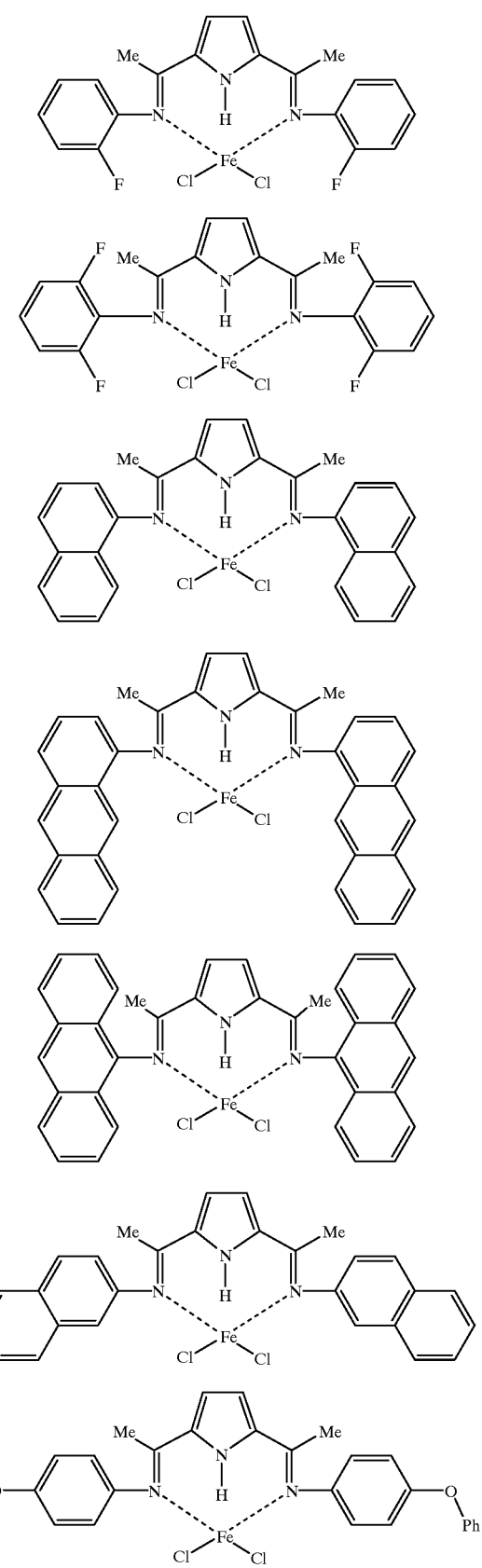

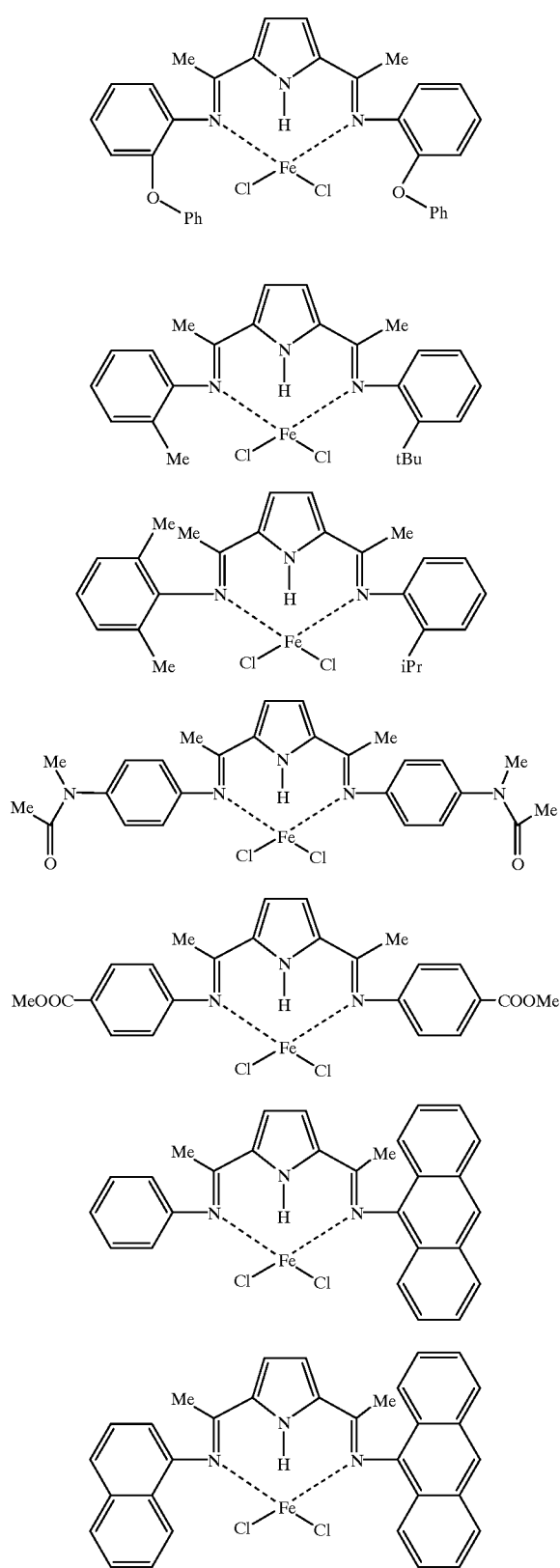
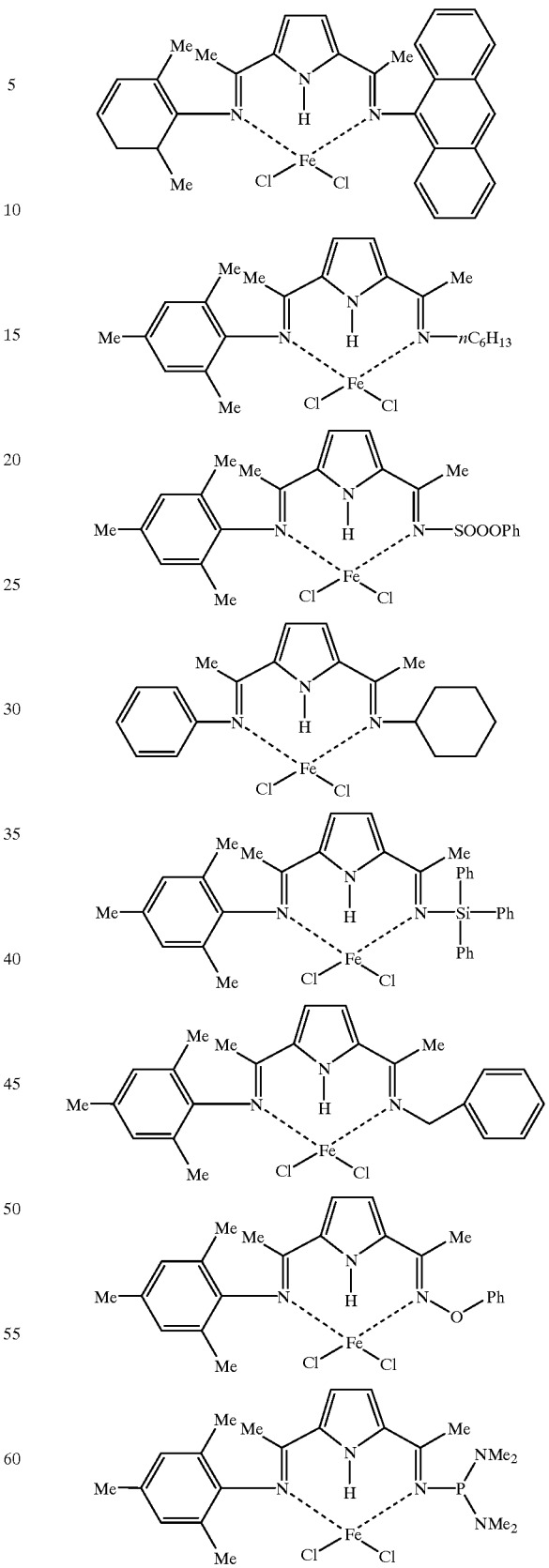

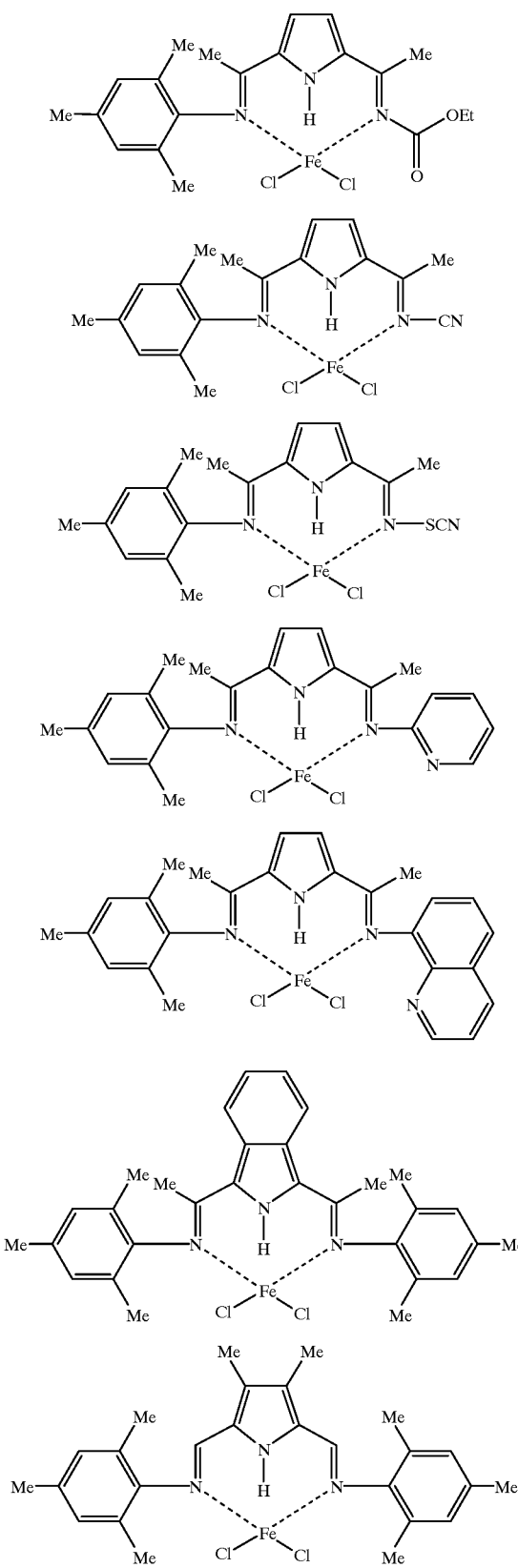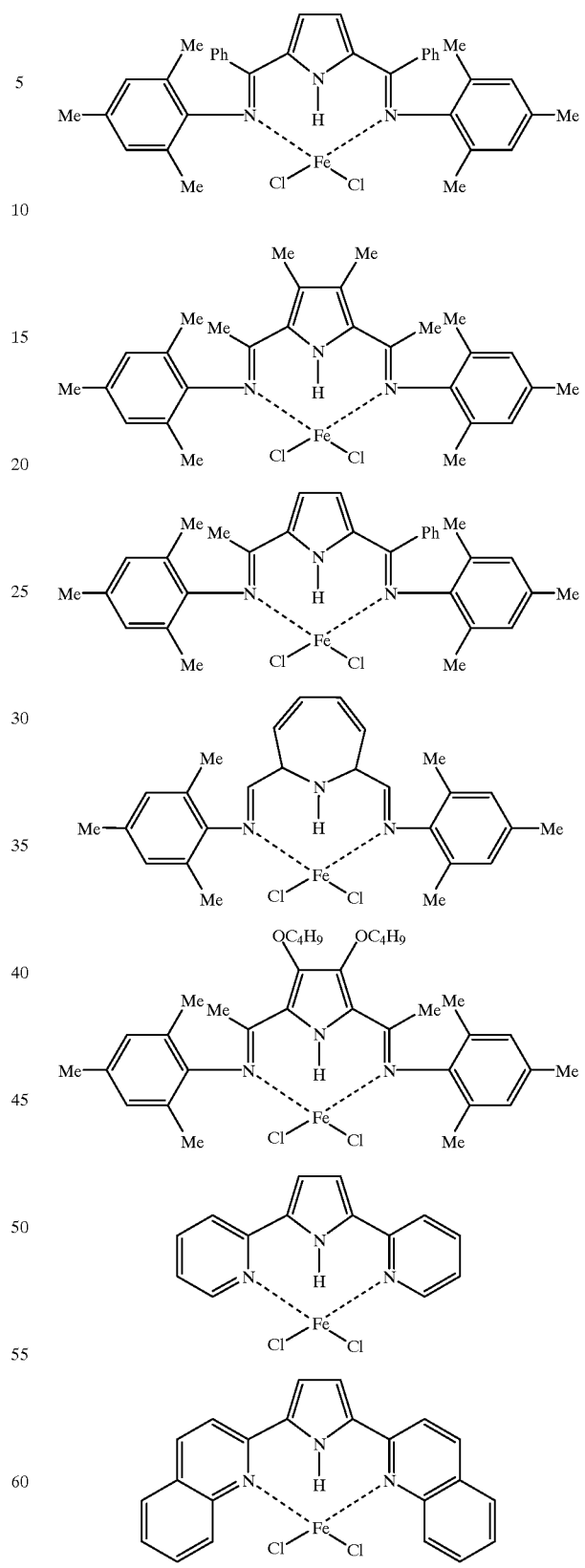

-continued
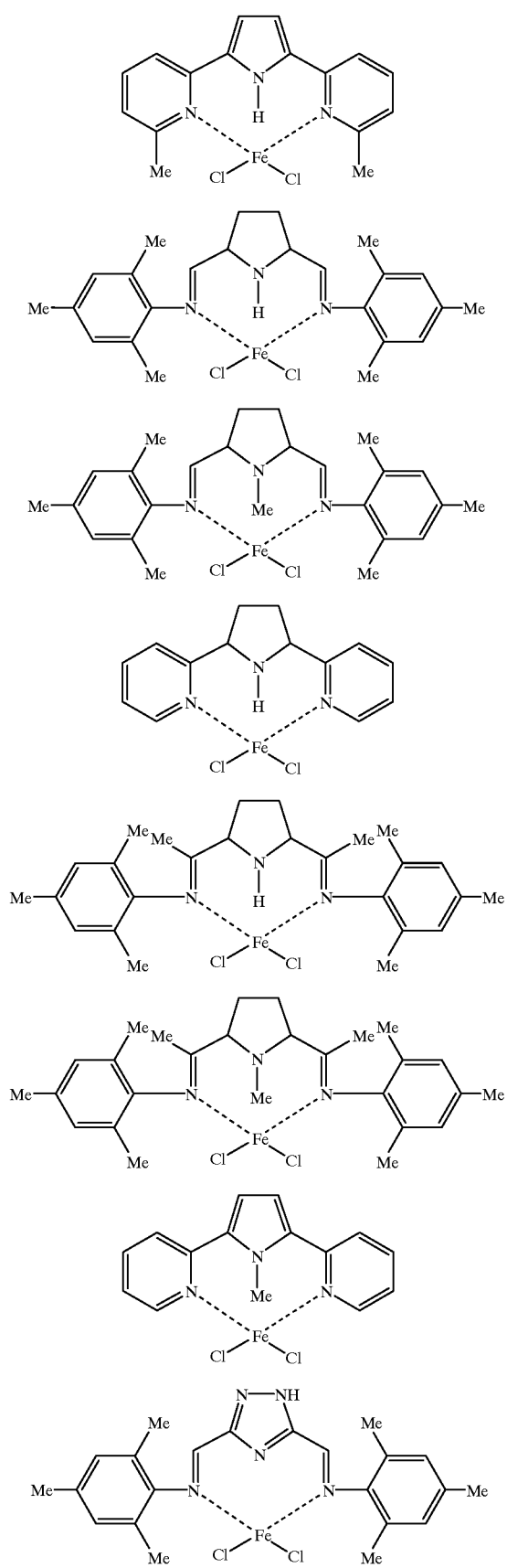
-continued
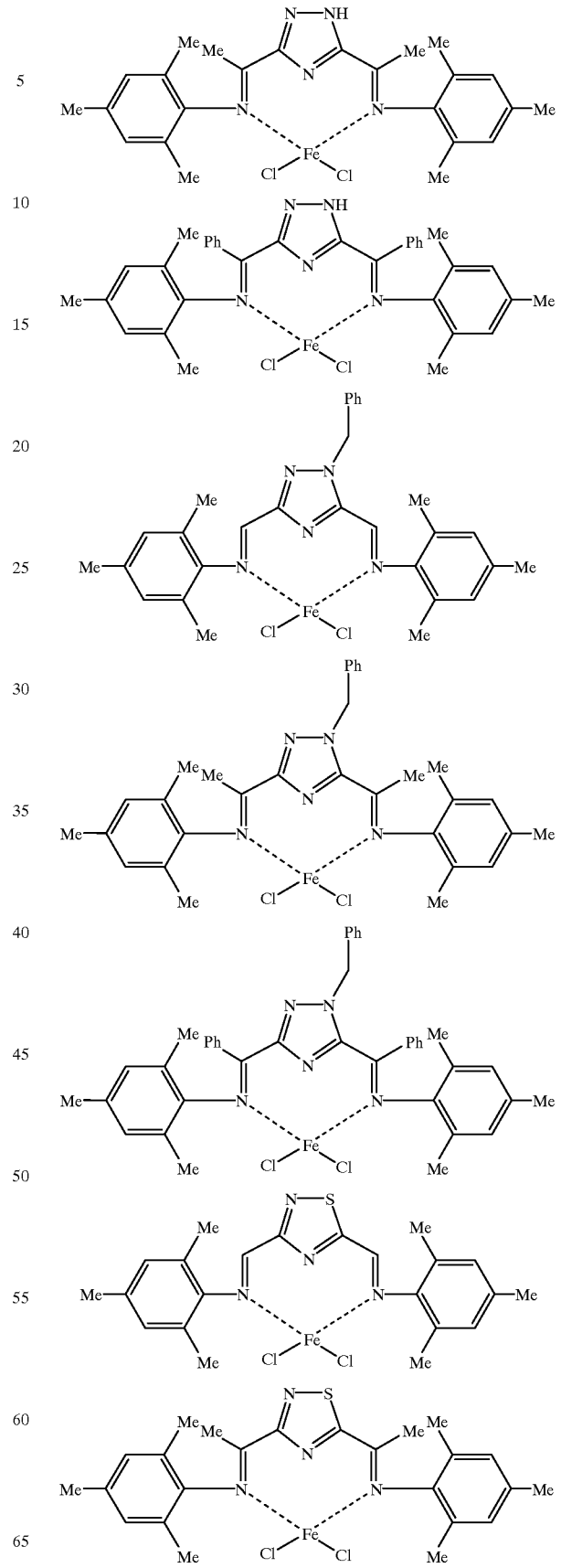

-continued
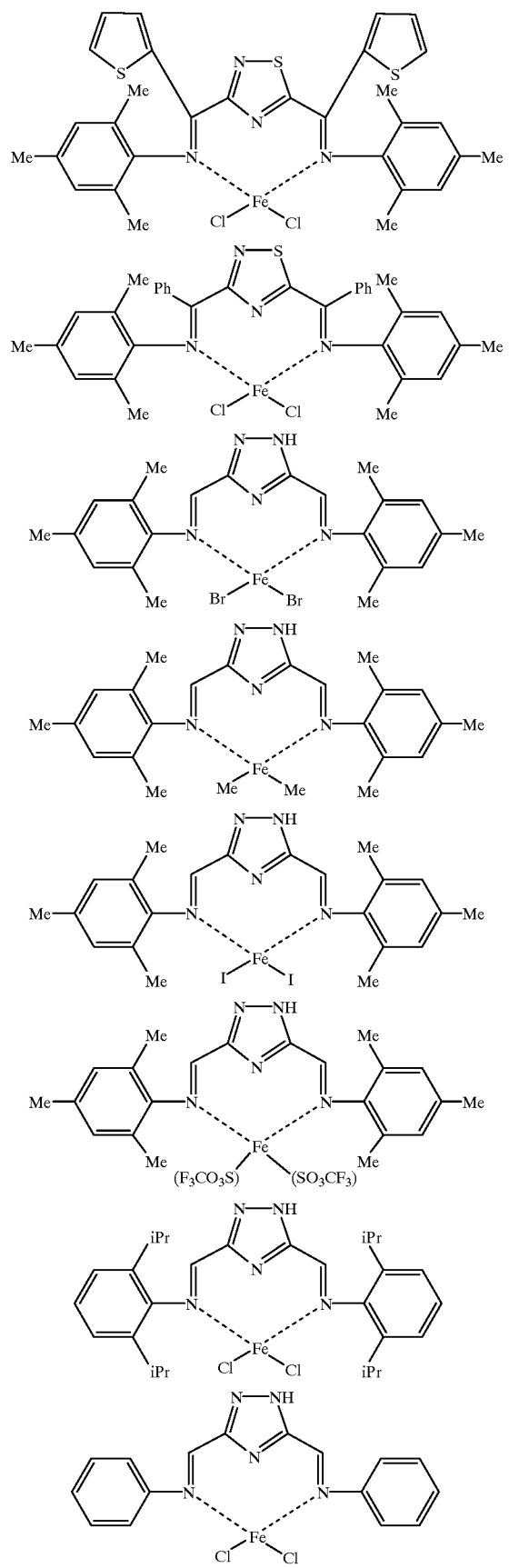
-continued
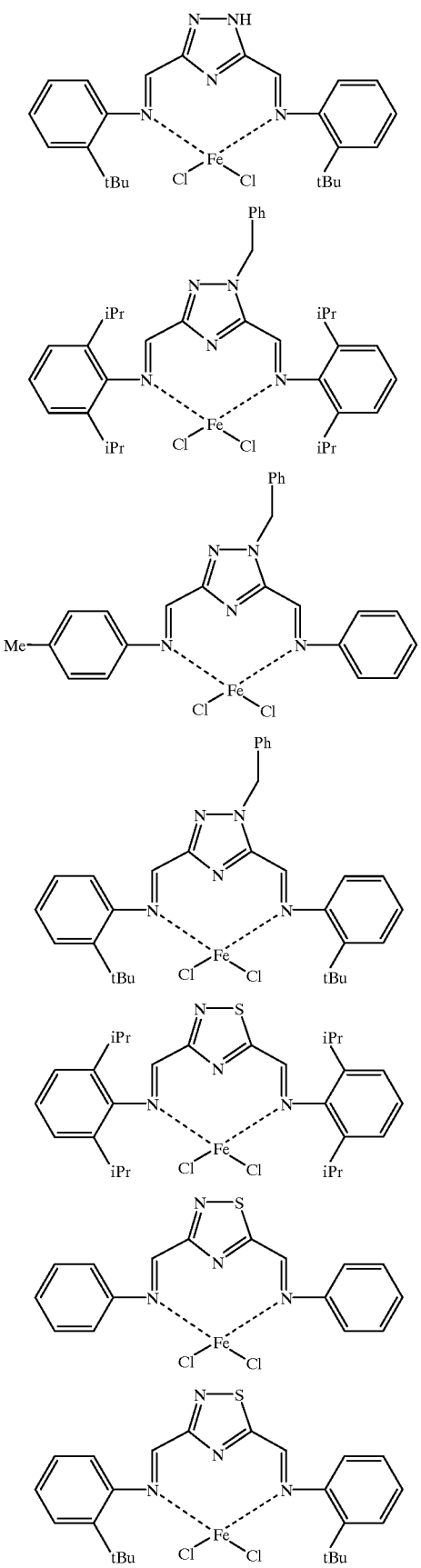

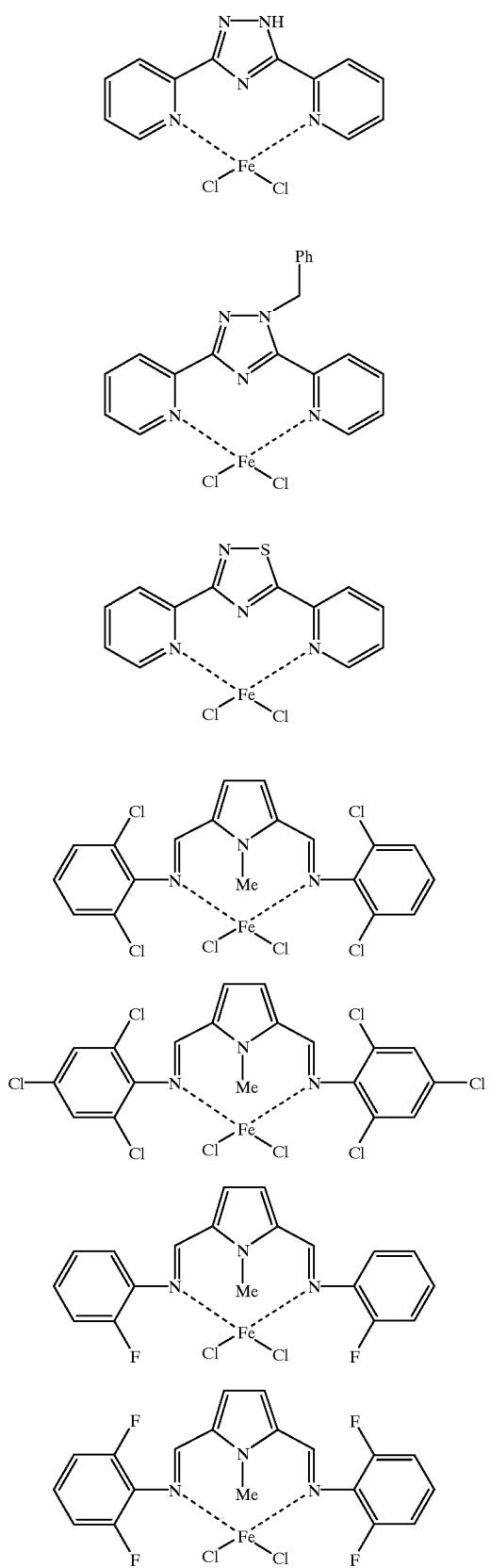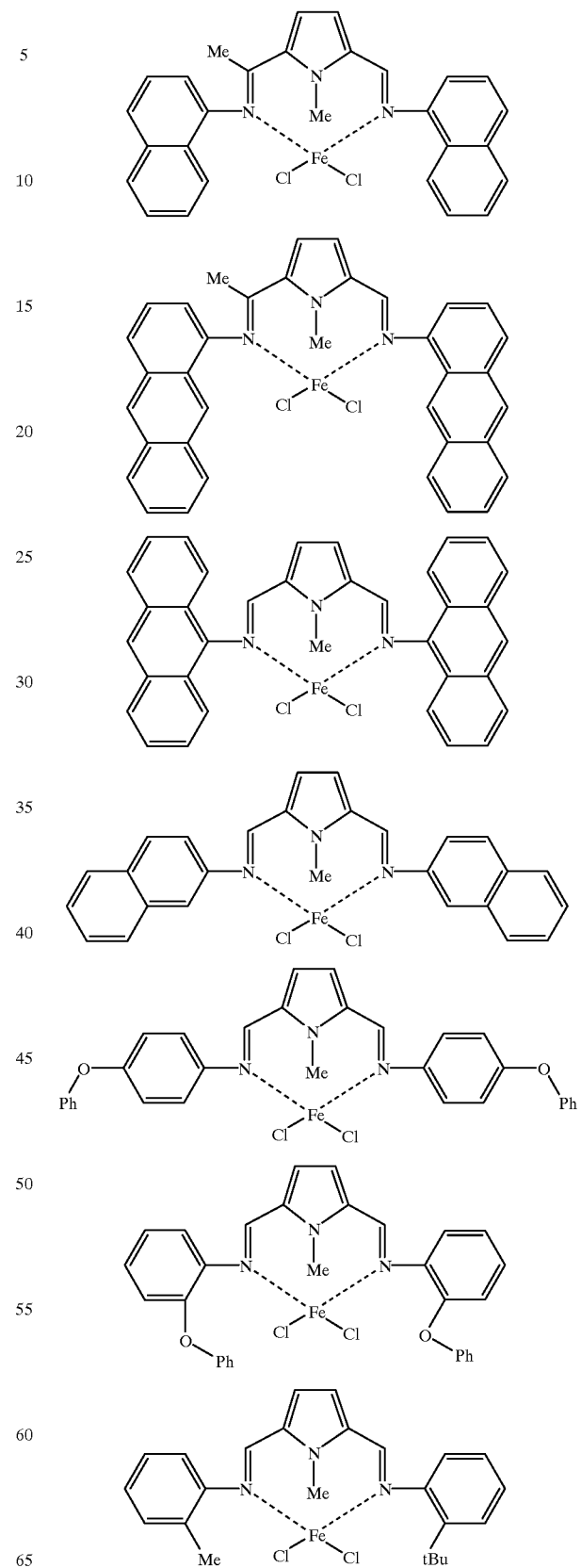

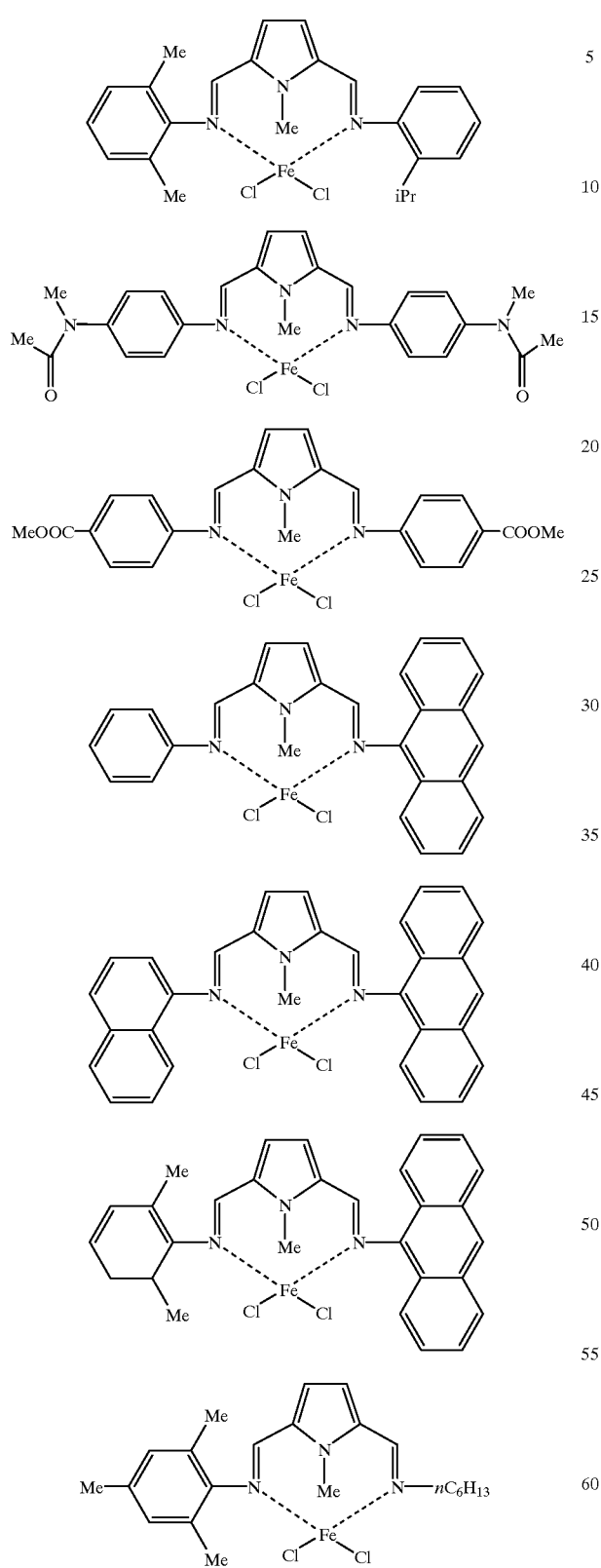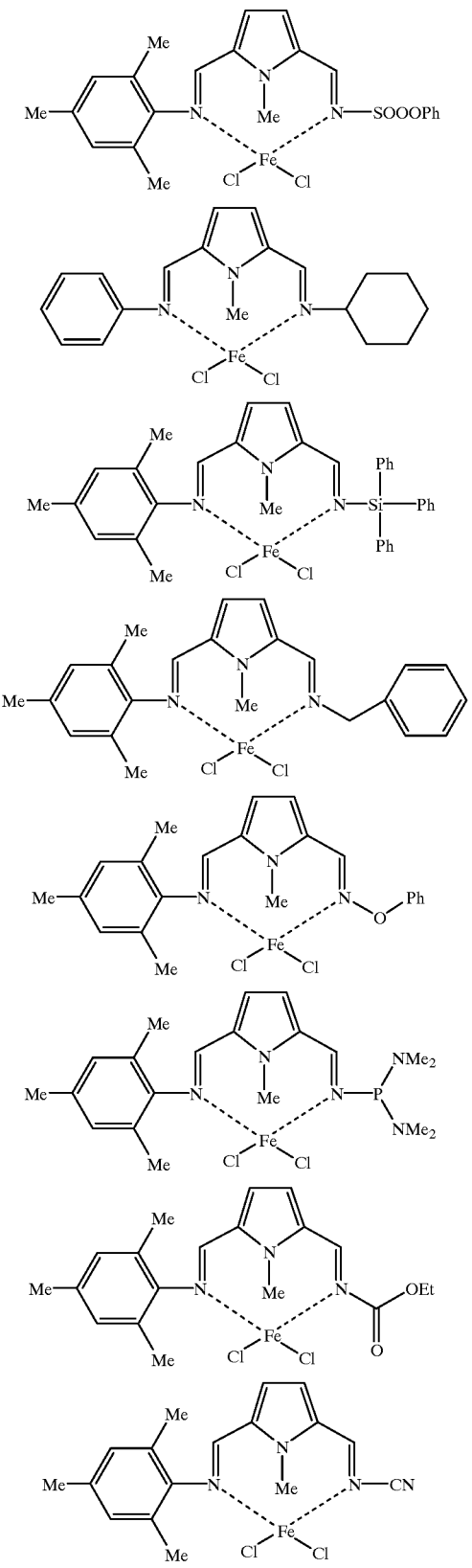

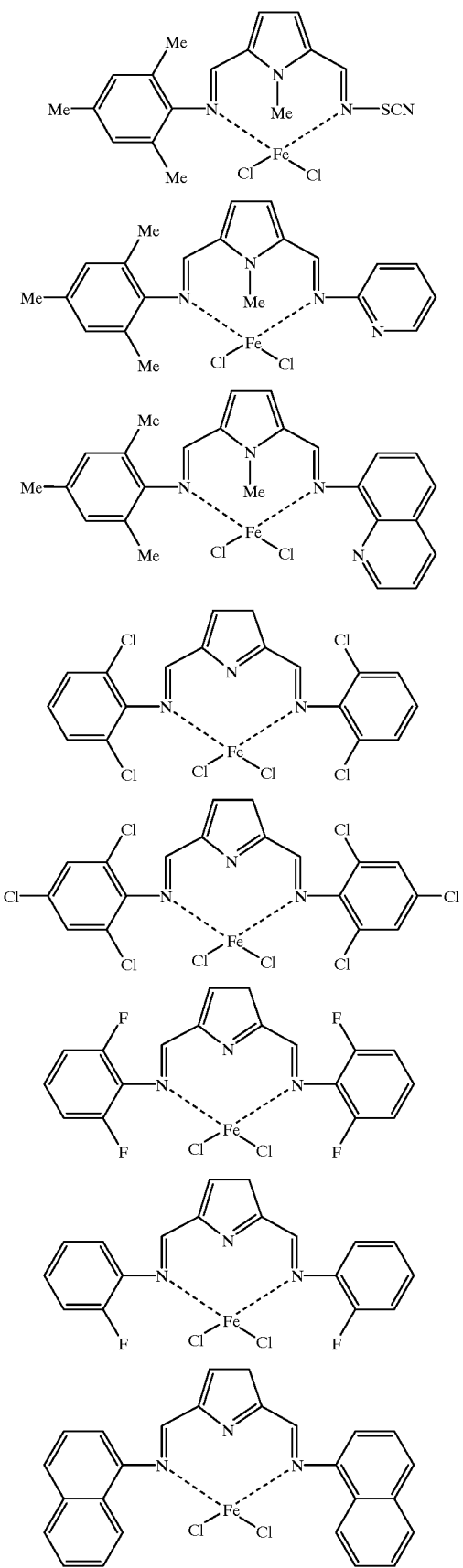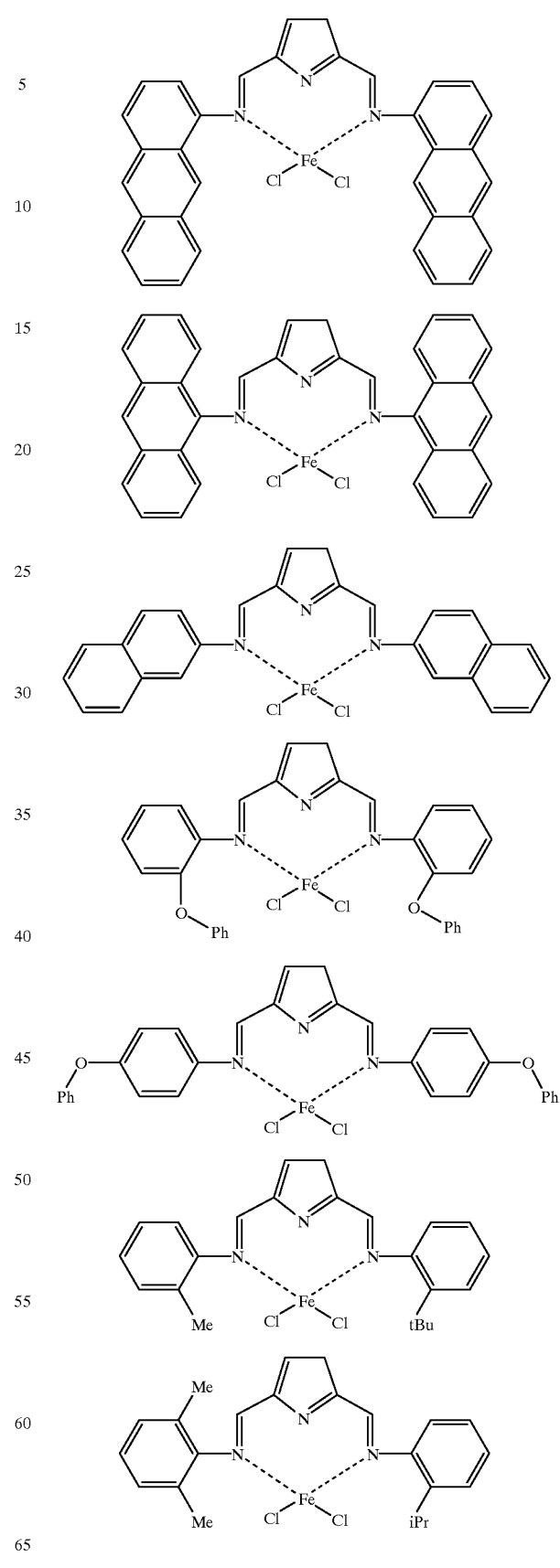

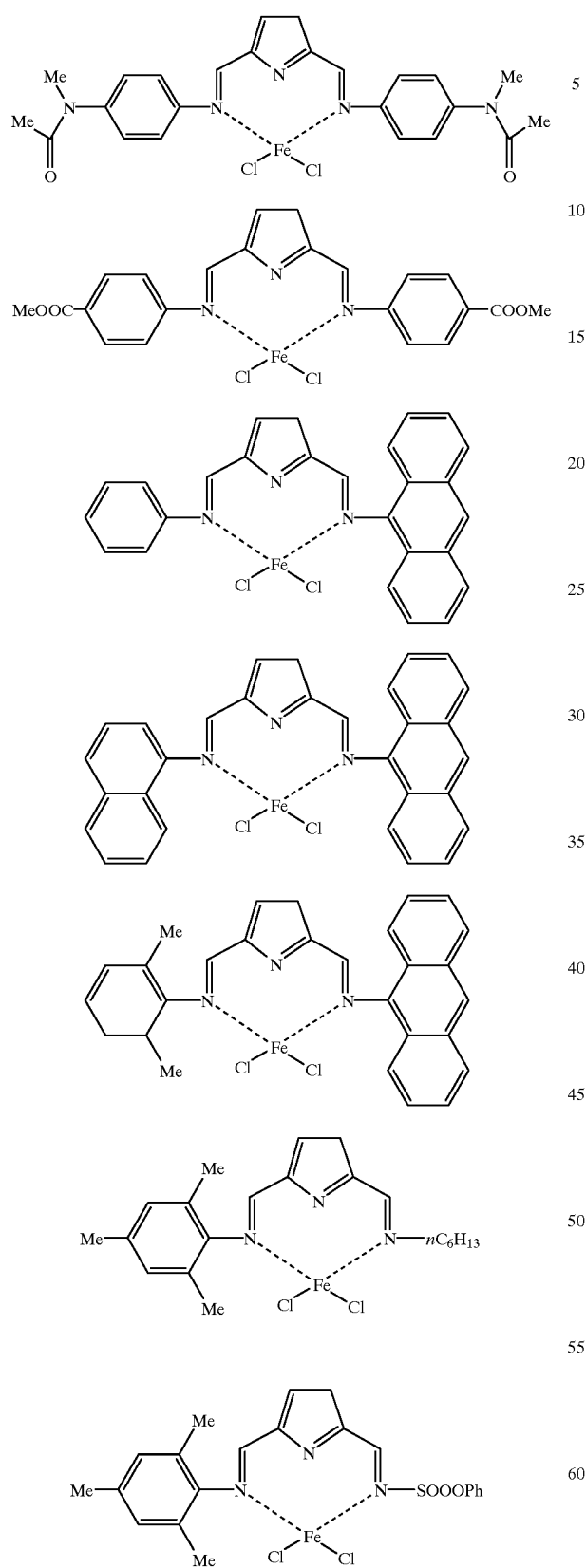
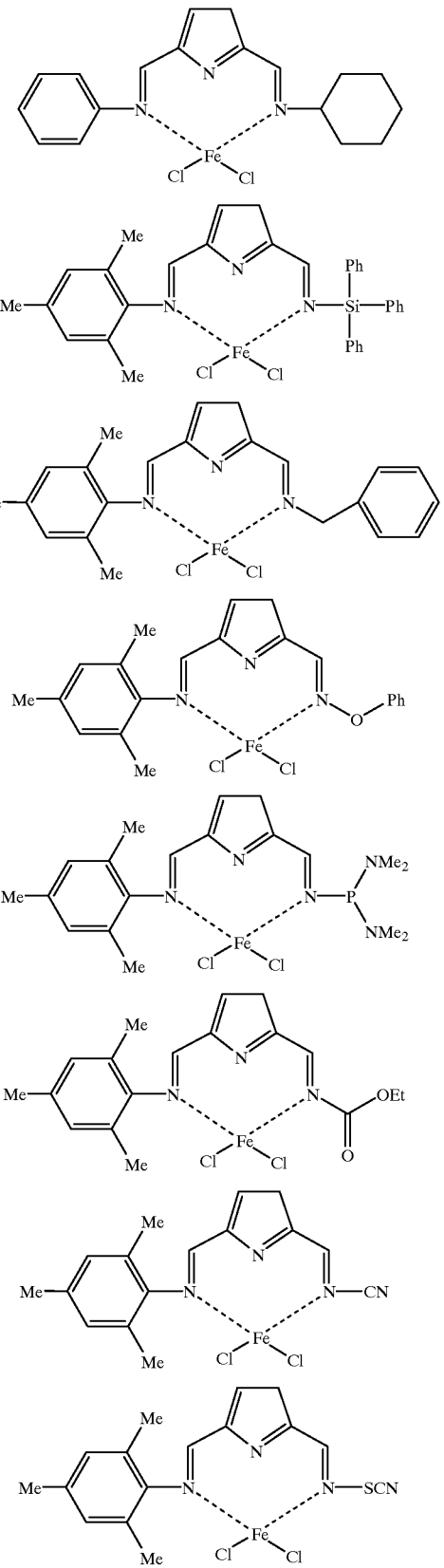

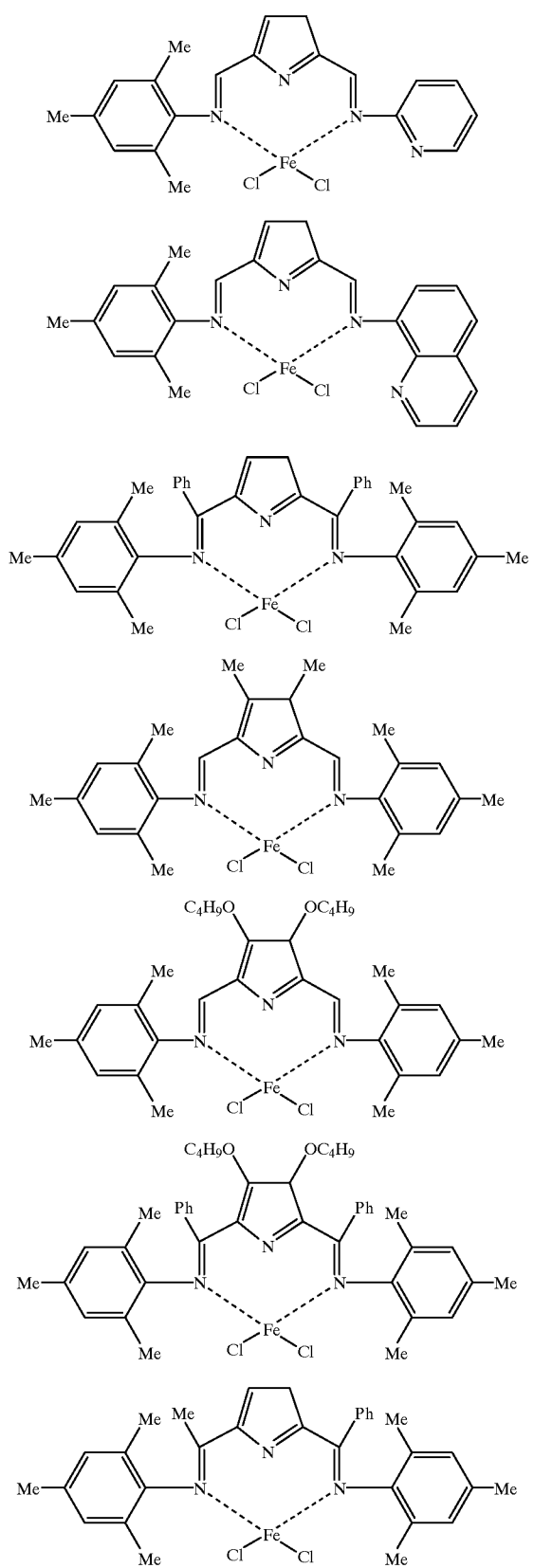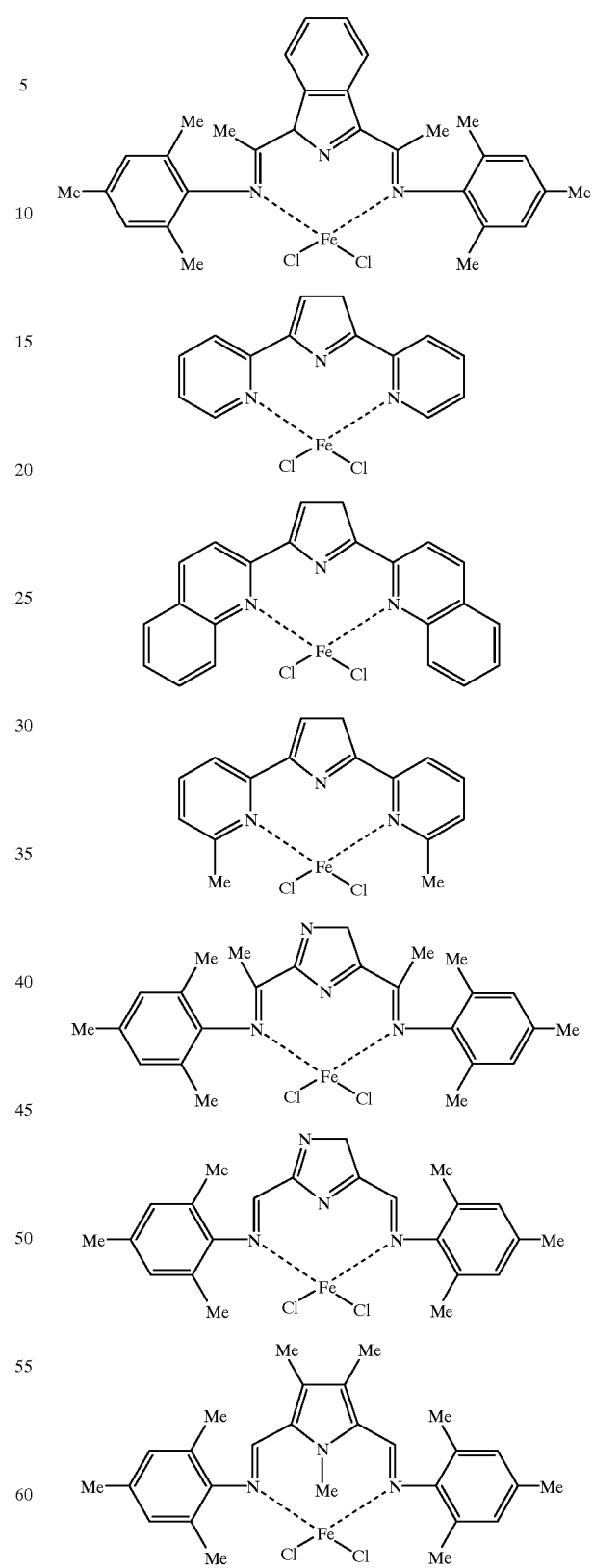

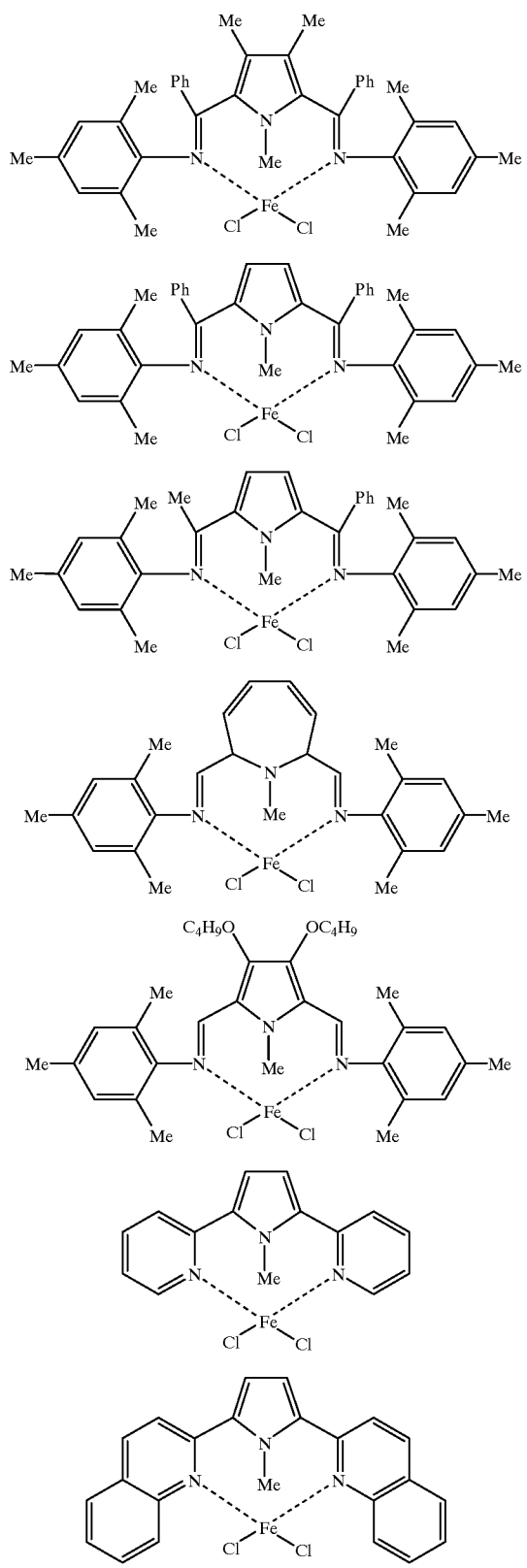
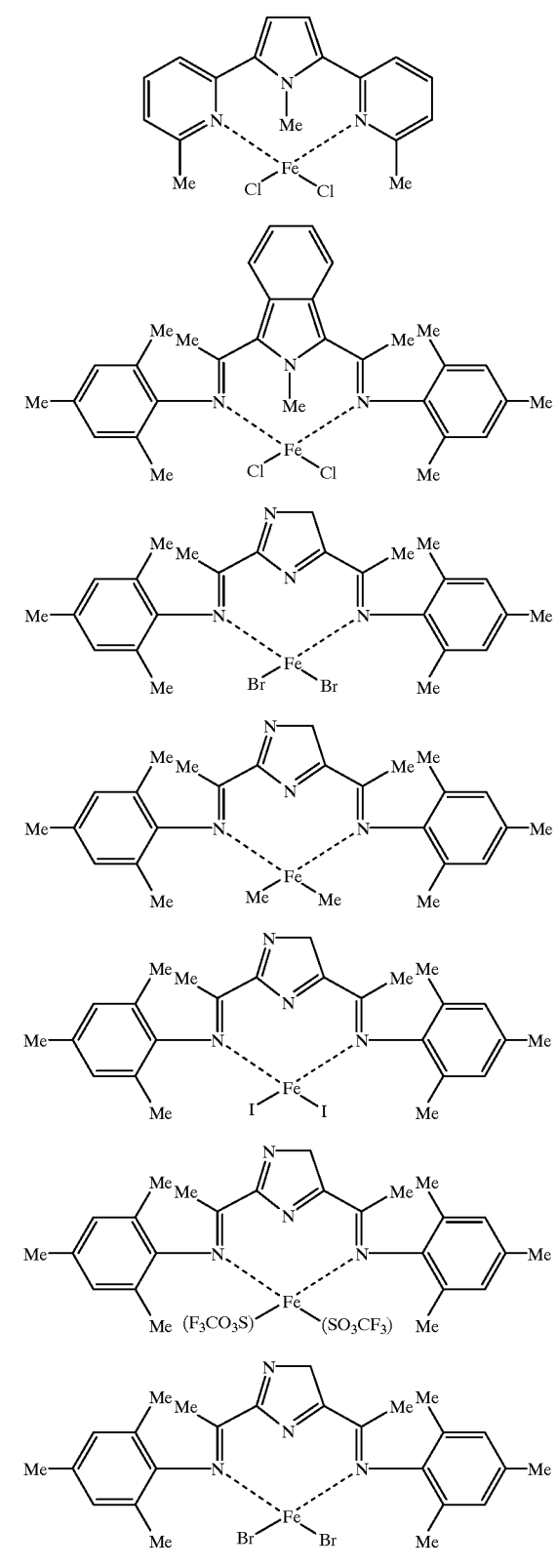

-continued
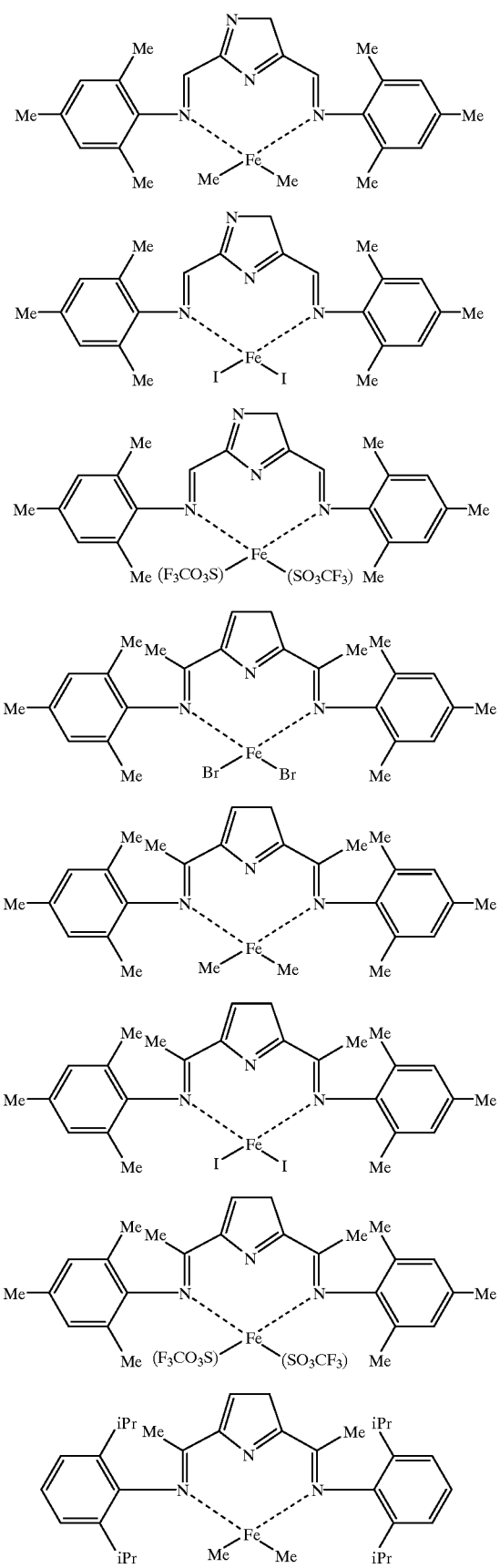
-continued
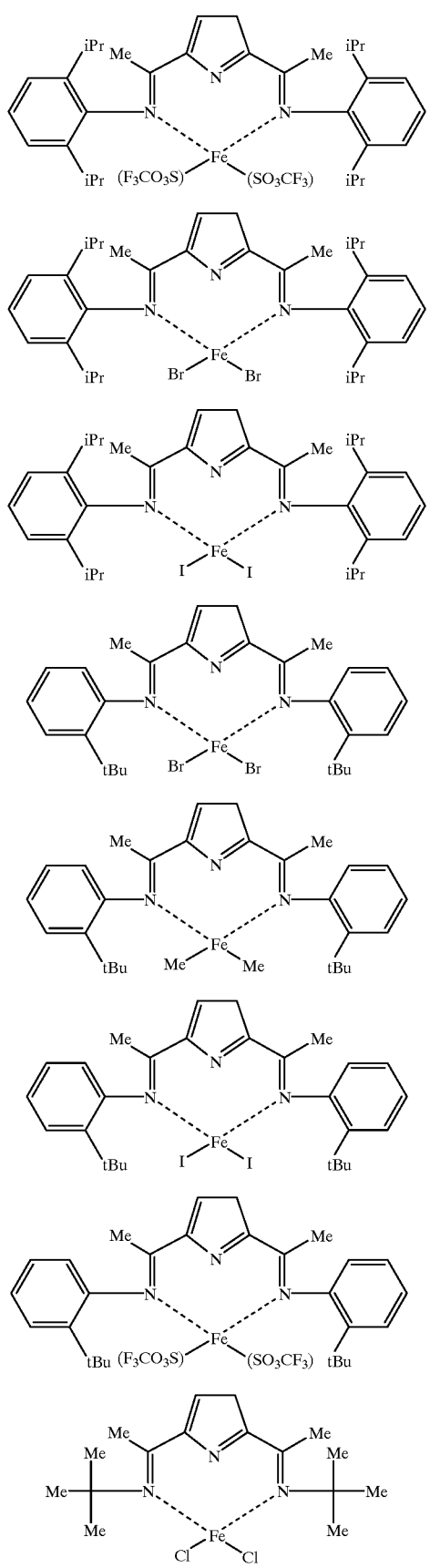

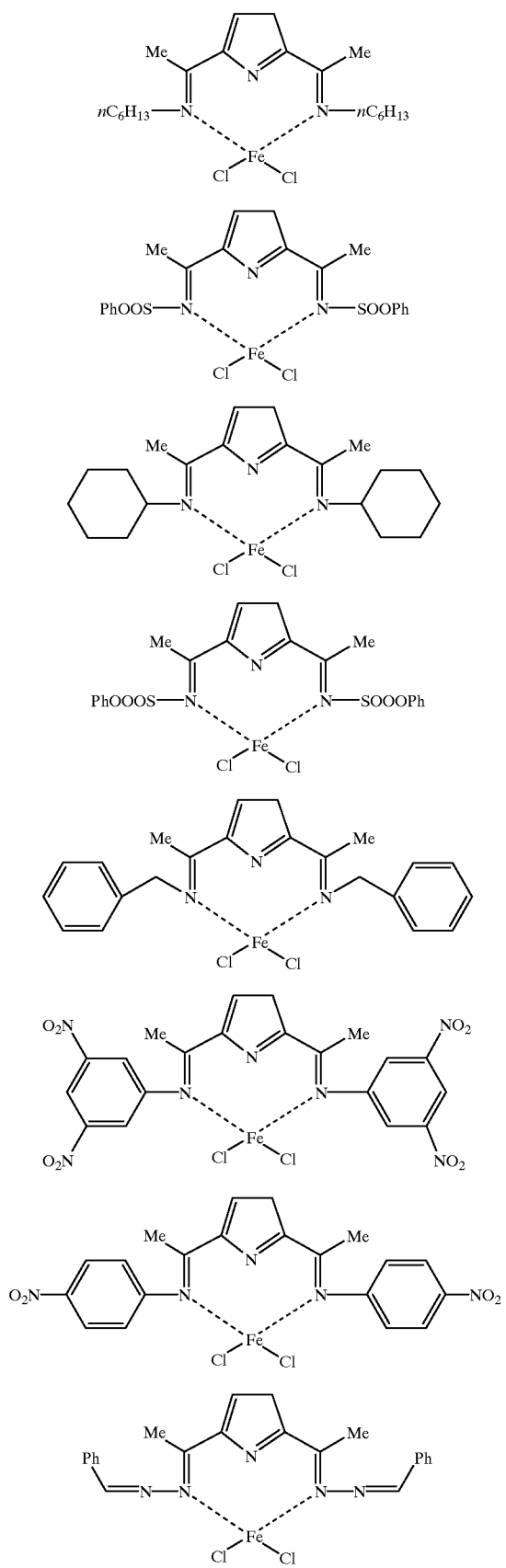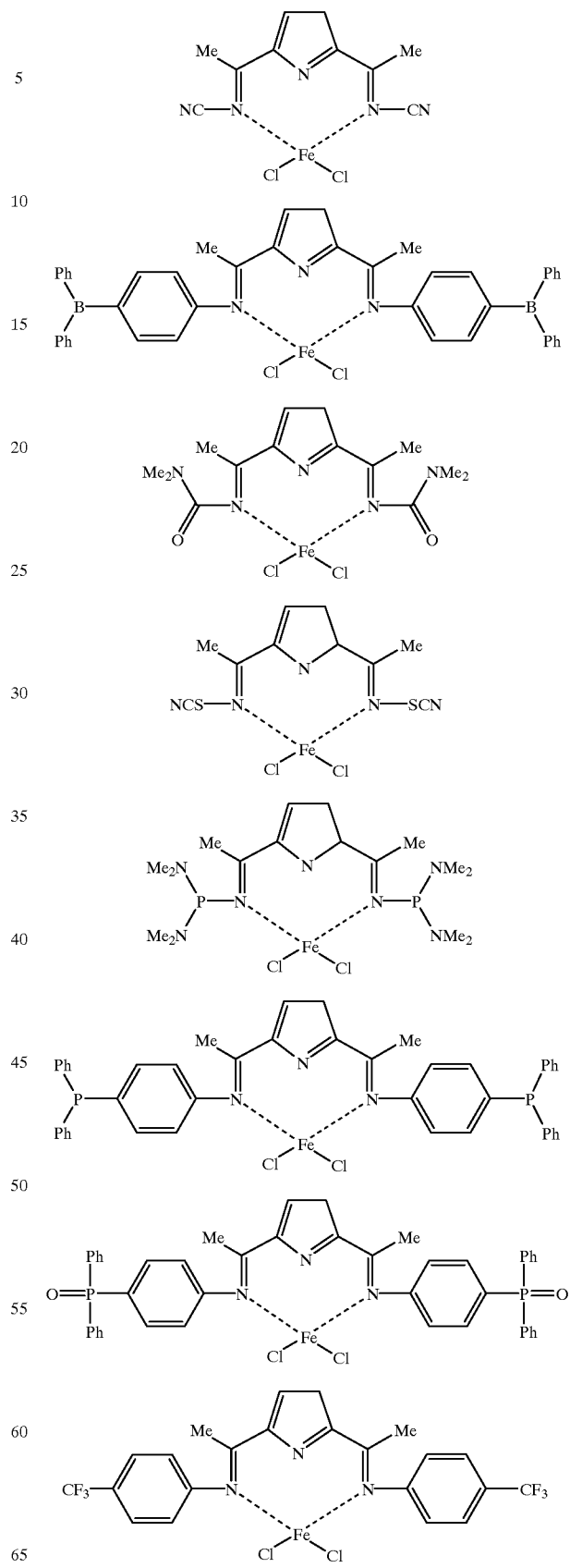

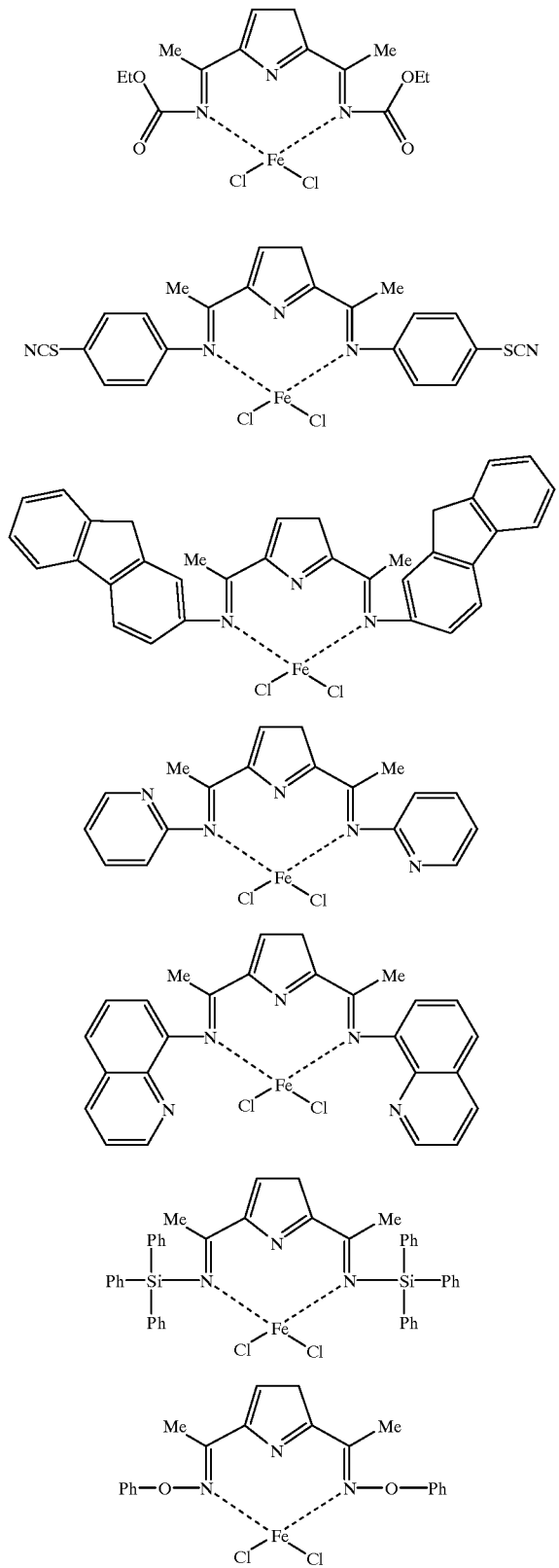
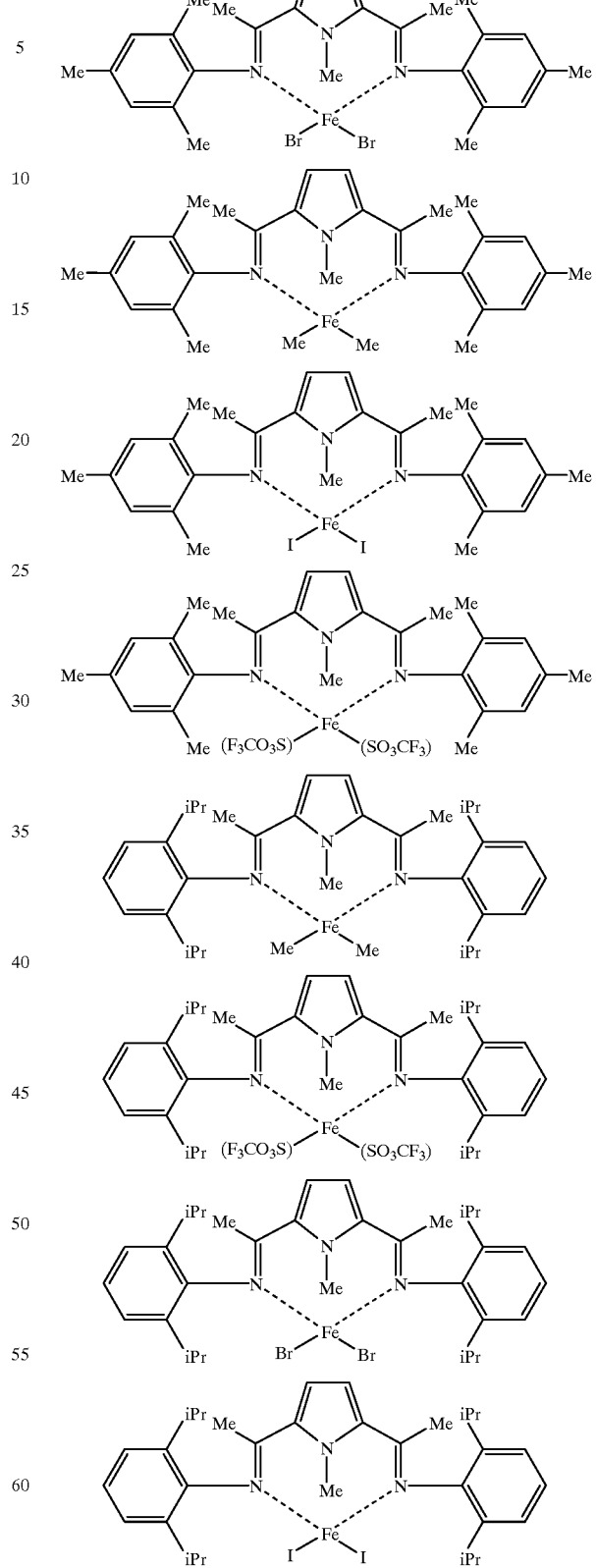

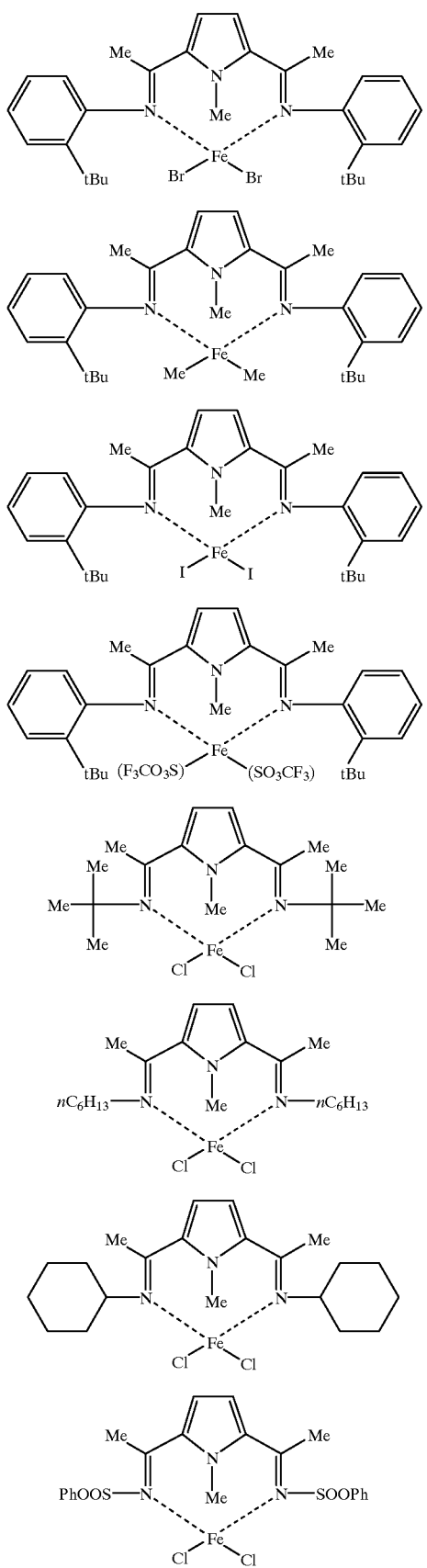
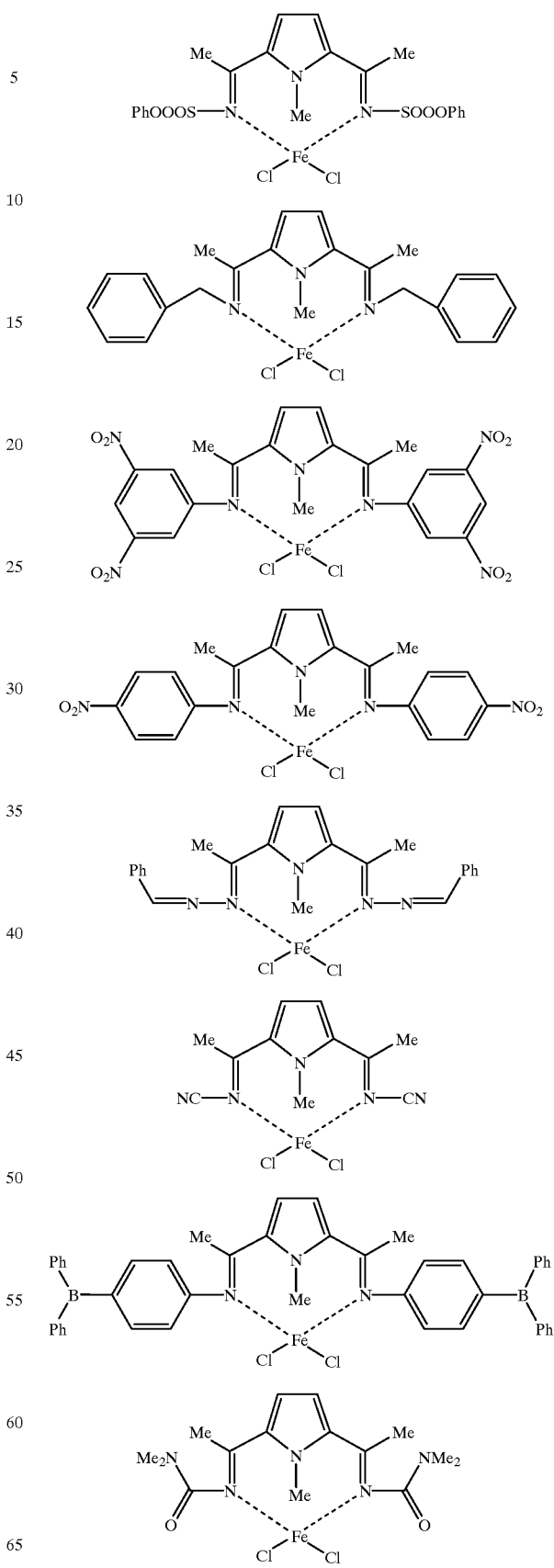

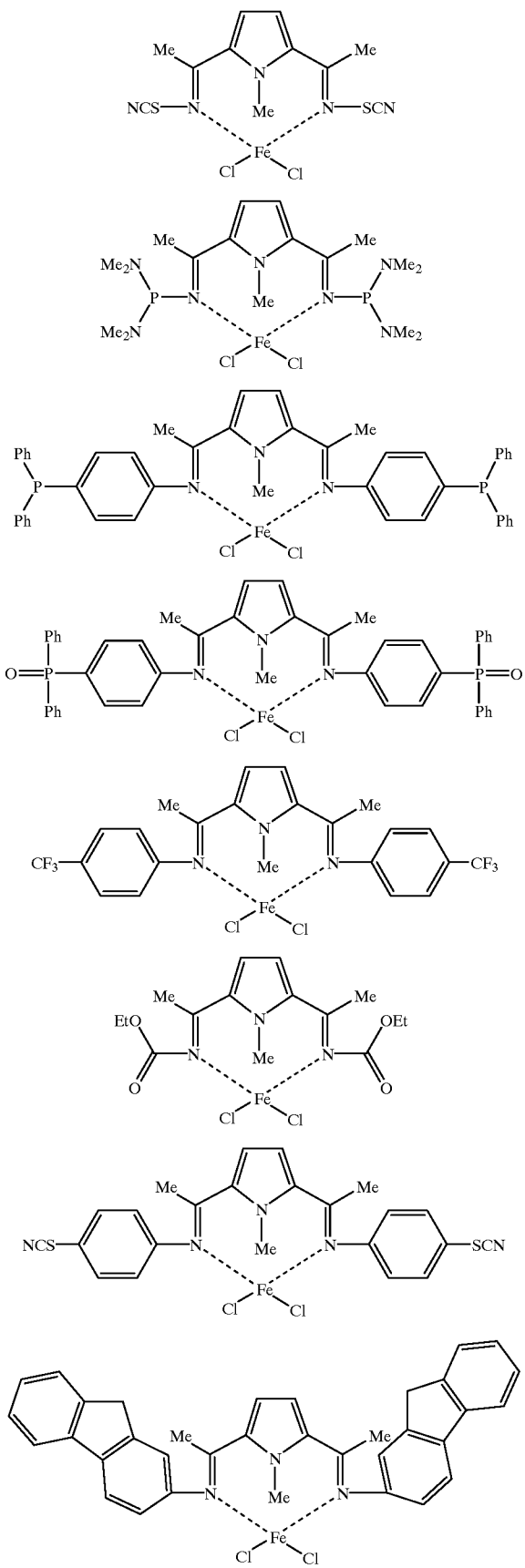
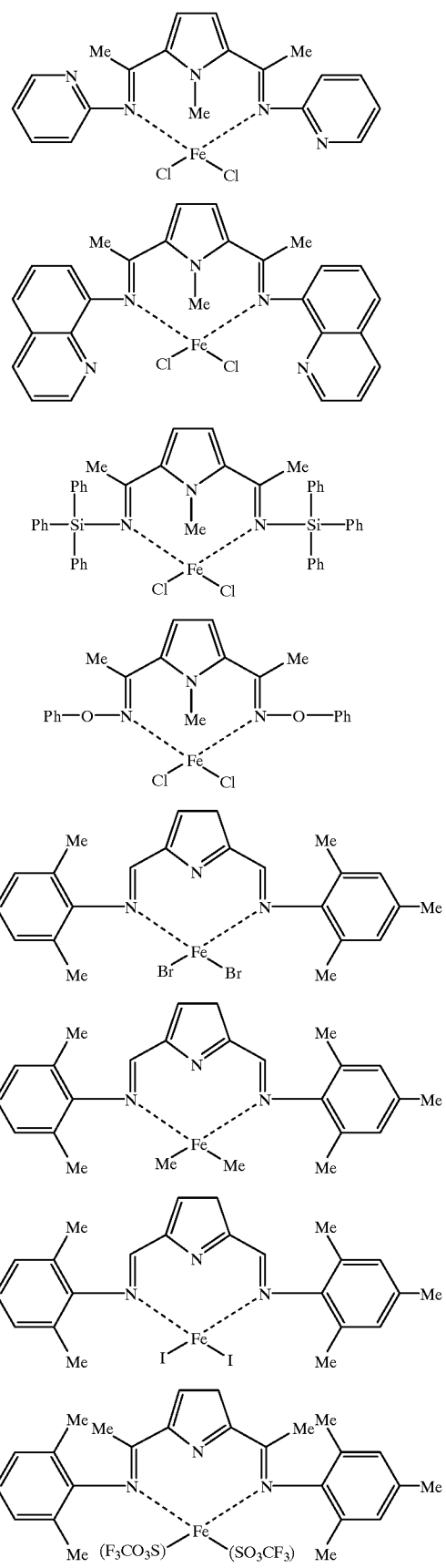

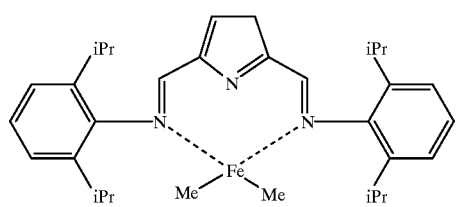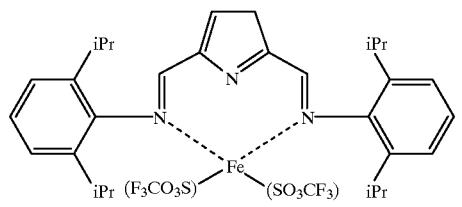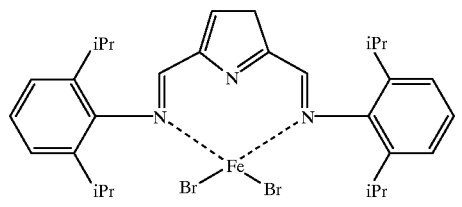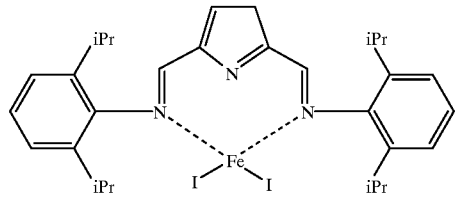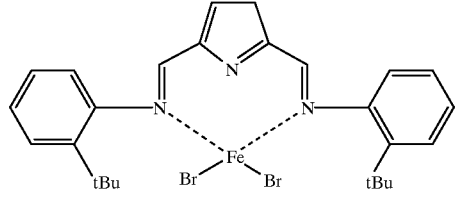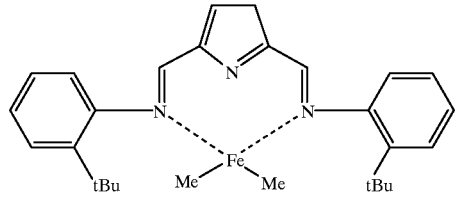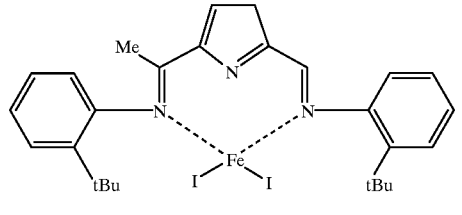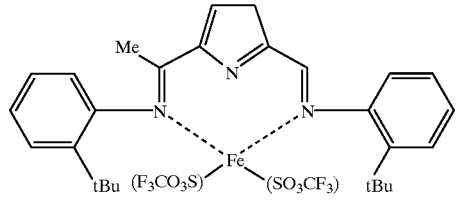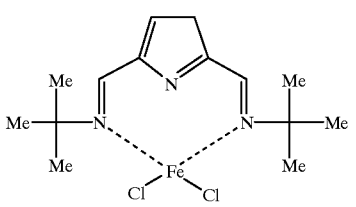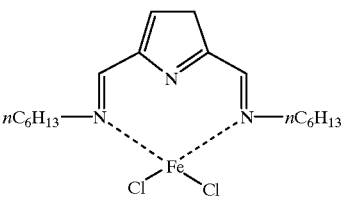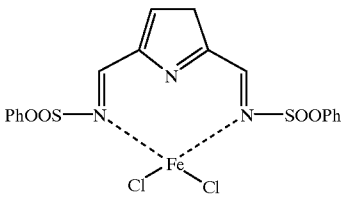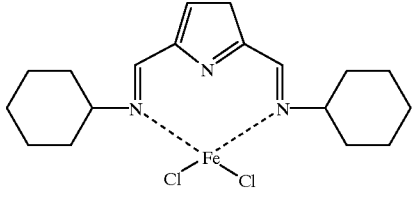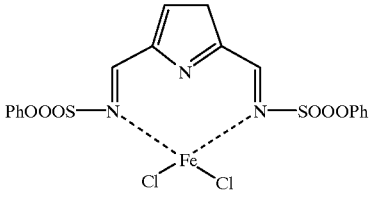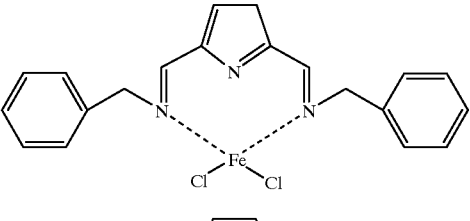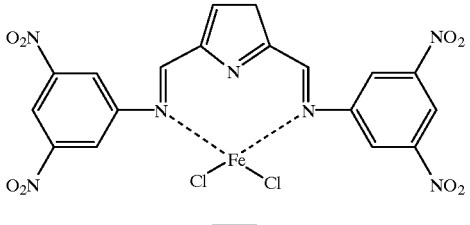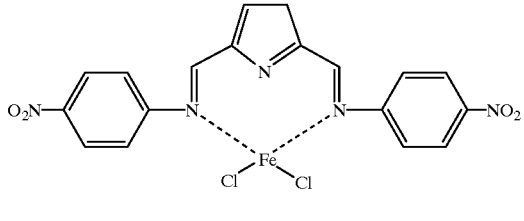

-continued
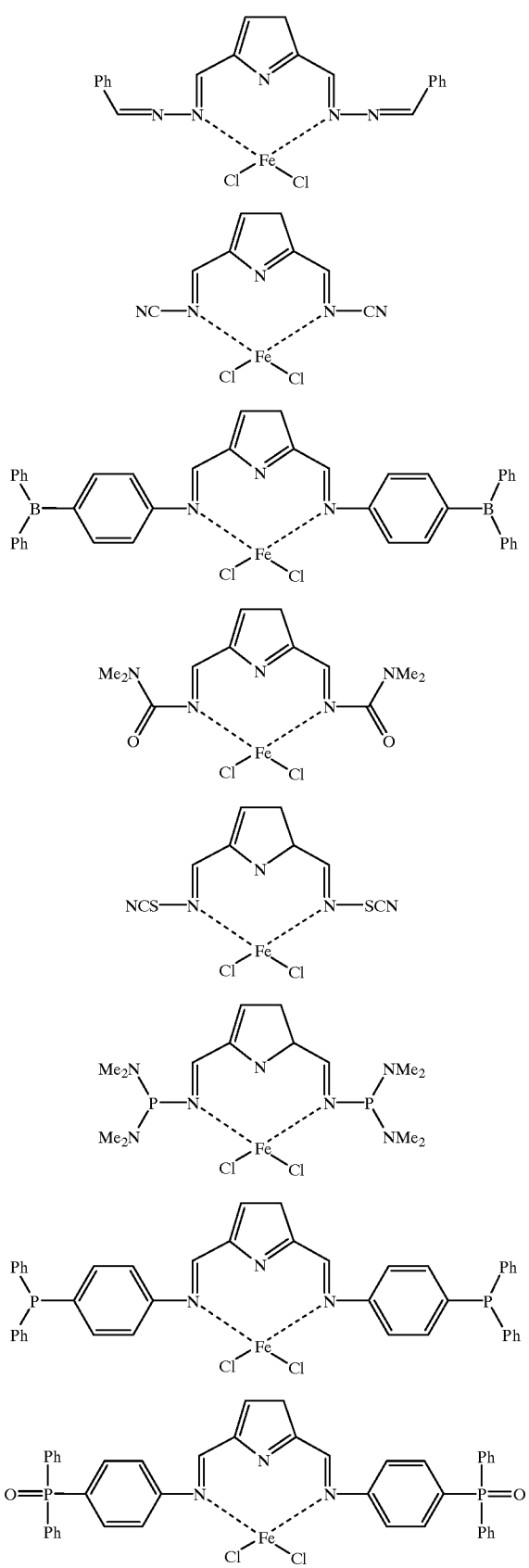
-continued
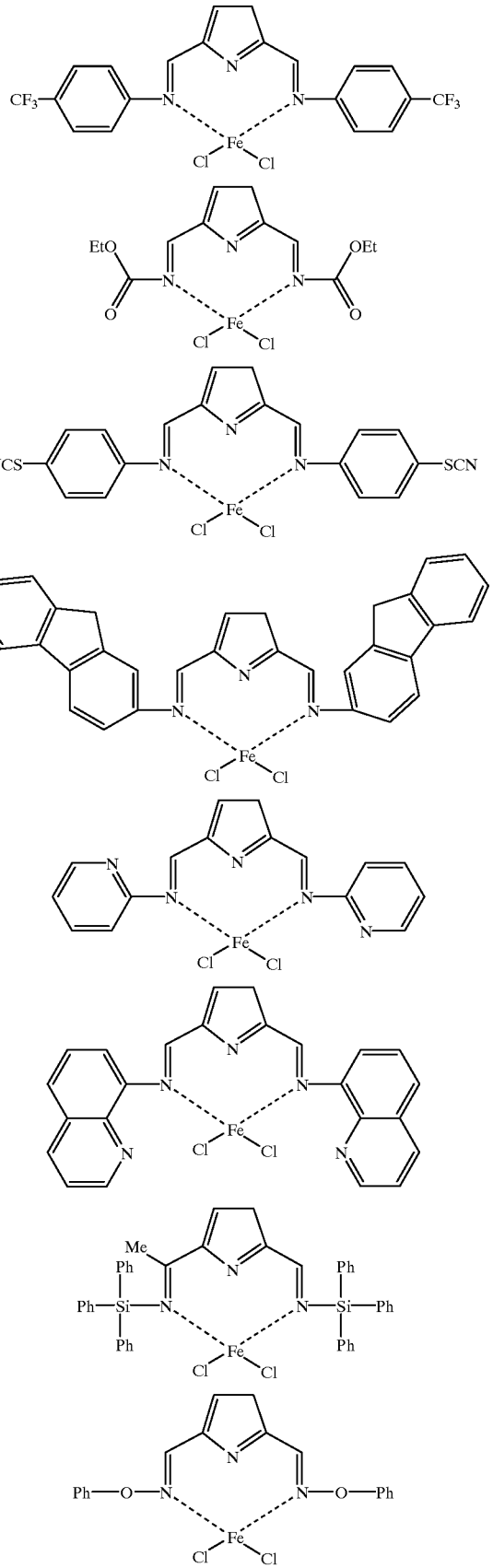

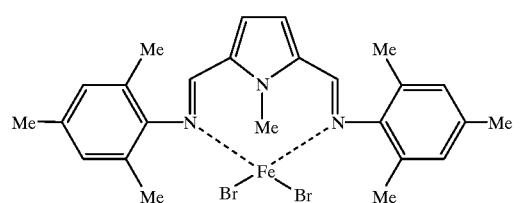
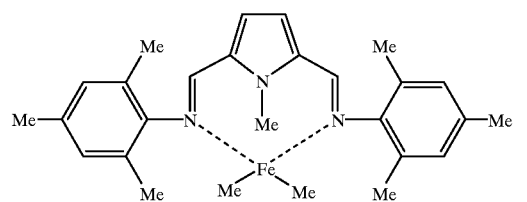
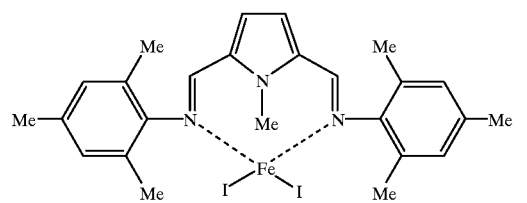
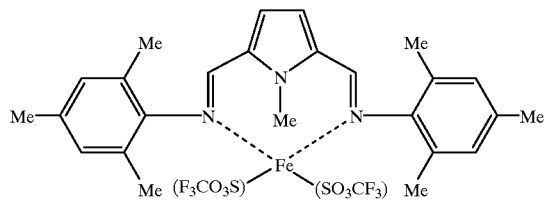
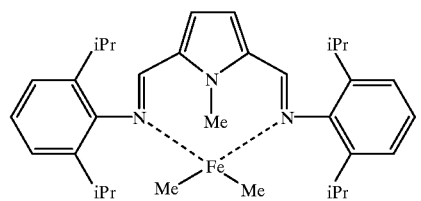
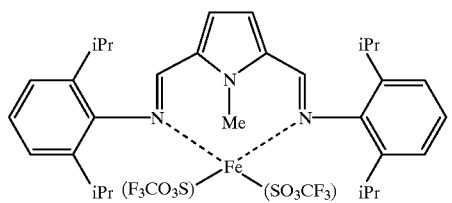
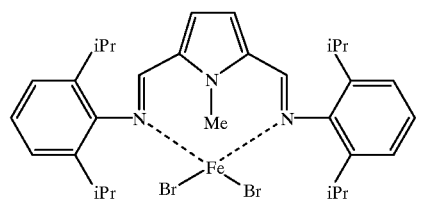
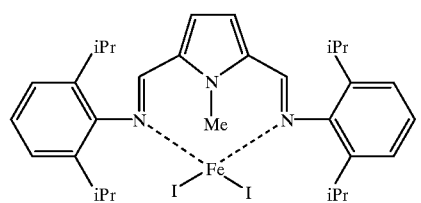
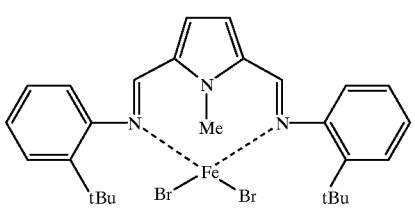
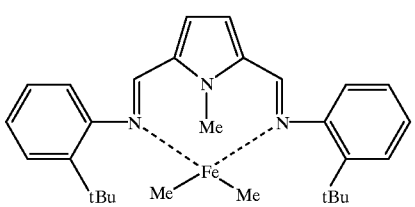
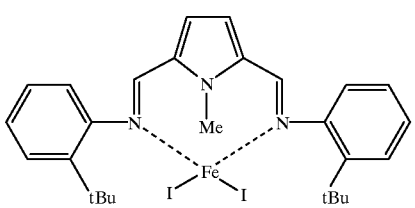
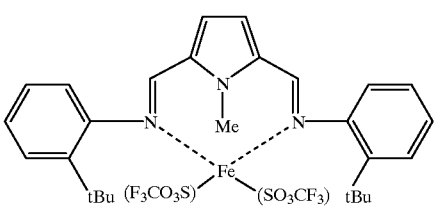
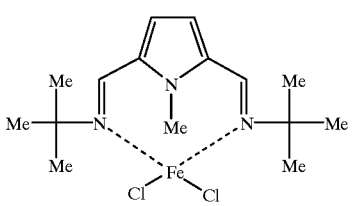
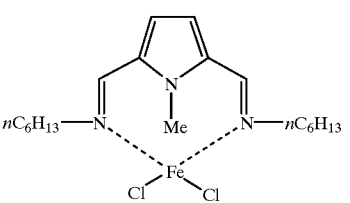
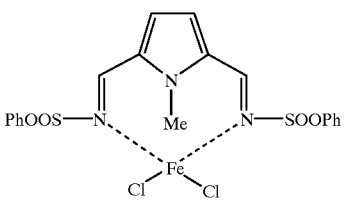
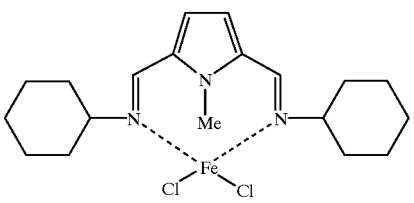

-continued
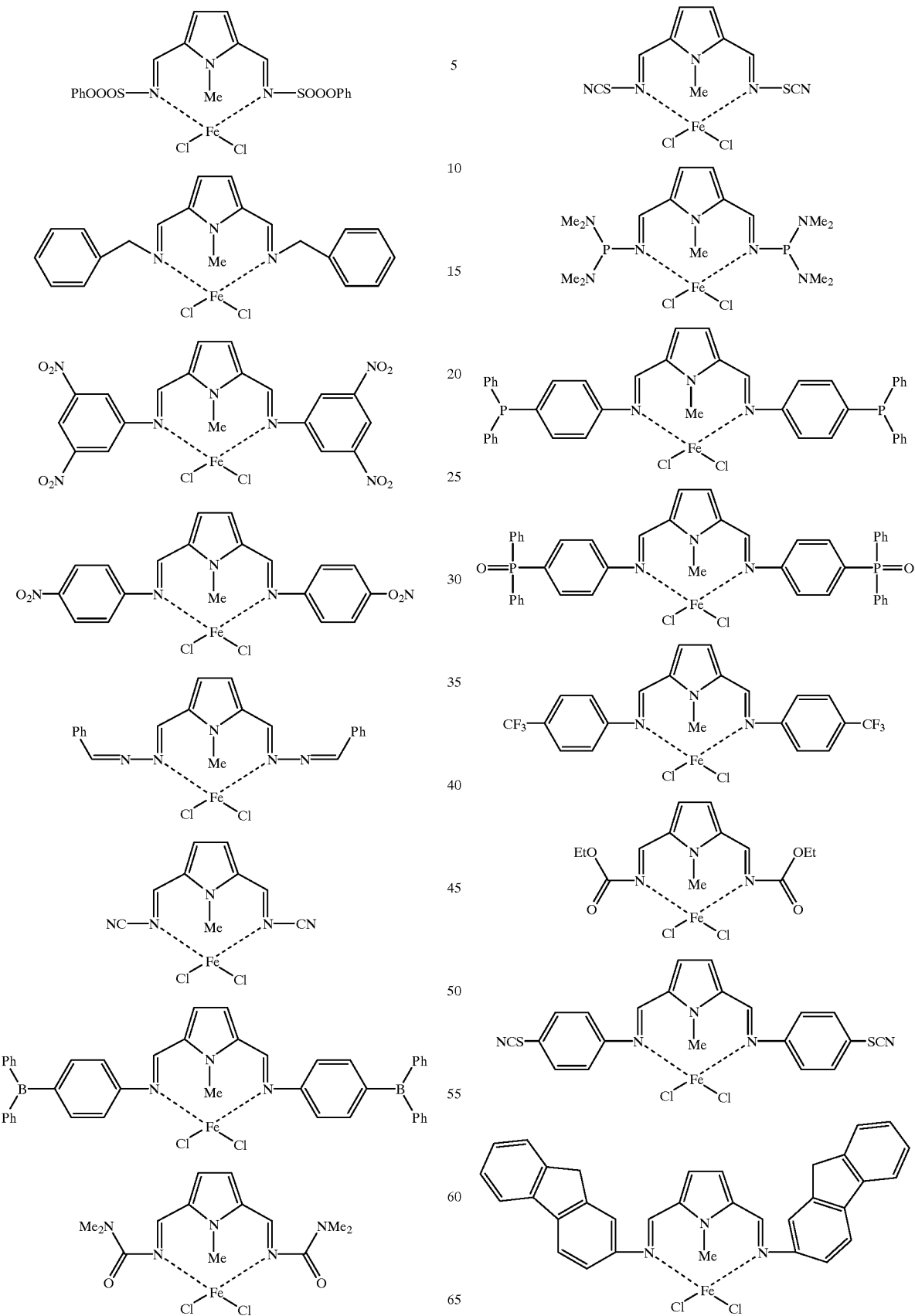

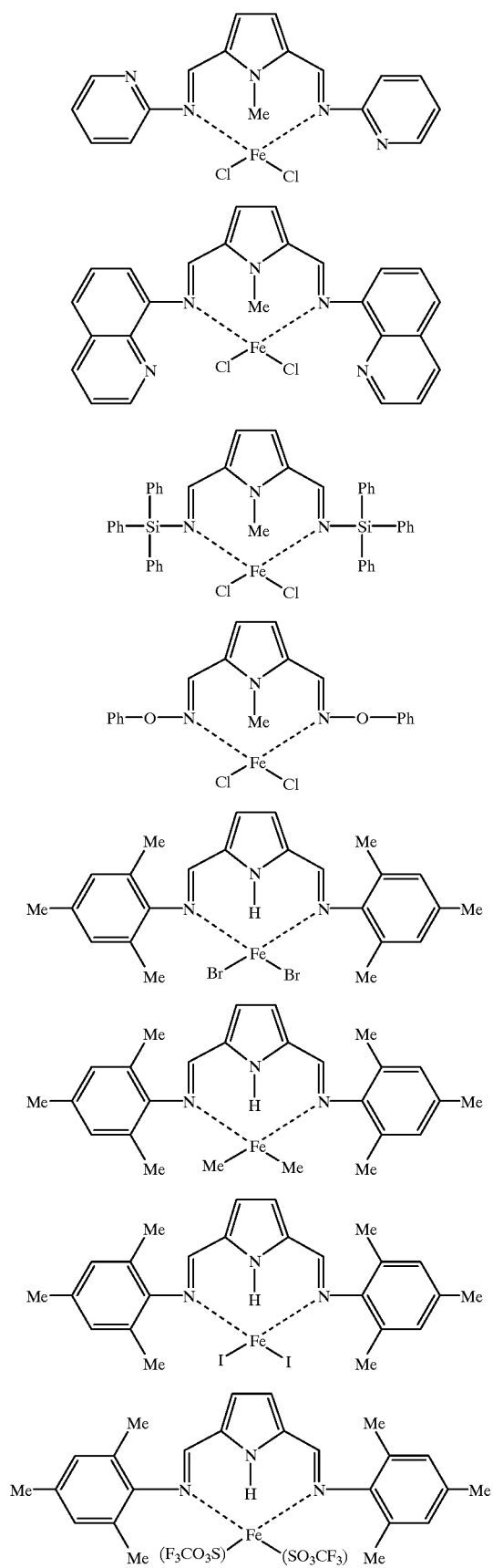
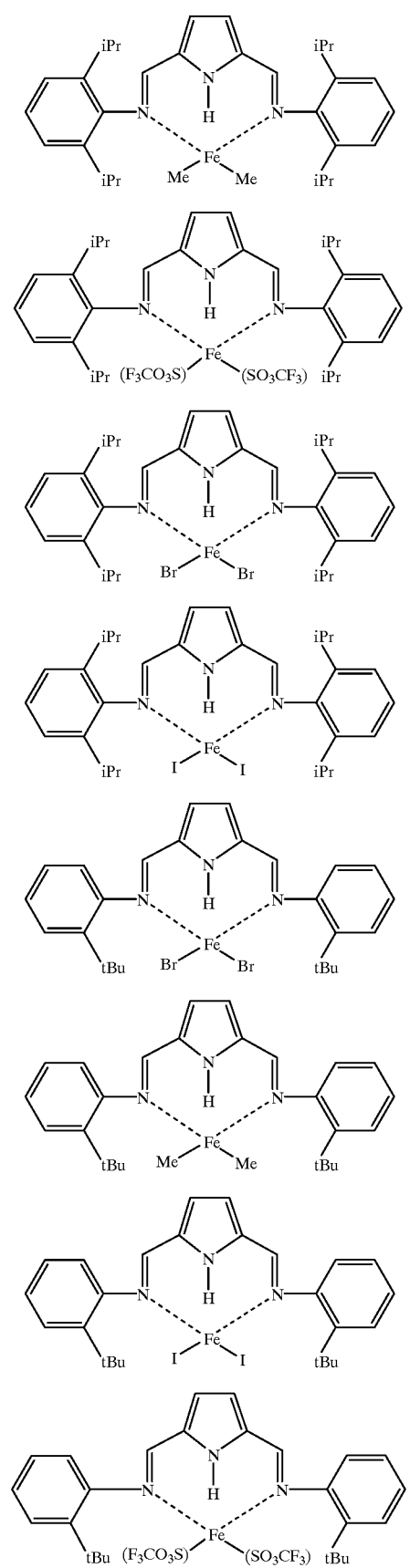

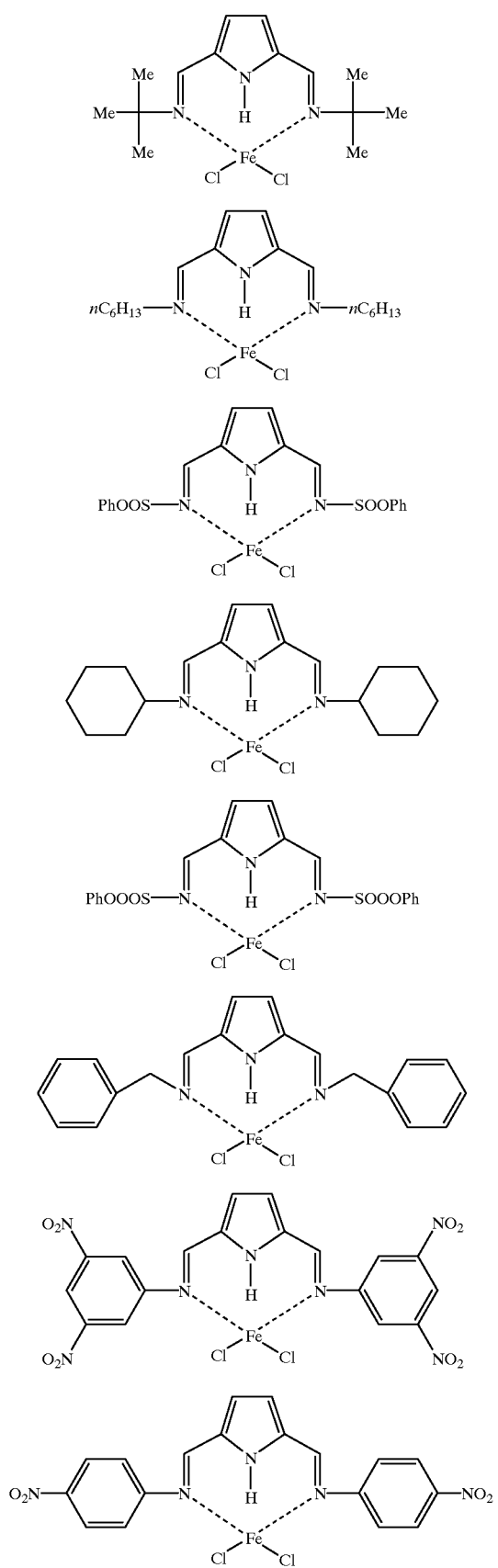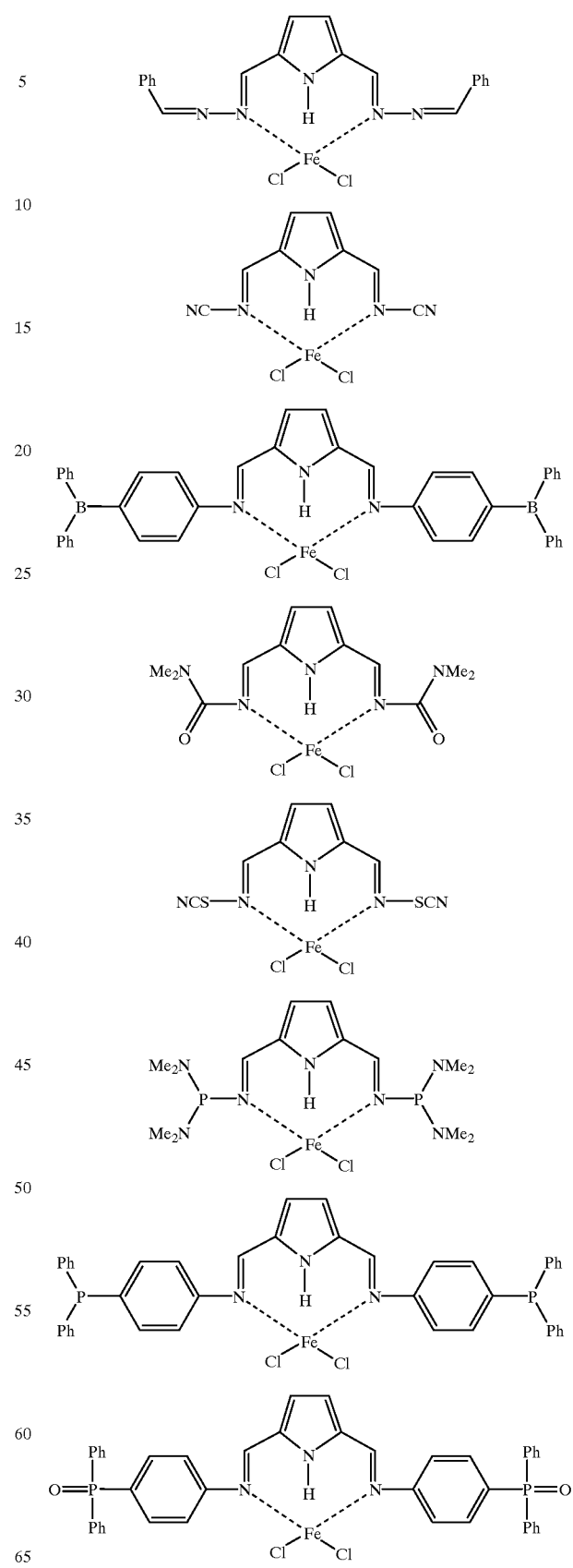

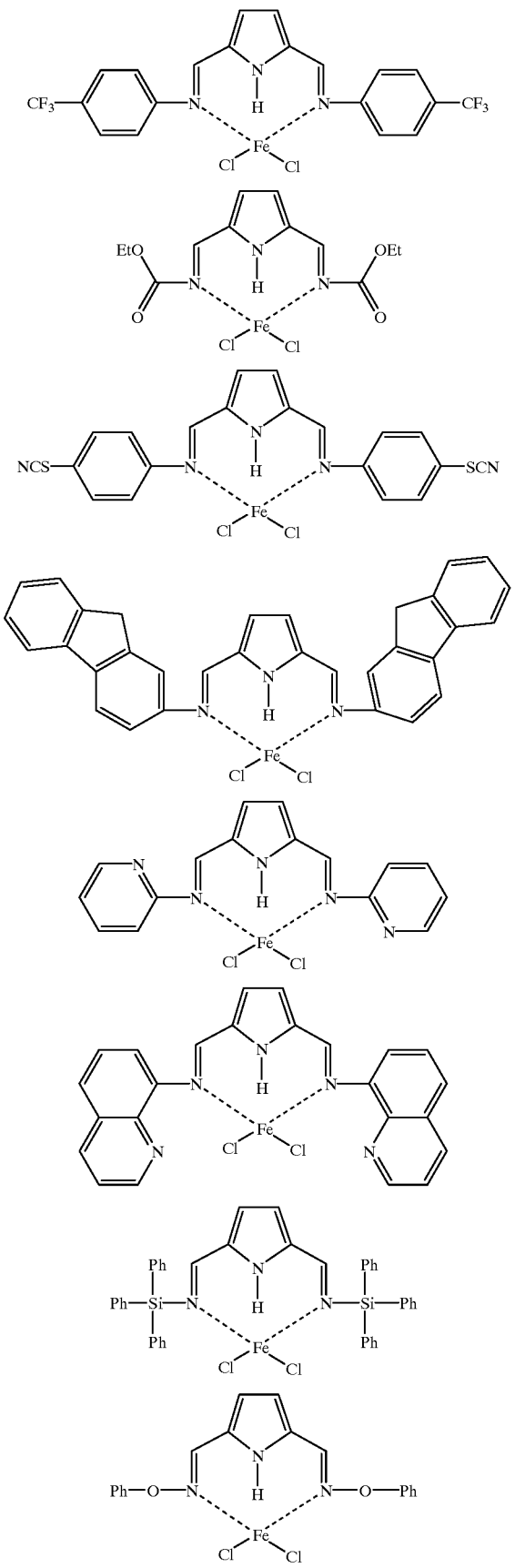
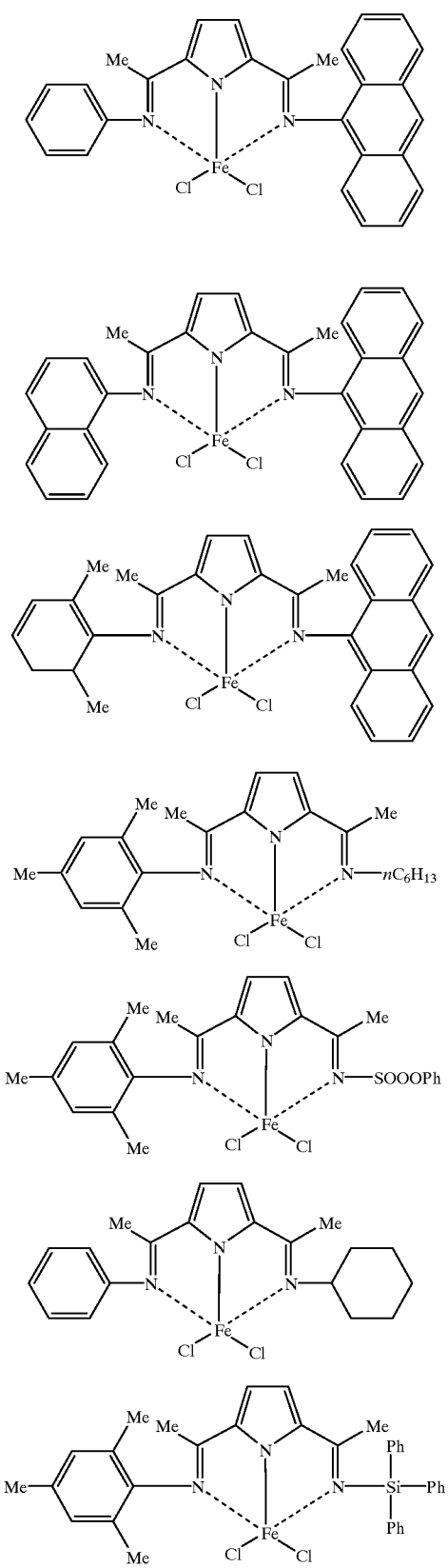

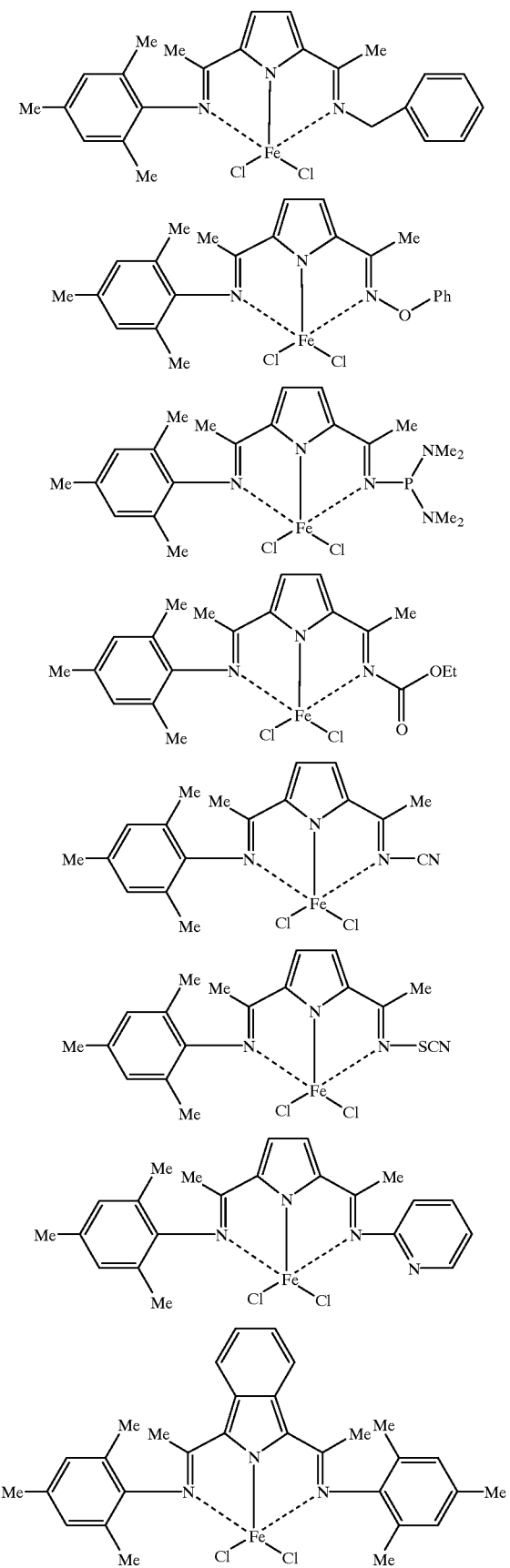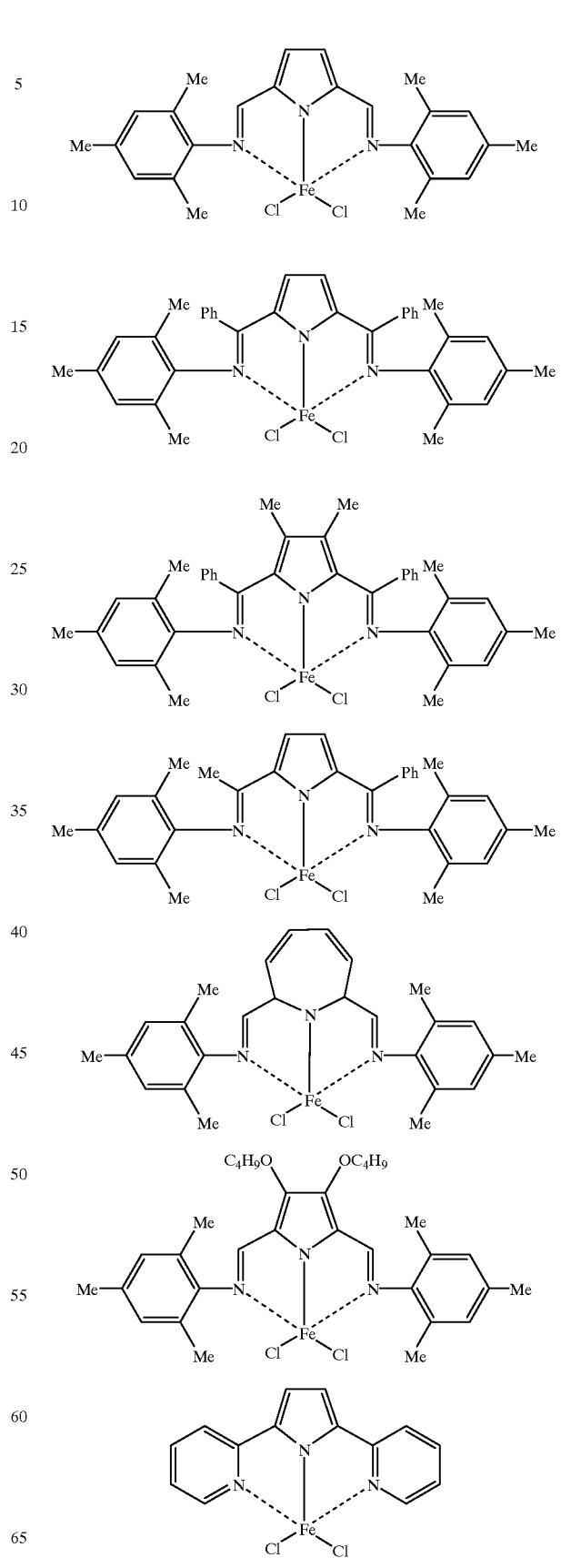

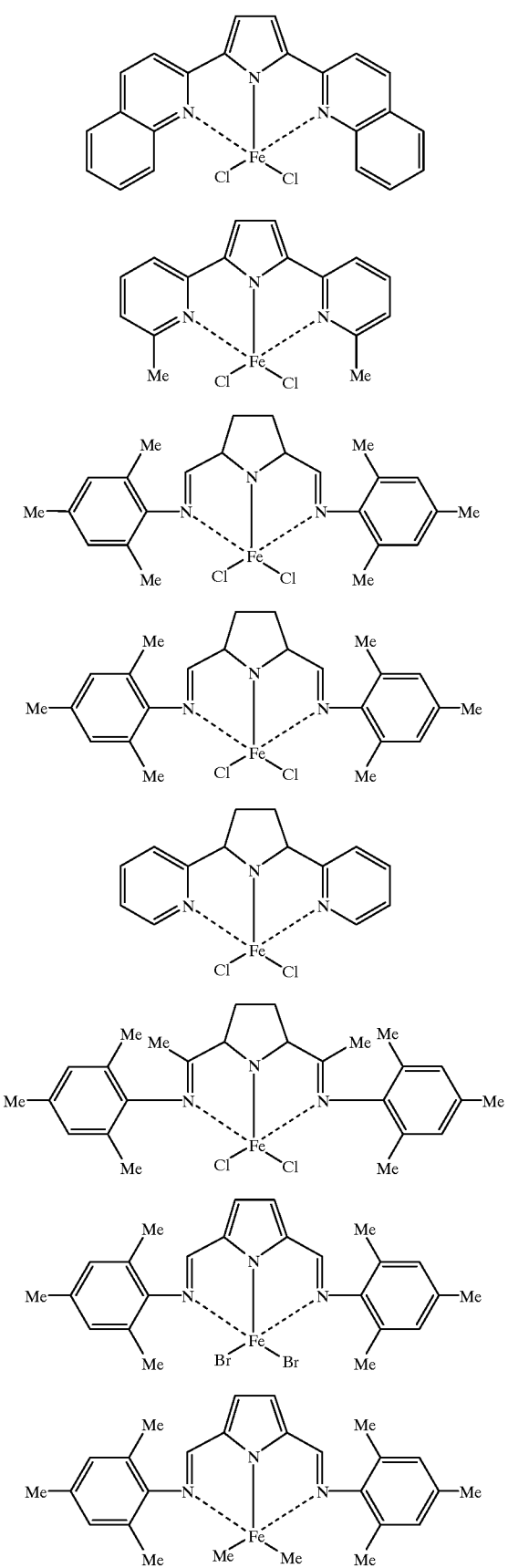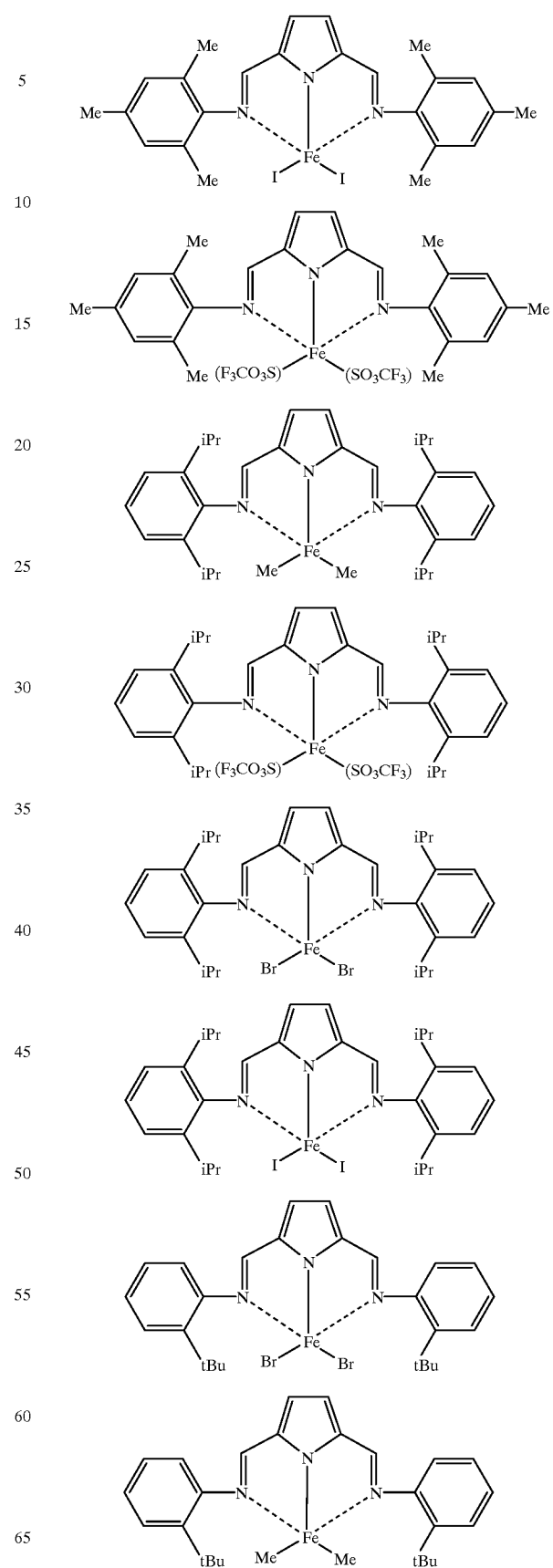

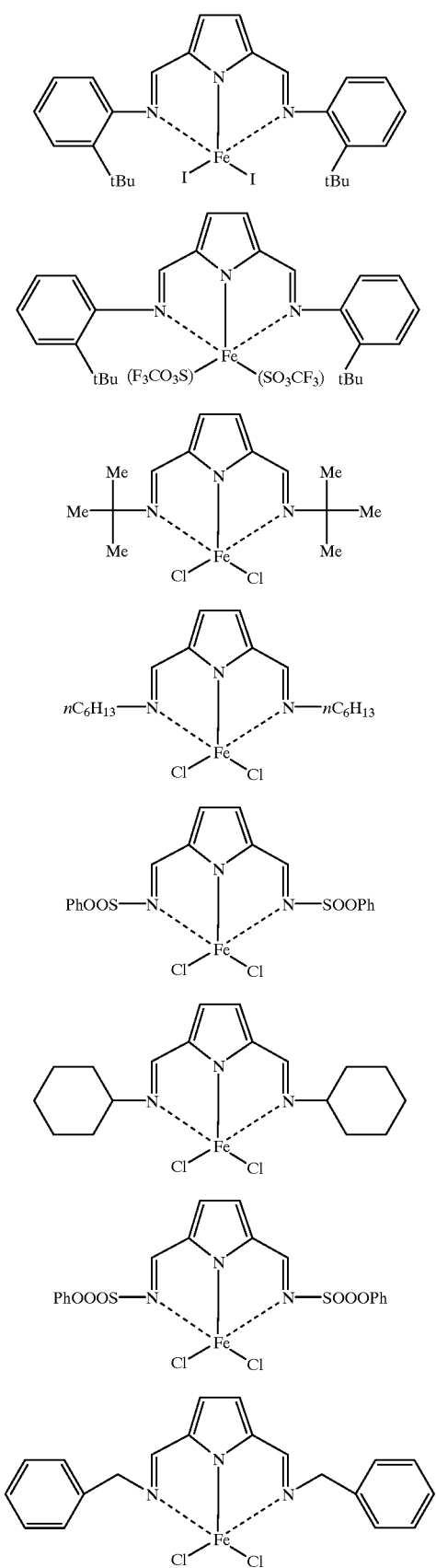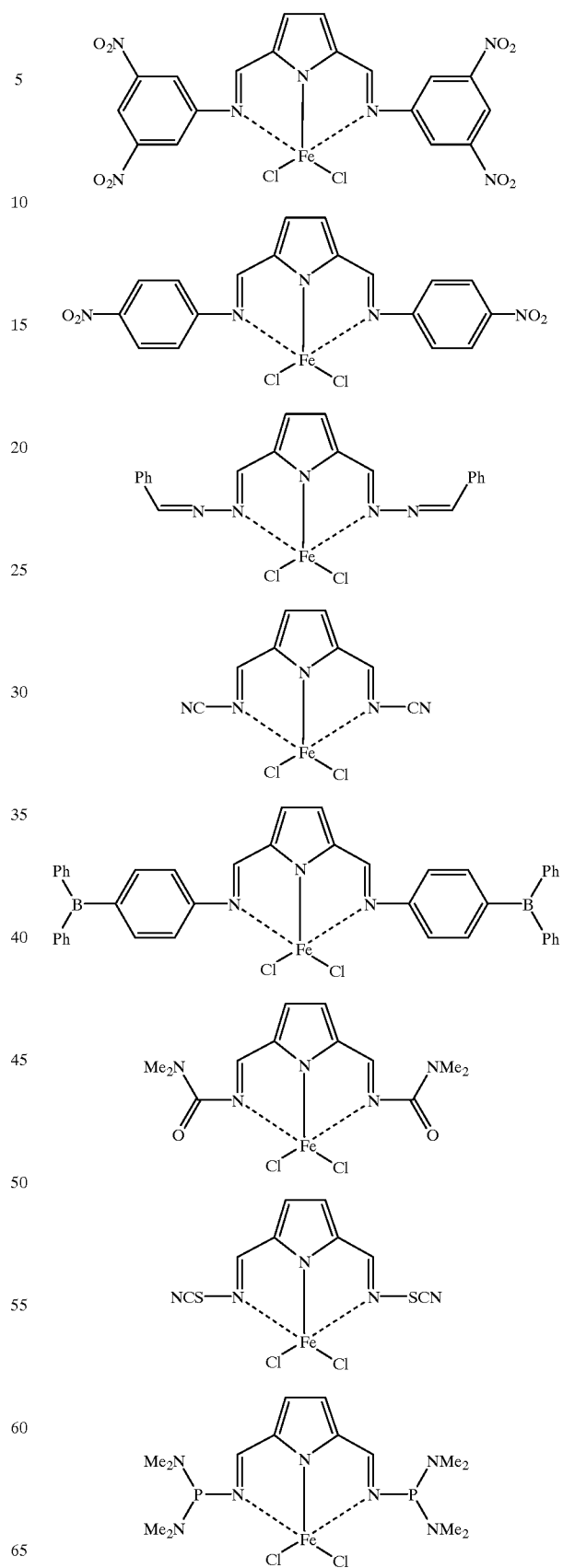

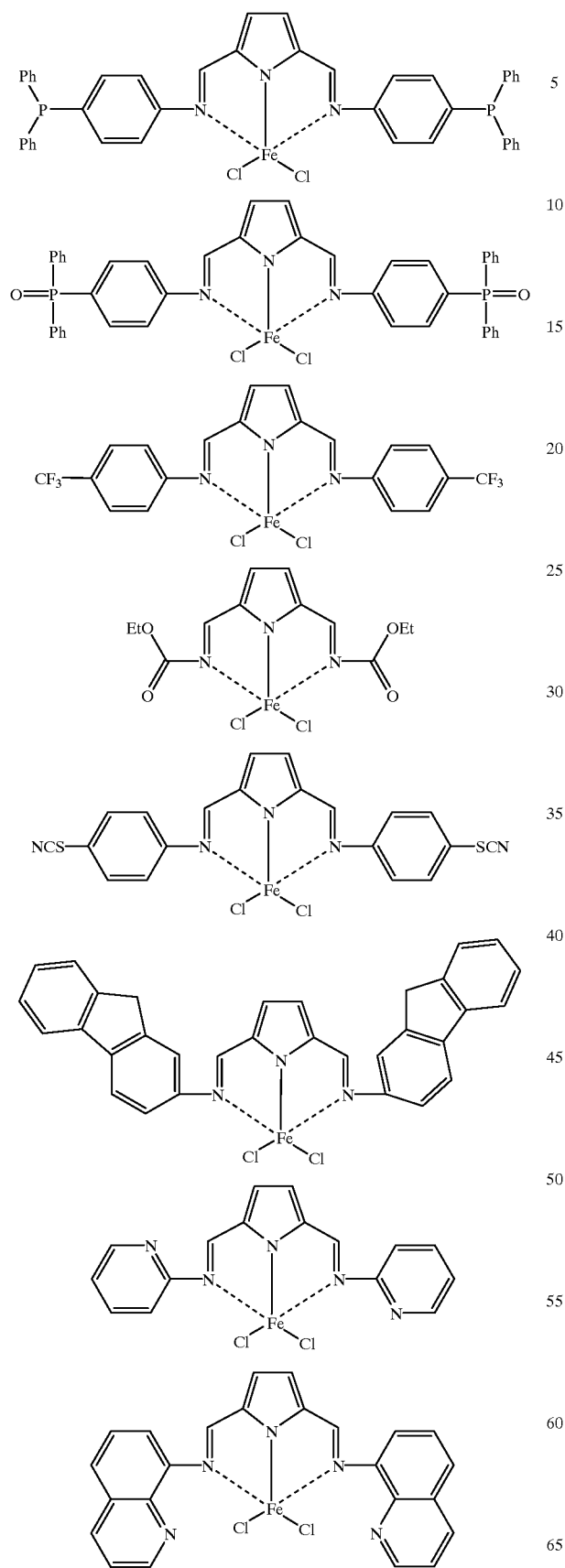
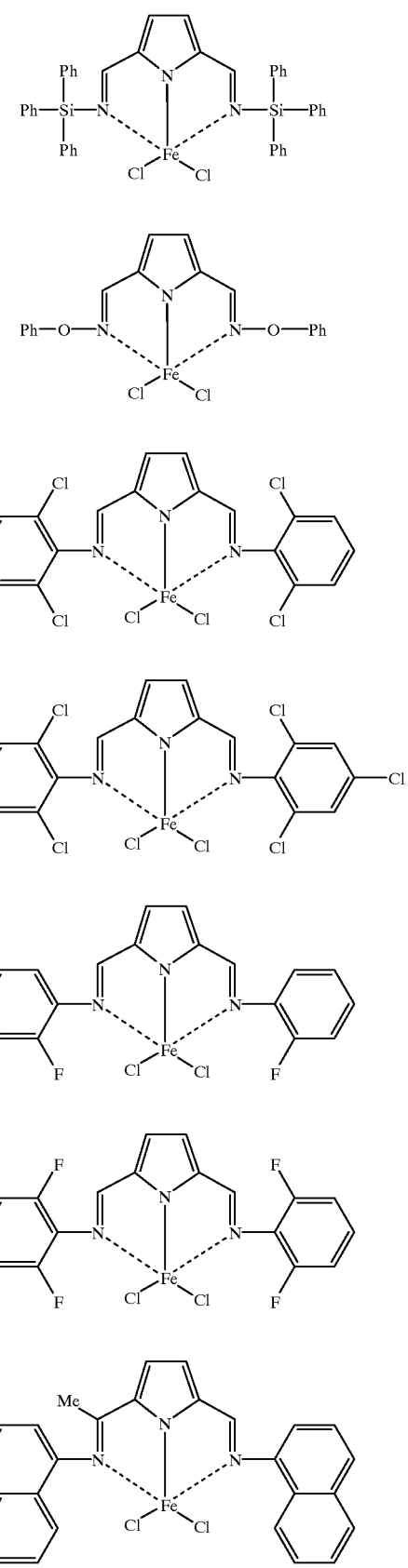

91
-continued
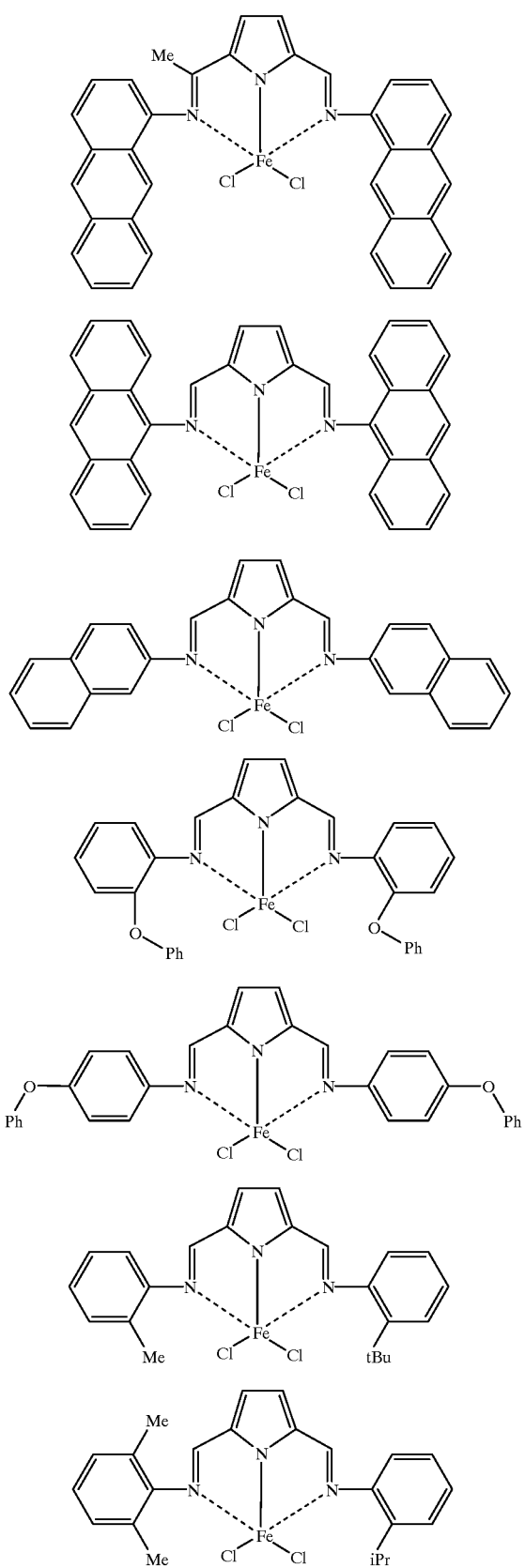
92
-continued
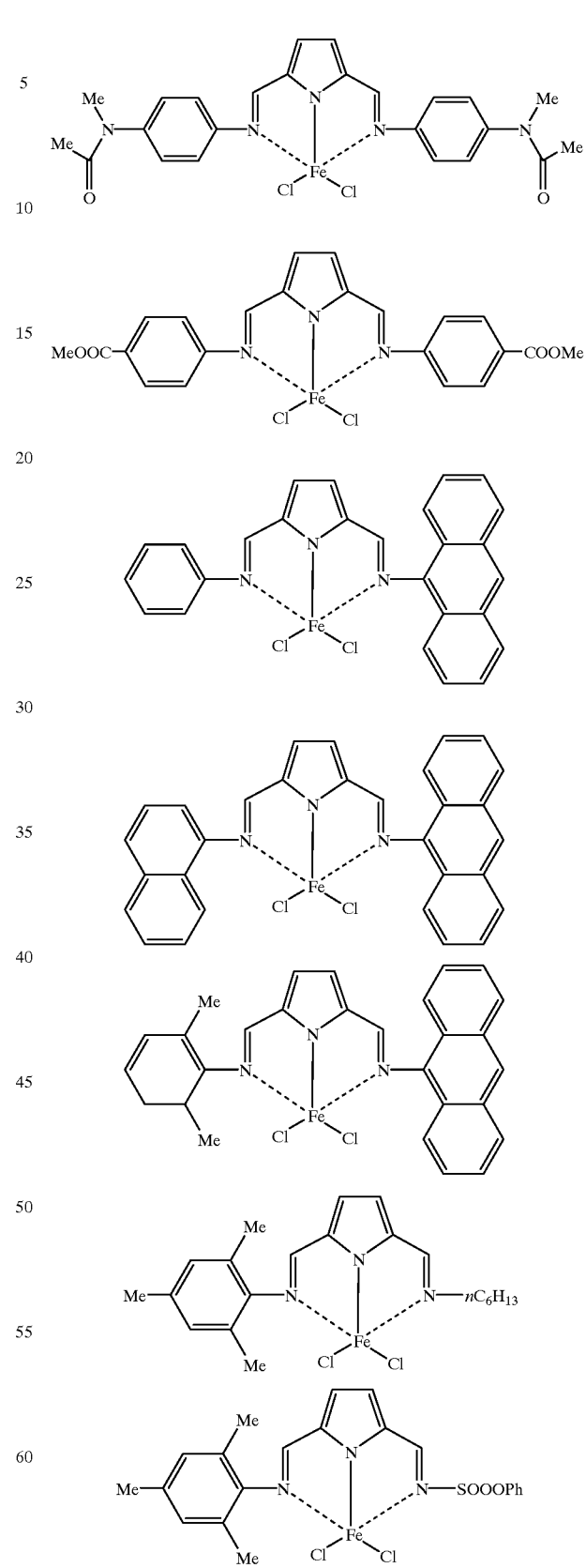

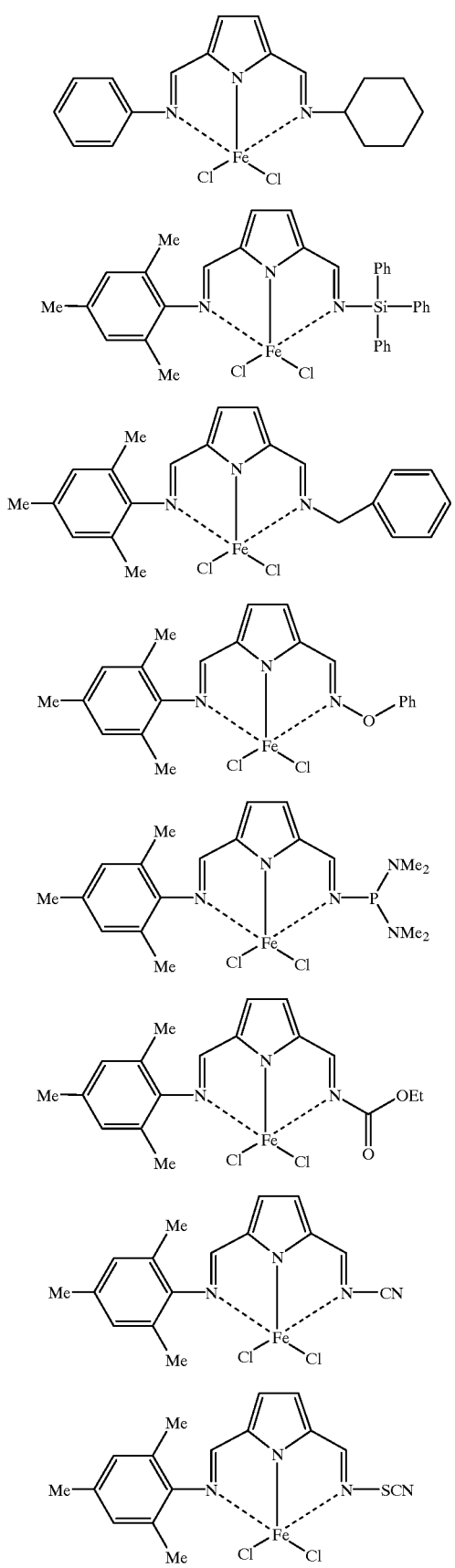
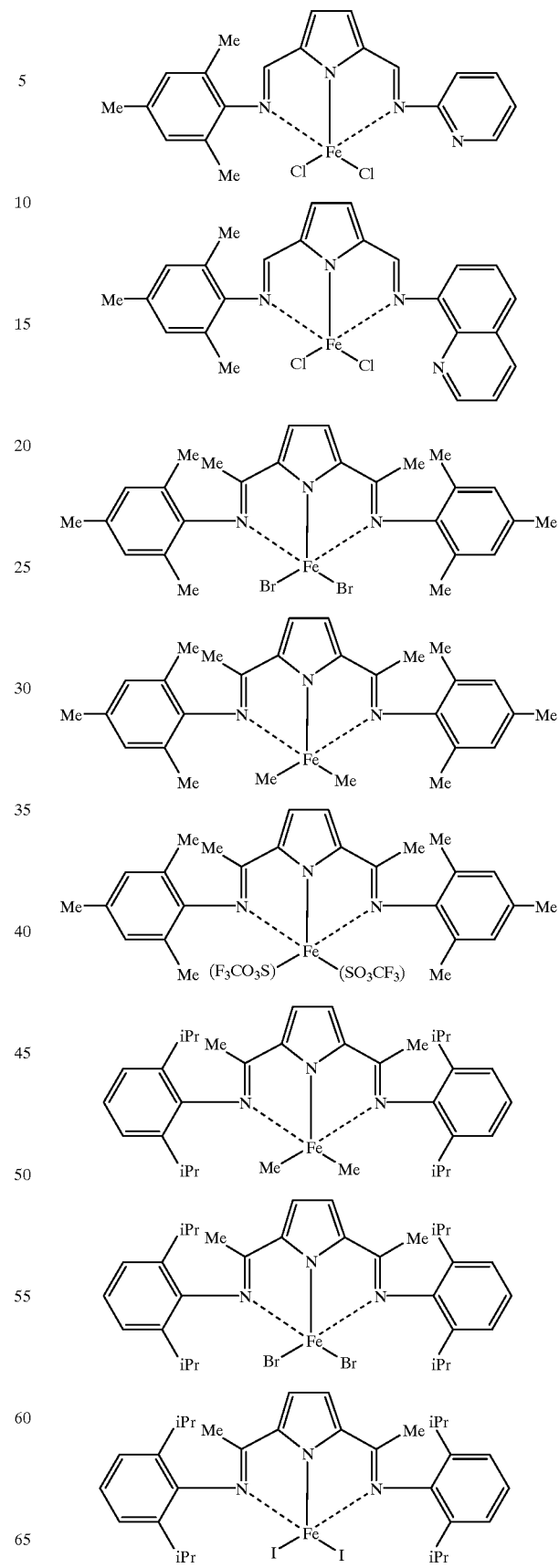

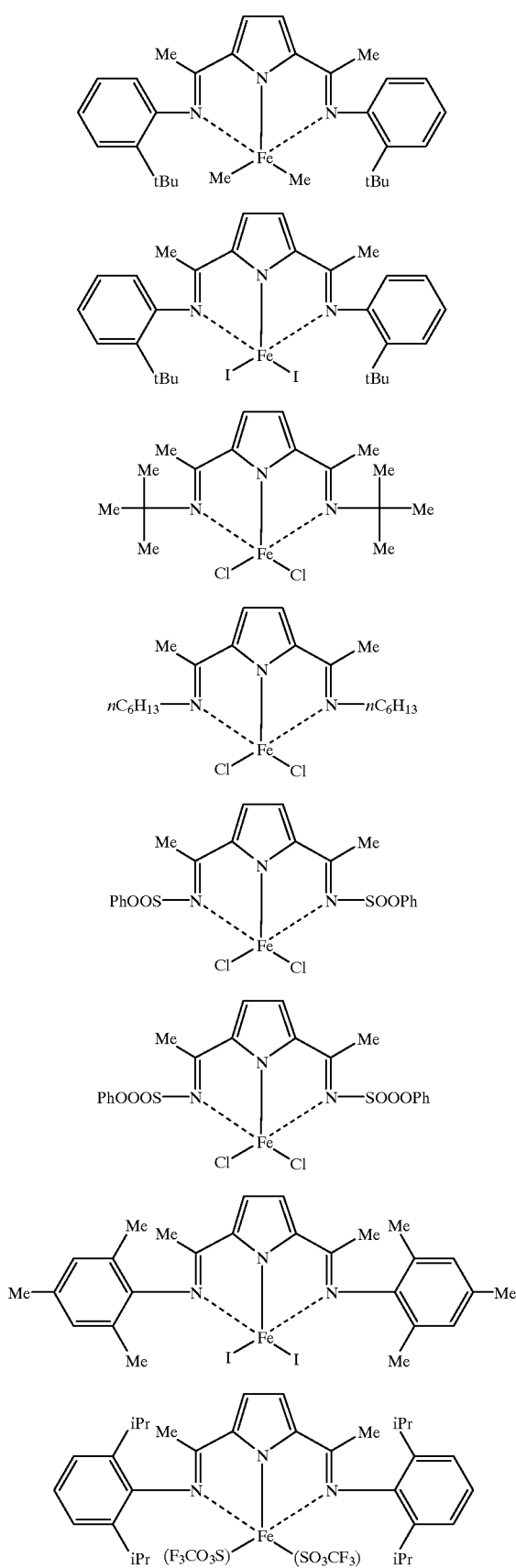

-continued
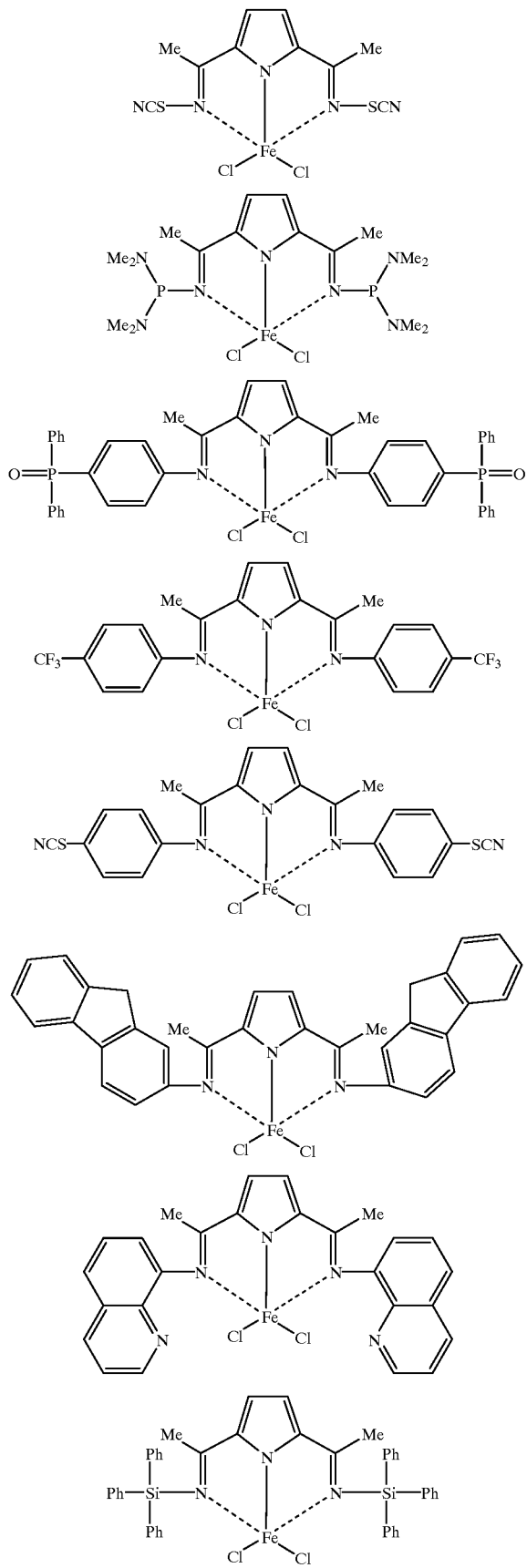
-continued
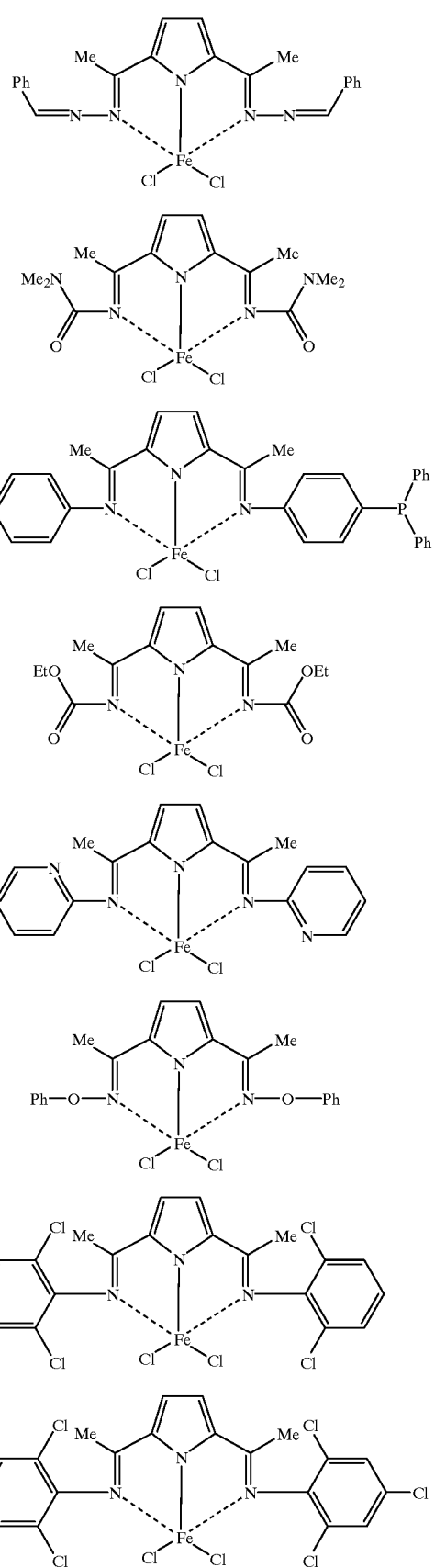

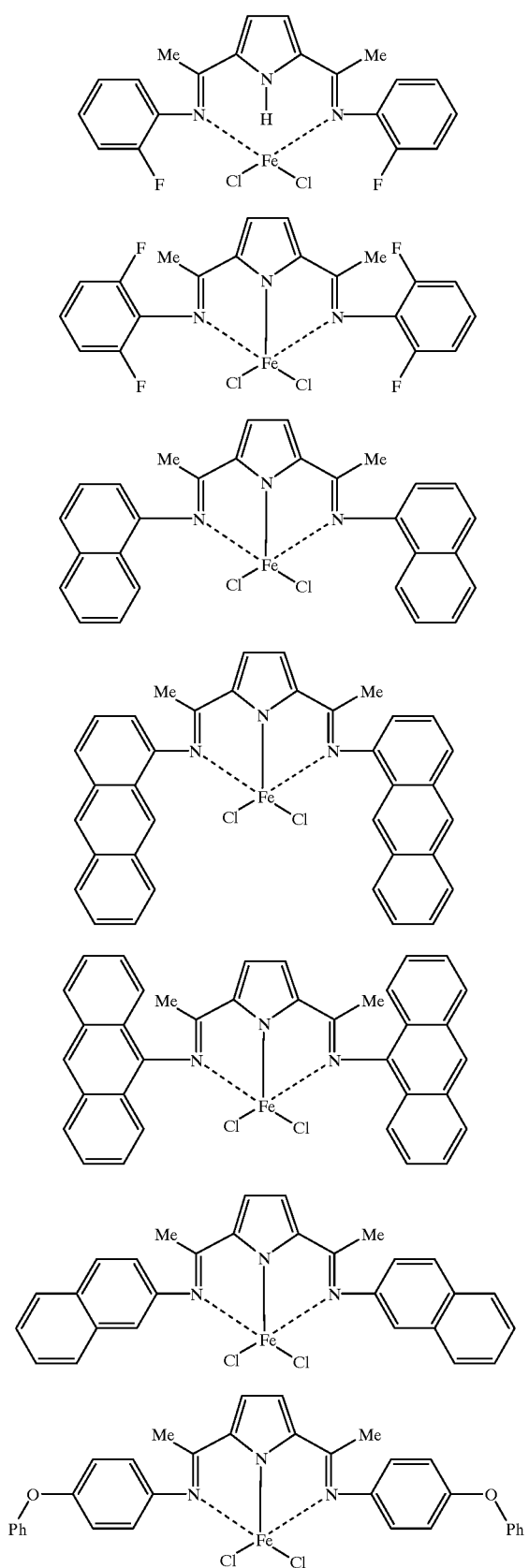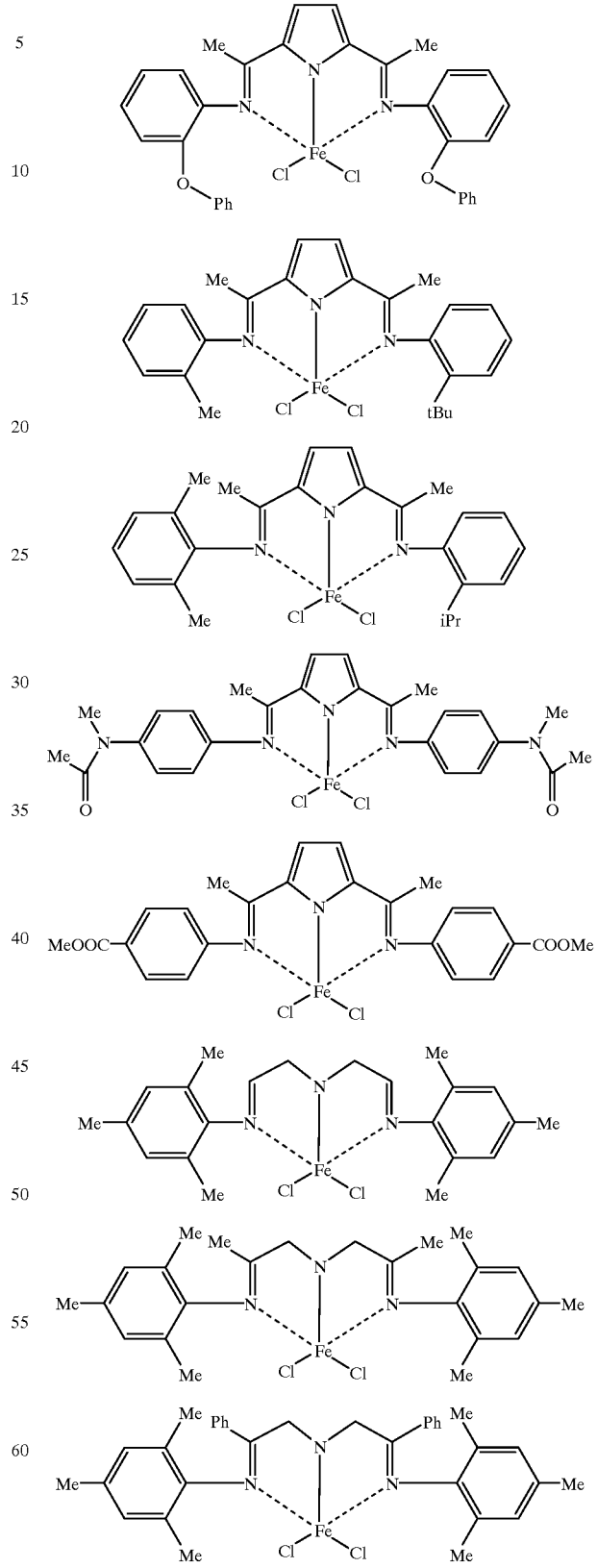

101
-continued
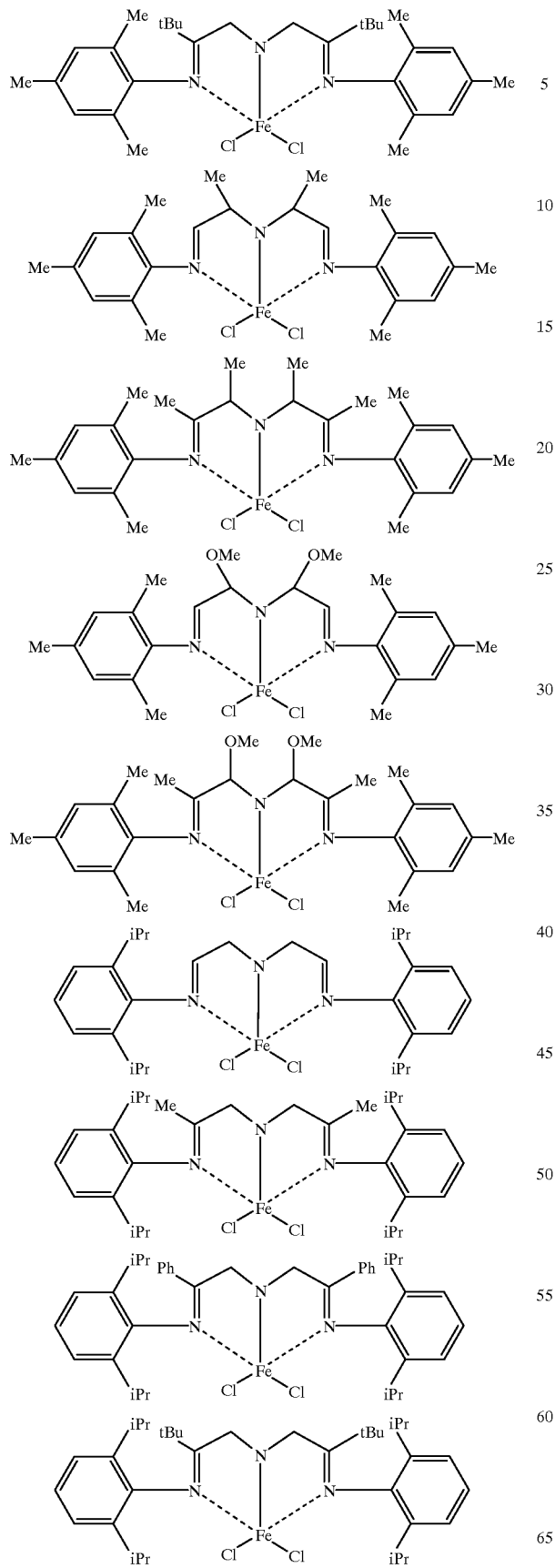
102
-continued
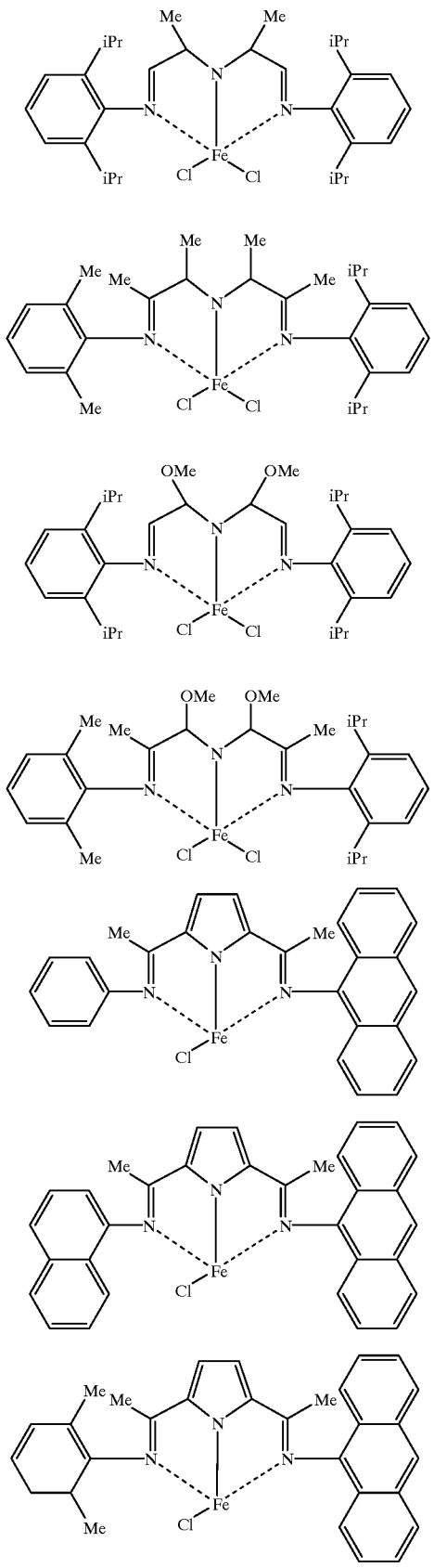

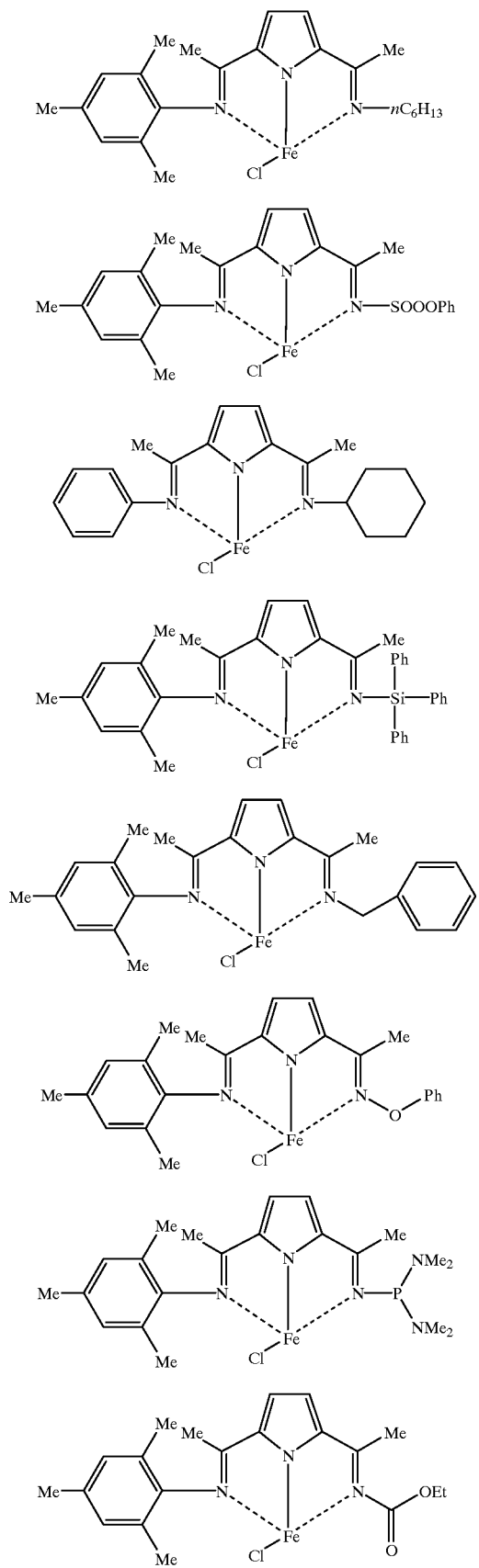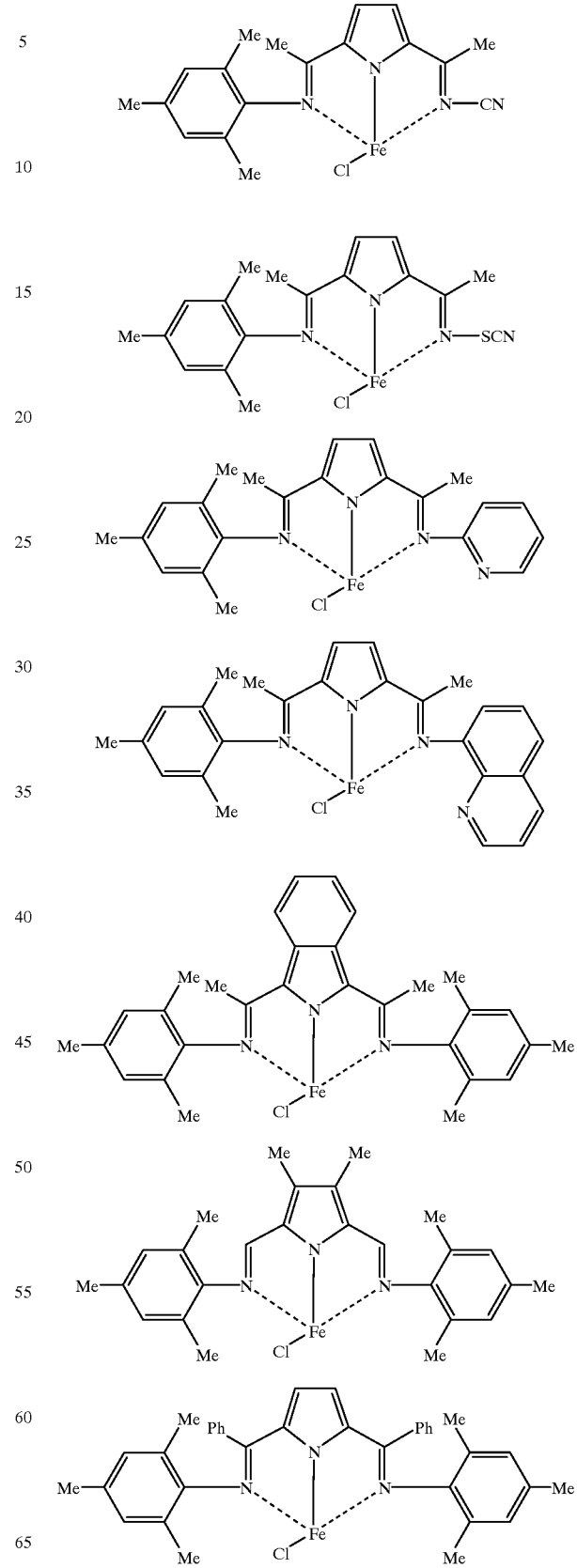

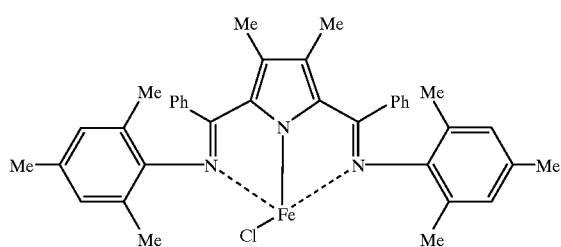
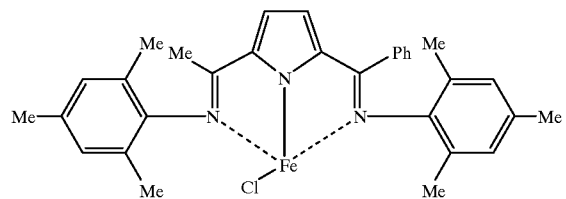
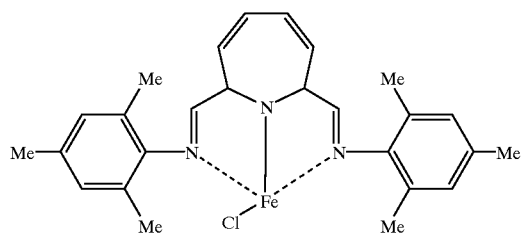
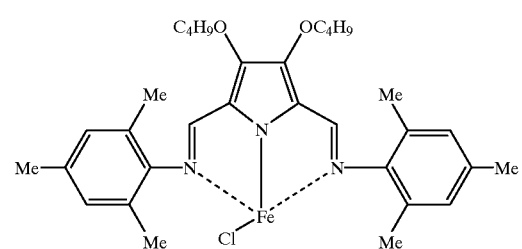
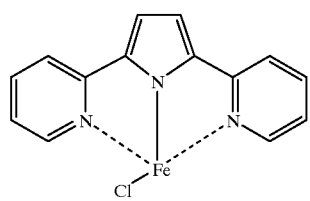
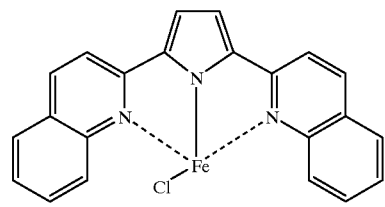
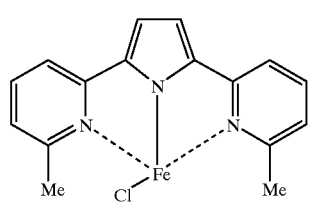
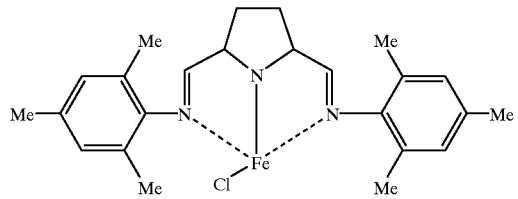
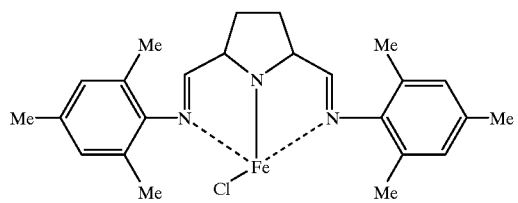
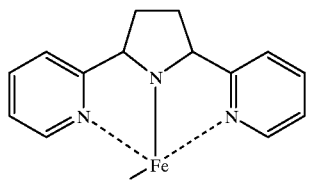
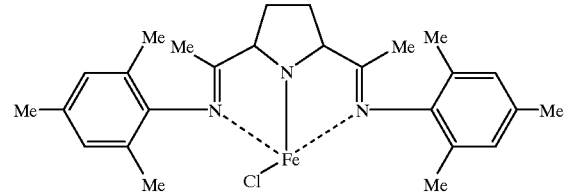
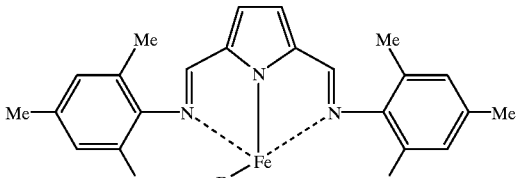
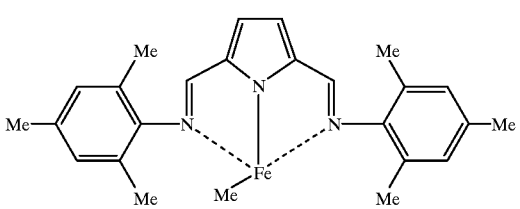
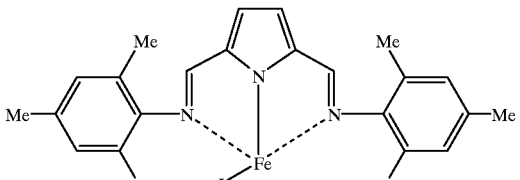
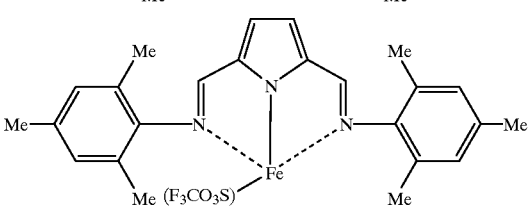

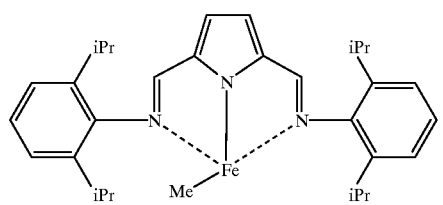
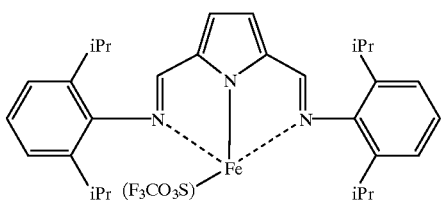
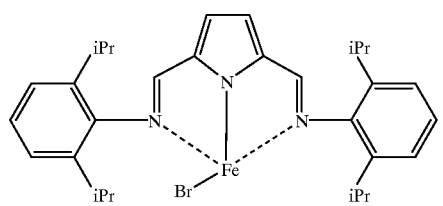
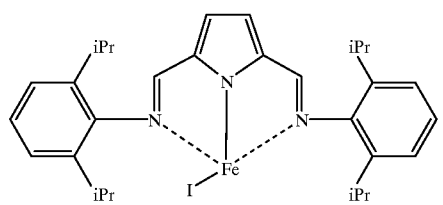
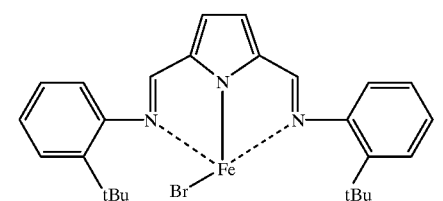
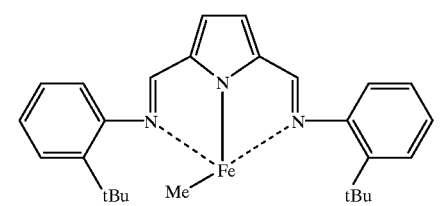
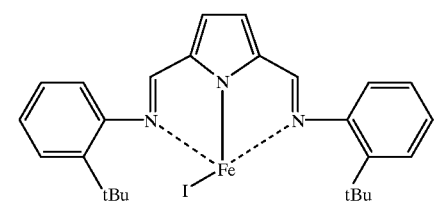
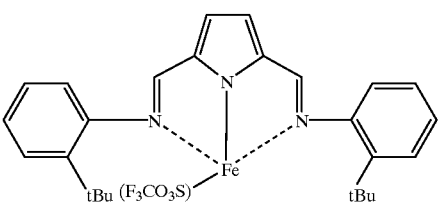
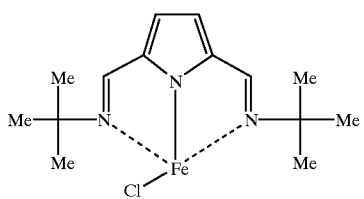
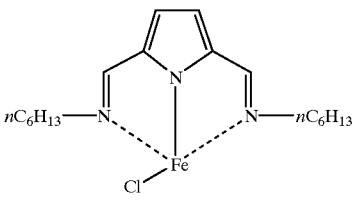
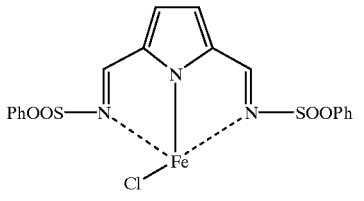
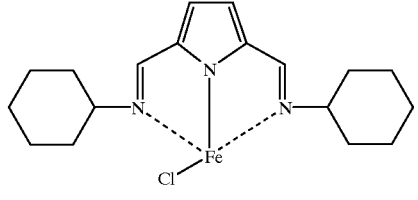
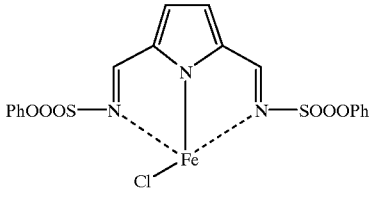
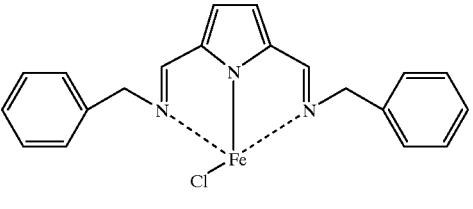
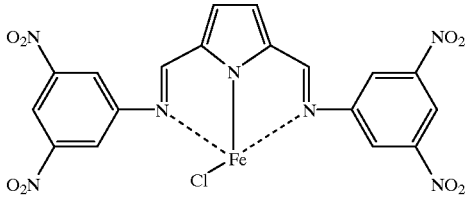
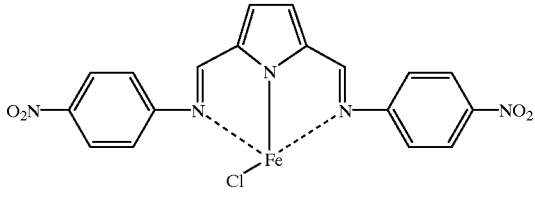

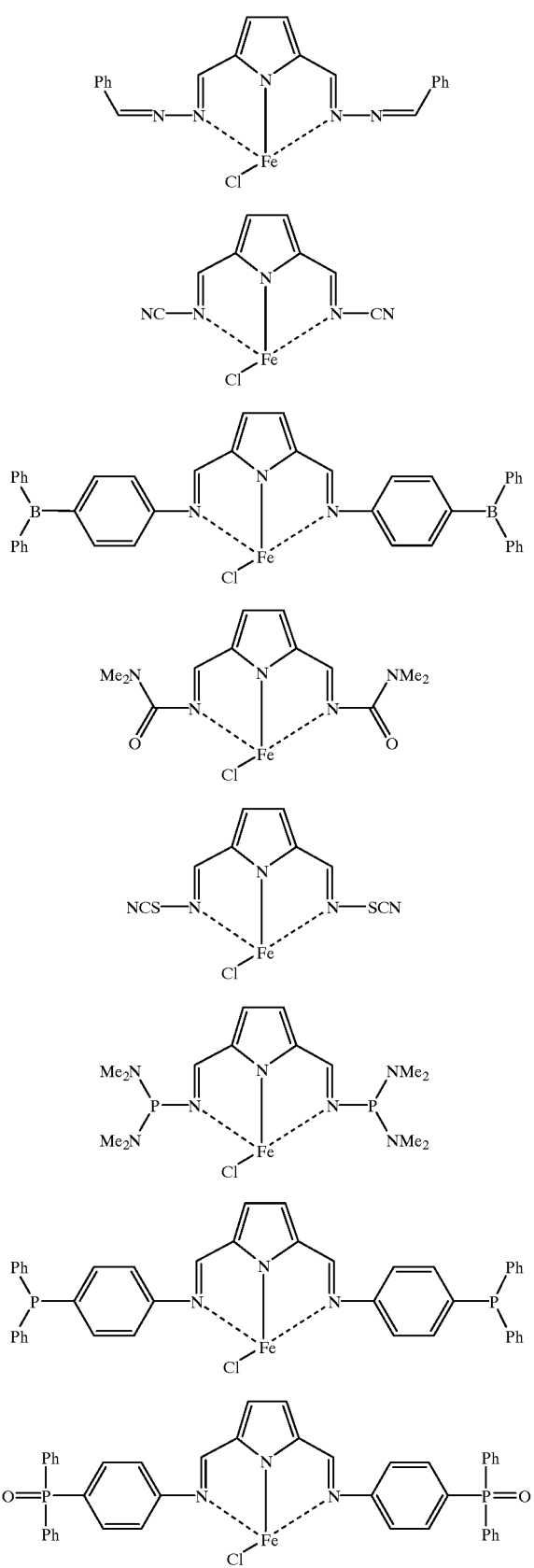
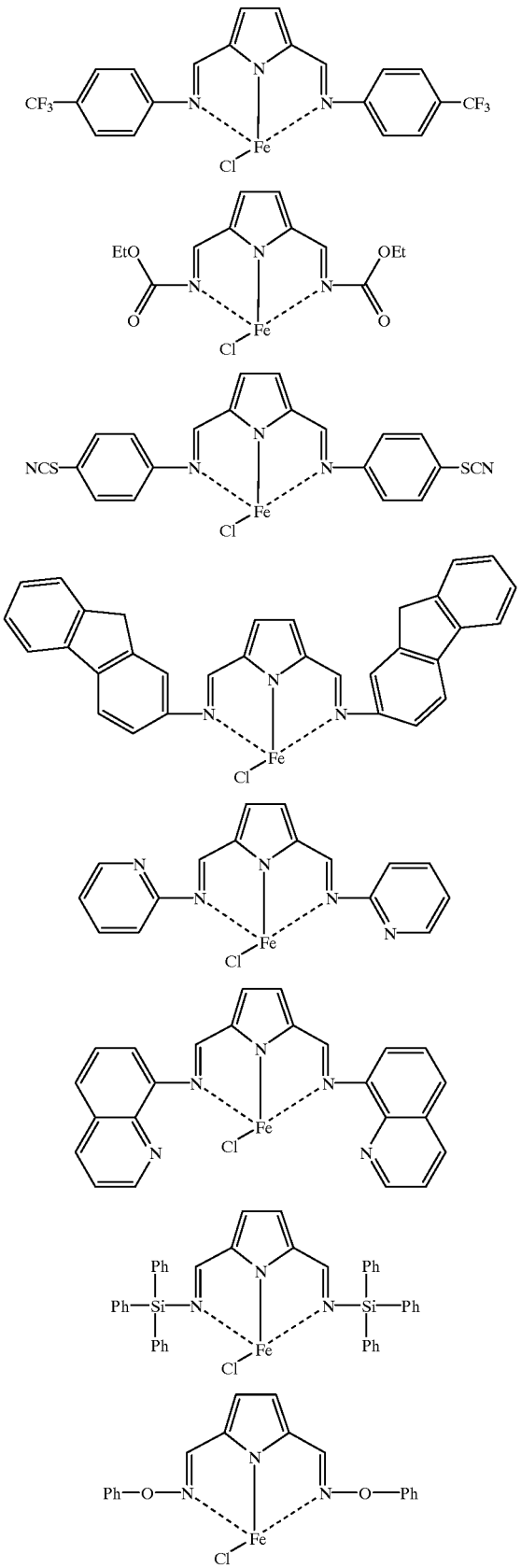

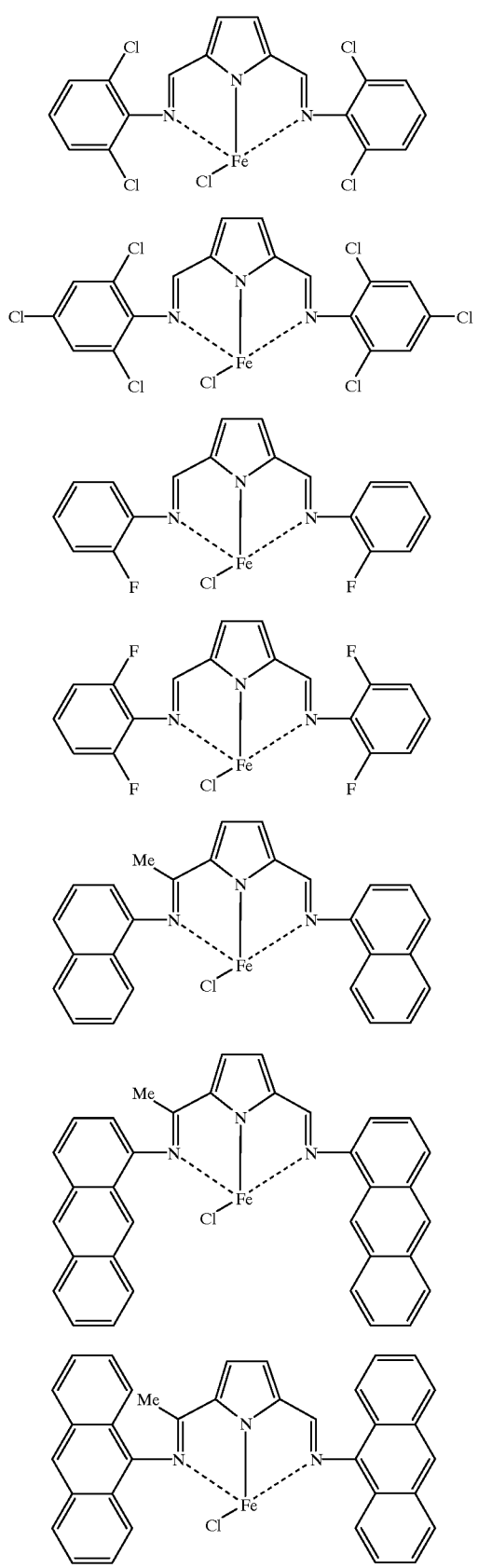
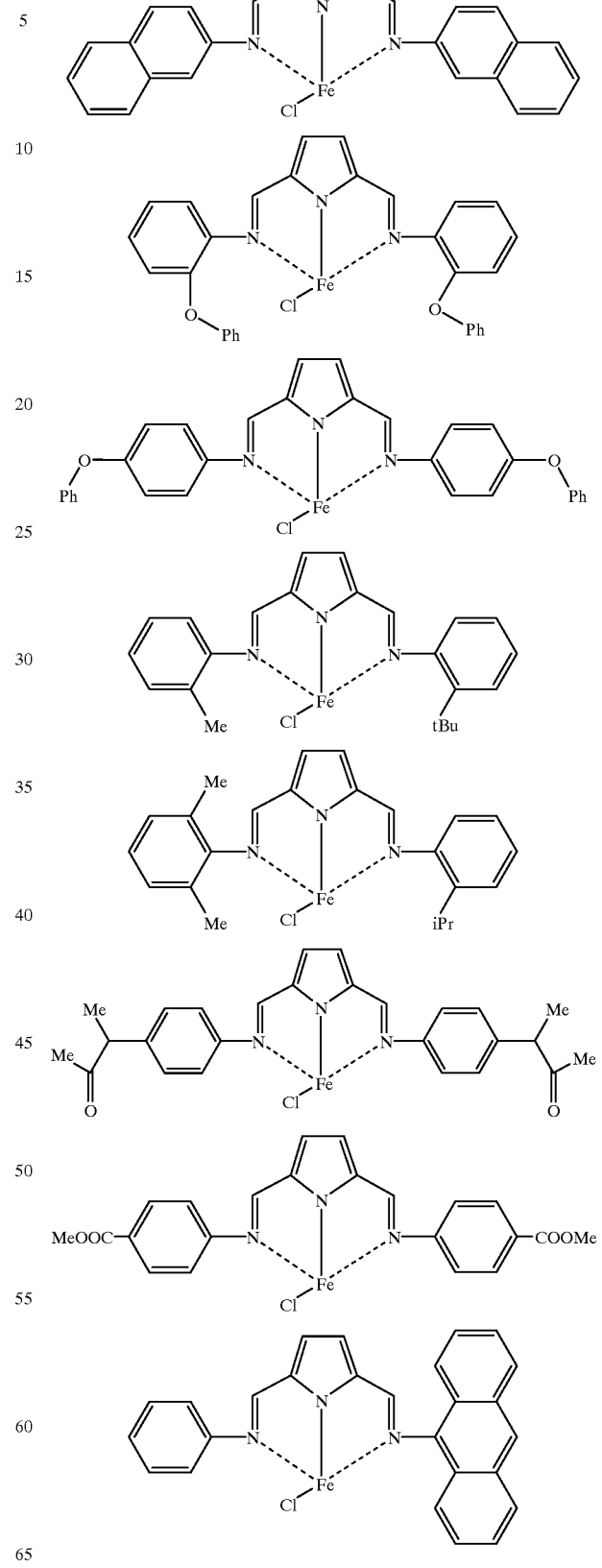

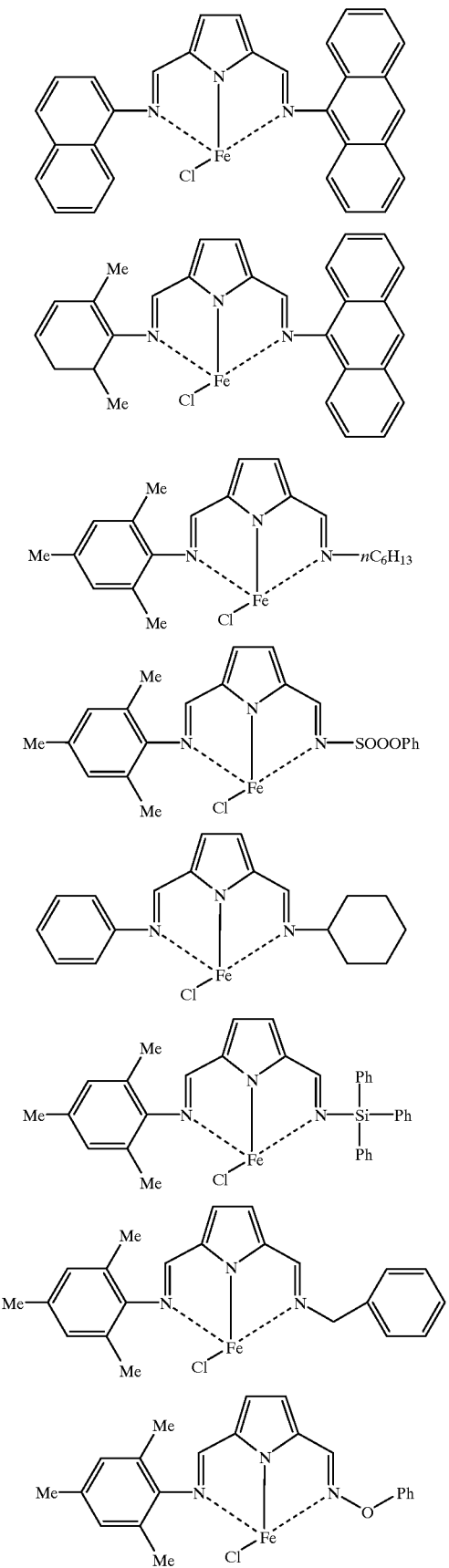
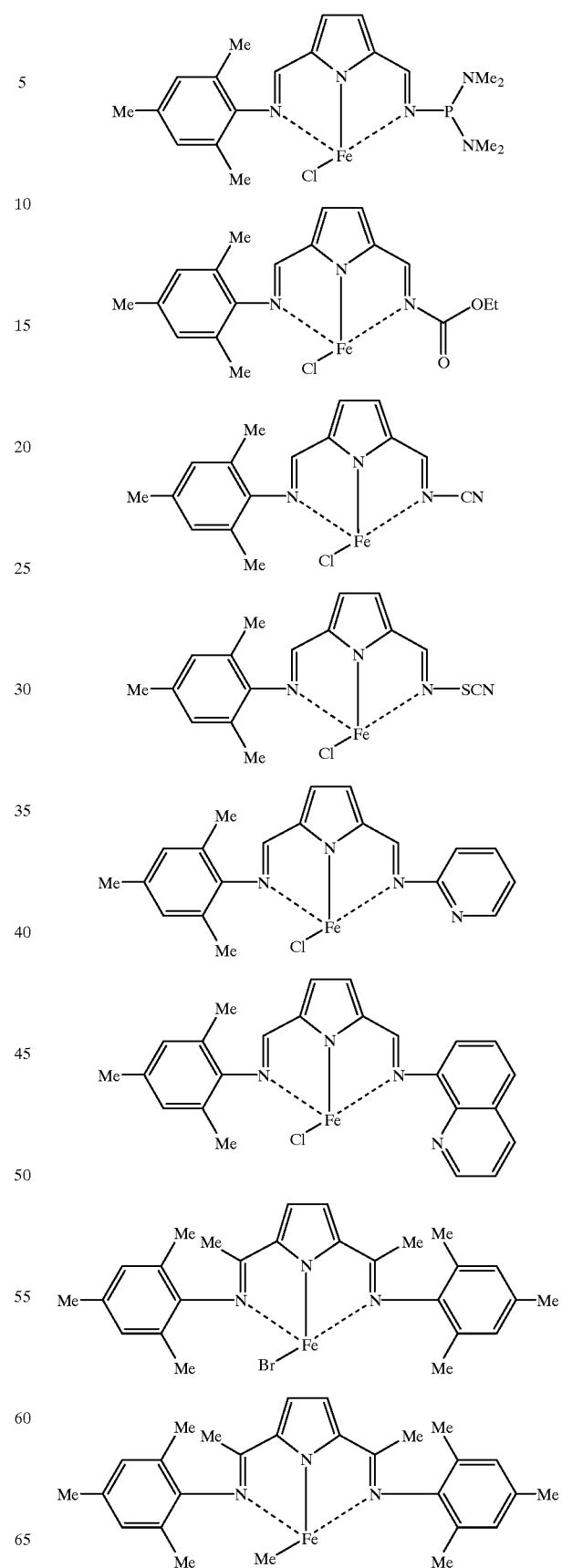

-continued
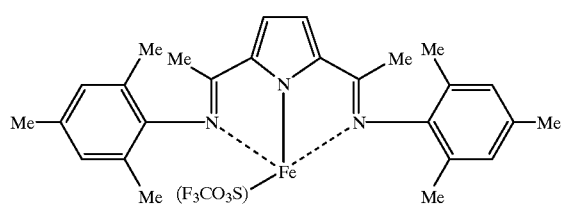
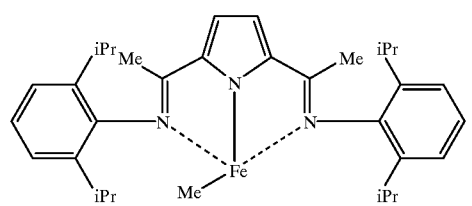
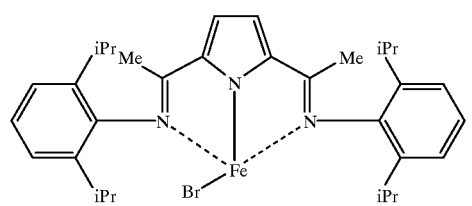
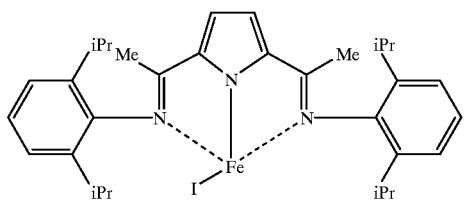
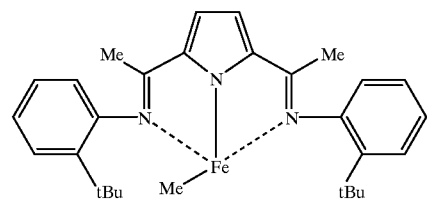
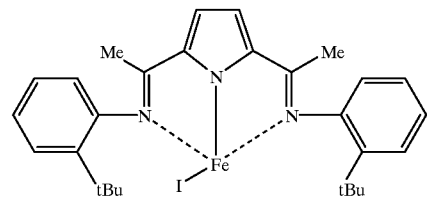
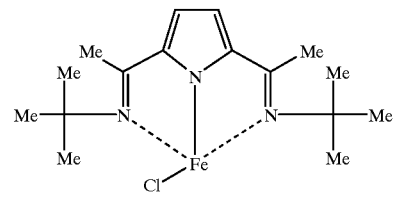
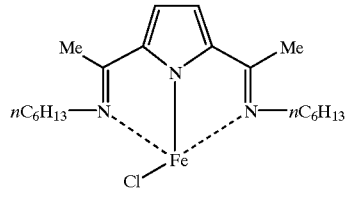
-continued
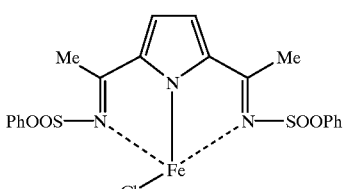
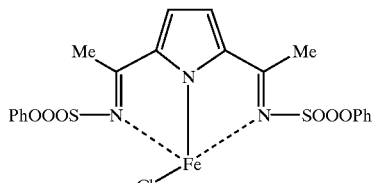
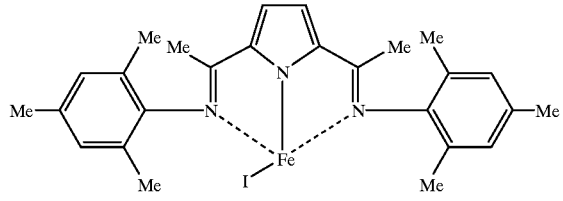
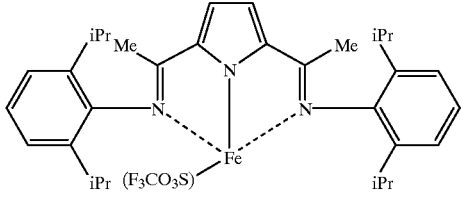
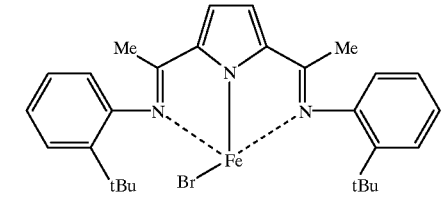
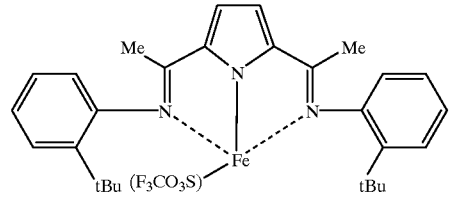
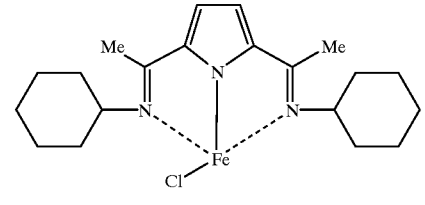
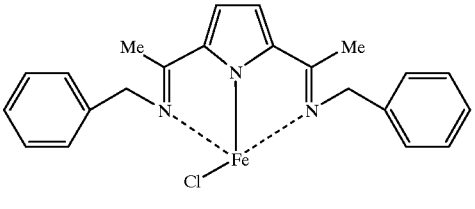

-continued
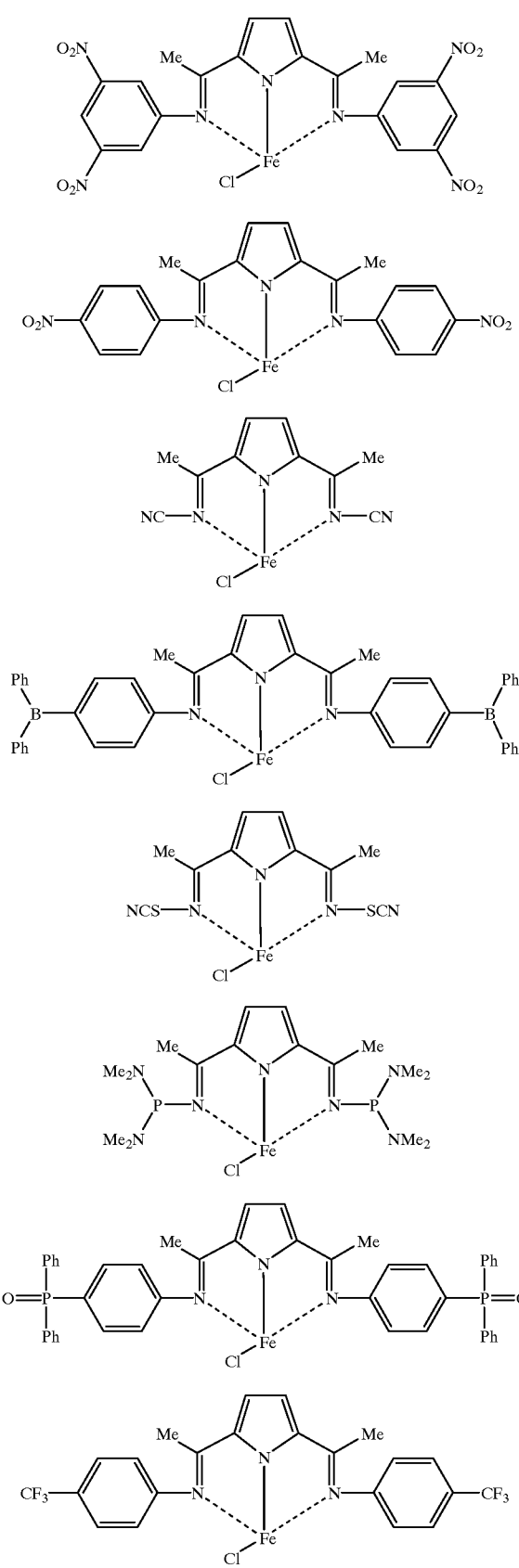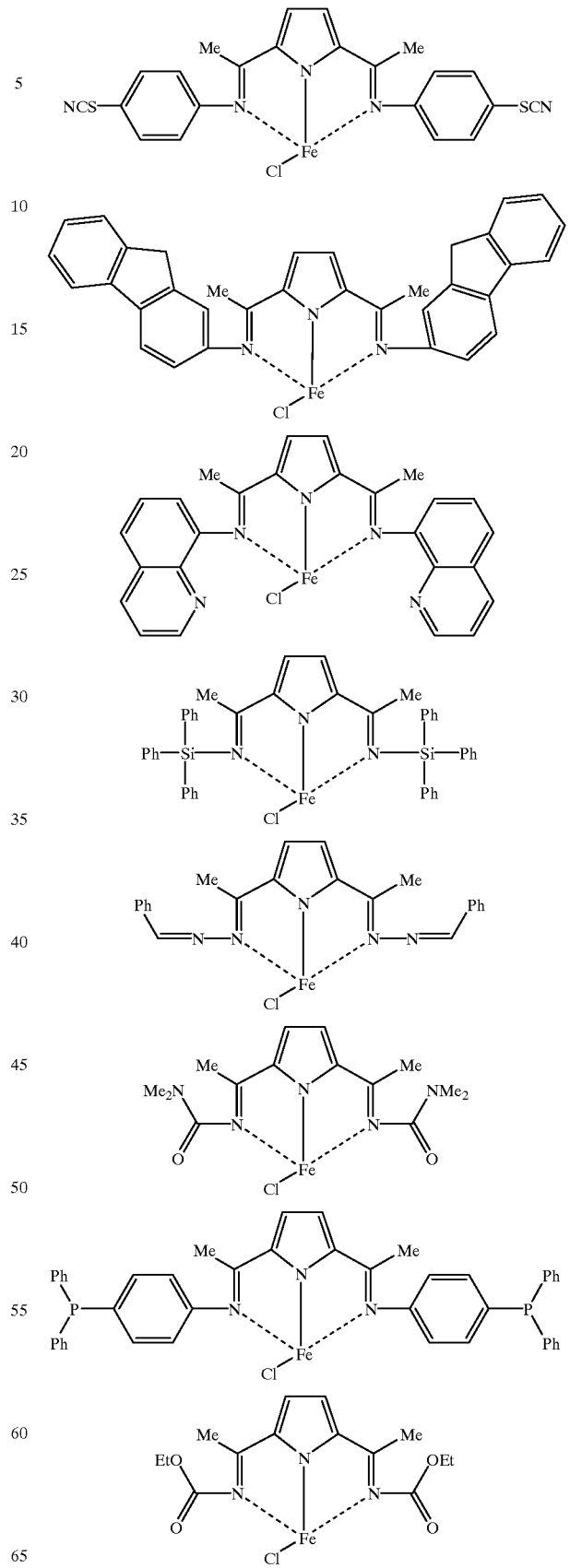

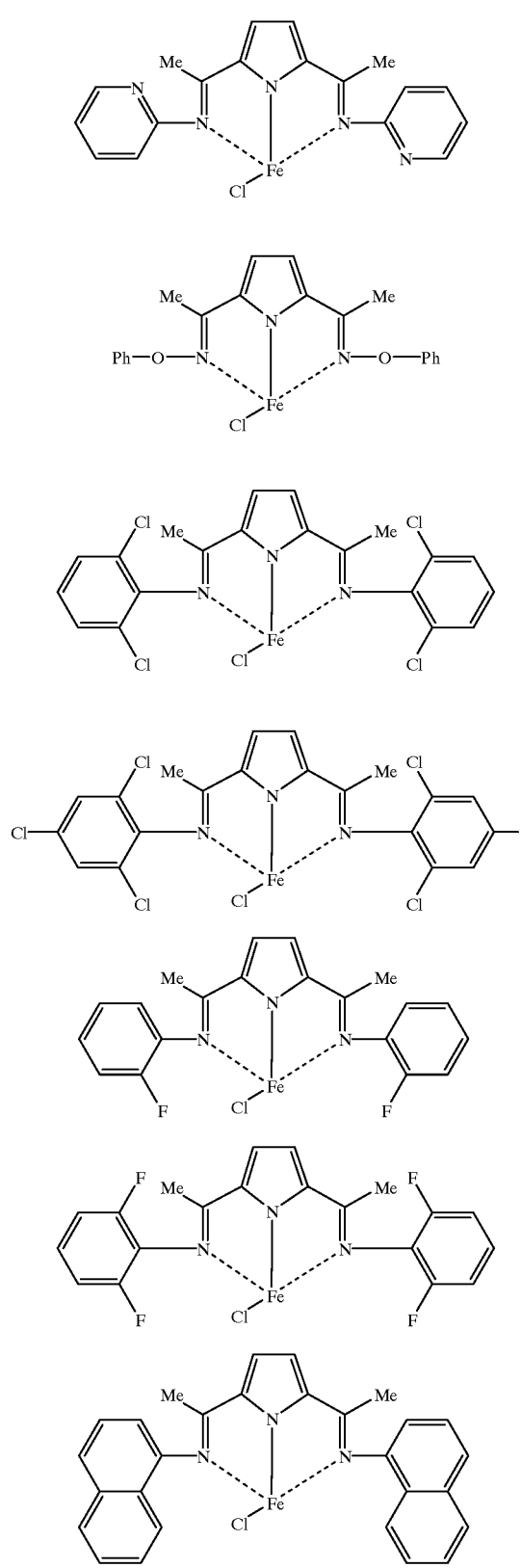
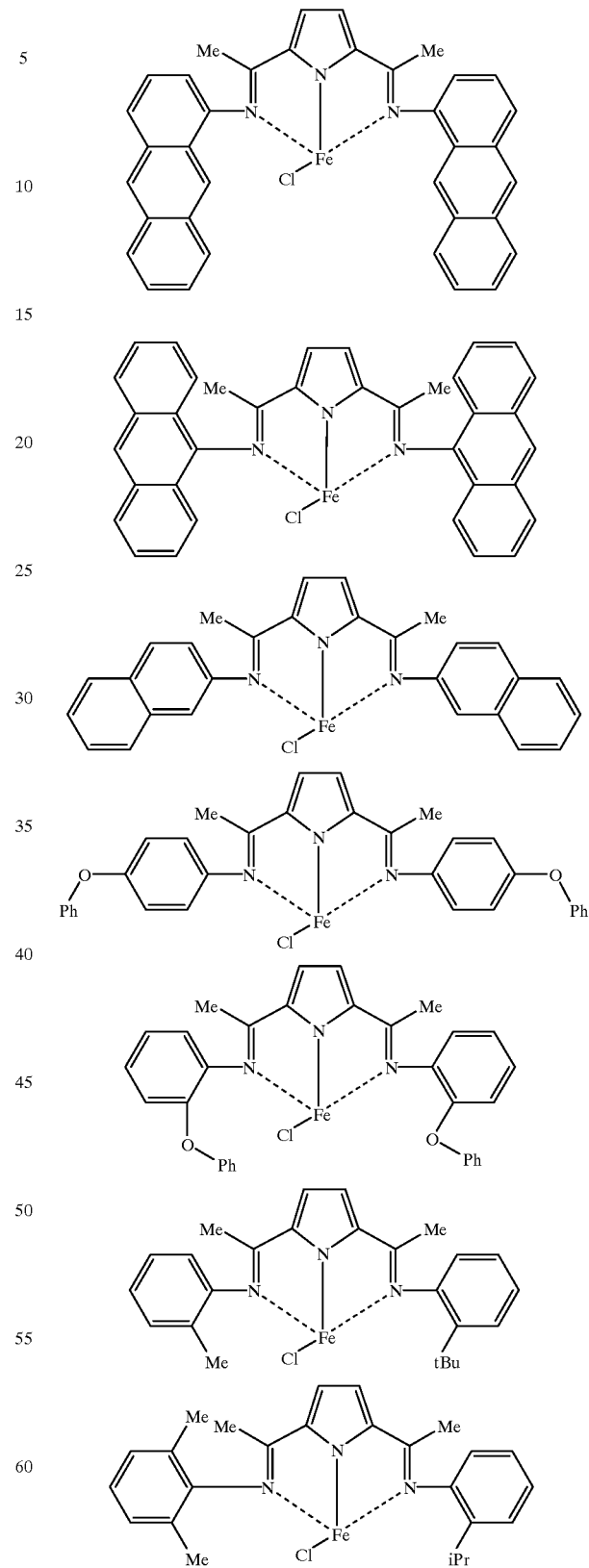

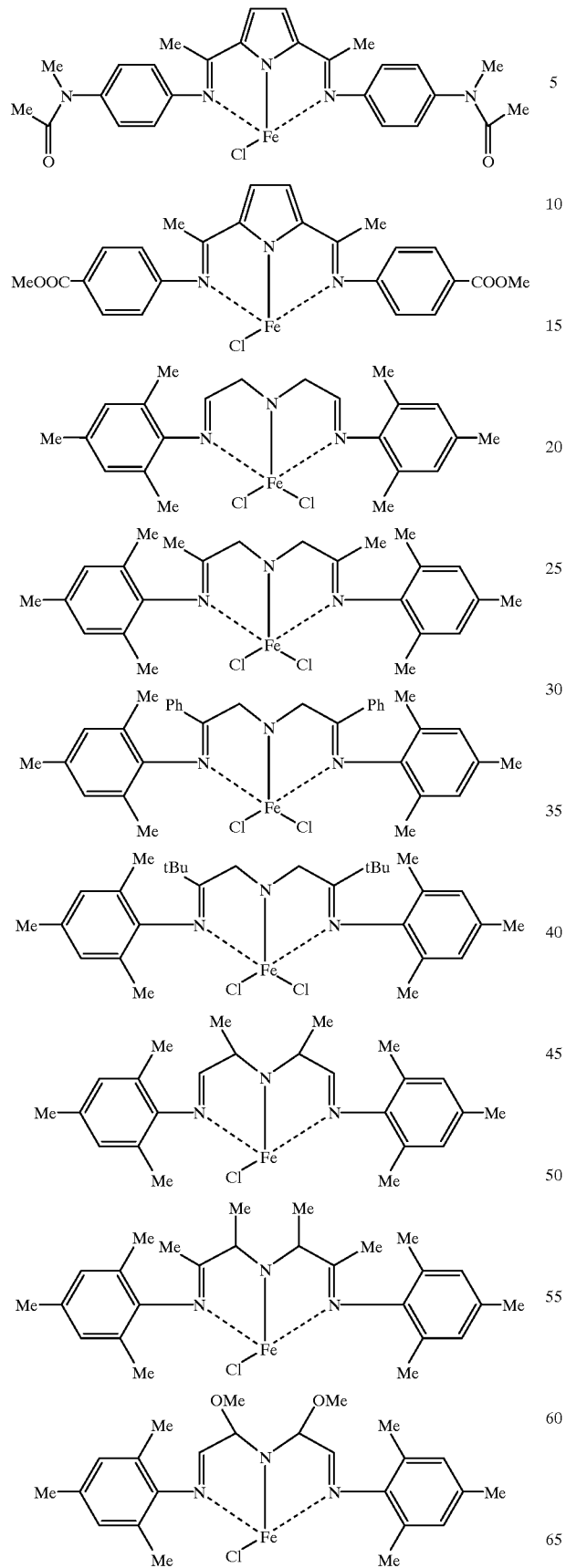
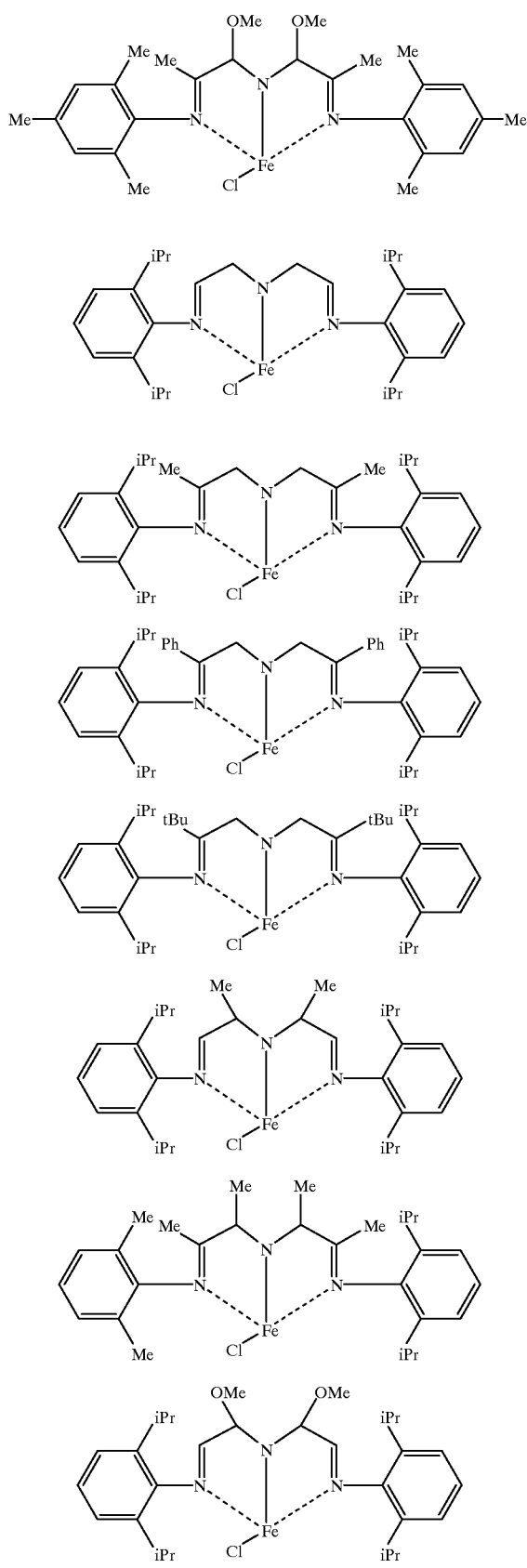

-continued

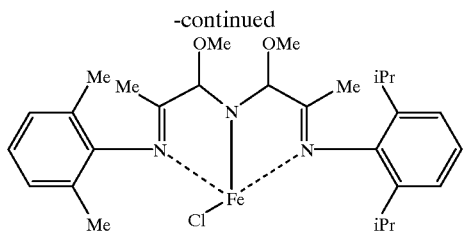

In the above examples, Me denotes a methyl group, Et denotes an ethyl group, nPr denotes a n-propyl group, iPr denotes an i-propyl group, sBu denotes a sec-butyl group, tBu denotes a tert-butyl group, nOct denotes a n-octyl group, and Ph denotes a phenyl group.

In the present invention, transition metal imine compounds wherein iron is replaced with cobalt in the above-mentioned compounds are also employable.

In the present invention, further, transition metal imine compounds wherein a nitrogen atom corresponding to Y in the formulas (I-a), (I-b), (II-a), (II-b), (III-a) and (III-b) of the nitrogen atom of the compounds mentioned above is replaced with phosphorus in the above-mentioned compounds are also employable.

The compounds mentioned above may be used singly or in combination of two or more kinds.

(B-1) Organometallic Compound

Examples of the organometallic compounds (B-1) for use in the invention include the below-described organometallic compounds containing metals of Group 1, Group 2, Group 12 and Group 13 of the periodic table.

(B-1a) Organoaluminum compound represented by the following formula:

$$R^a{}_m Al(OR^b)_n H_p X_q$$

wherein $R^a$ and $A^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leq 3$, $0\leq n<3$, $0\leq p<3$, $0\leq q<3$ and $m+n+p+q=3$.

(B-1b) Alkyl complex compound comprising a metal of Group 1 and aluminum, which is represented by the following formula:

$$M^2 Al R^a{}_4$$

wherein $M^2$ is Li, Na or K; and $R^a$ is a hydrocarbon group of 1 to 15 carbon atoms, preferably 1 to 4 carbon atoms.

(B-1c) Dialkyl compound comprising a metal of Group 2 or Group 12, which is represented by the following formula:

$$R^a R^b M^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B1a) include:

an organoaluminum compound represented by the following formula:

$$R^a{}_m Al(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of $1.5 \leq m \leq 3$;

an organoaluminum compound represented by the following formula:

$$R^a{}_m AlX_{3-m}$$

wherein $R^a$ is a hydrocarbon group of 1 to 15 carbon atoms, preferably 1 to 4 carbon atoms, X is a halogen atom, and m is preferably a number satisfying the condition of $0<m<3$;

an organoaluminum compound represented by the following formula:

$$R^a{}_m AlH_{3-m}$$

wherein $R^a$ is a hydrocarbon group of 1 to 15 carbon atoms, preferably 1 to 4 carbon atoms, and m is preferably a number satisfying the condition of $2 \leq m < 3$; and an organoaluminum compound represented by the following formula:

$$R^a{}_m Al(OR^b)_n X_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m\leq 3$, $0\leq n<3$, $0\leq q<3$ and $m+n+q=3$.

Particular examples of the organoaluminum compounds (B1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride;

alkenylaluminums represented by the formula $(i\text{-}C_4H_9)_x Al_y(C_5H_{10})_z$, (wherein x, y and z are each a positive number, and $z \leq 2x$), such as isoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition represented by $Ra_{2.5}Al\ (OR^b)_{0.5}$ or the like, alkylaluminum aryloxides, such as diethylaluminum phenoxide, diethylaluminum(2,6-di-t-butyl-4-methylphenoxide), ethylaluminumbis (2,6di-t-butyl-4-methylphenoxide), diisobutylalumium(2,6-di-t-butyl-4-nmethylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, e.g., alkylaluminum dihalides, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Compounds analogous to the organoaluminum compound (B1a) are also employable. For example., there can be mentioned organoaluminum compounds wherein two or more aluminum compounds are combined through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Other compounds, such as methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium, are also employable as the organometallic compounds (B-1).

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds mentioned above, the organoaluminum compounds are preferable.

The organometallic compounds (B-1) mentioned above are used singly or in combination of two or more kinds.

(B-2) Organoaluminum Oxy-compound

The organoaluminum oxy-compound (B-2) for use in the invention may be conventionally known aluminoxane or such a benzene-insoluble organoaluminum oxy-compound as exemplified in Japanese Patent Laid-Open Publication No. 78687/1990.

The conventionally known aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent of aluminoxane.

Examples of the organoaluminum compounds used for preparing the aluminoxane include the same organoaluminum compounds as previously described with respect to the organoaluminum compound (B1a). Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons, particularly chlorinated or brominated products thereof. Also employable are ethers such as ethyl ether and tetrahydrofuran. Of the solvents, particularly preferable are aromatic hydrocarbons and aliphatic hydrocarbons.

The benzene-insoluble organoaluminum oxy-compound for use in the invention contains an Al component, which can be dissolved in benzene at 60° C., in an amount of usually not more than 10%, preferably not more than 5%, particularly preferably not more than 2%, in terms of Al atom, and is insoluble or sparingly soluble in benzene.

(B-3) Compound which Reacts with the Transition Metal Imine Comnound to Form Ion Pair Examples of the compound (B-3) which reacts with the transition metal imine compound (A) to form an ion pair for use in the invention (referred to as "vionlizing ionic compound" hereinafter) include Lewis acid, an ionic compound, a borane compound and a carborane compound described in Japanese Patent Laid-Open Publications No. 501950/1989, No. 502036/1989, No. 179005/1991, No. 179006/1991, No. 20770311991 and No. 207704/1991, and U.S. Pat. No. 5,321,106.

The Lewis acid is, for example, a compound represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compound is, for example, a compound represented by the following formula (IV).

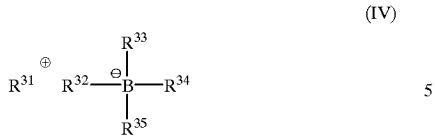

(IV)

In the above formula, $R^{31}$ is $H^+$, carbonium cation, oxonium cation, ammonium cation, phosphonium cation, cycloheptyltrienyl cation, ferrocenium cation having a transition metal, or the like.

$R^{32}$ to $R^{35}$ may be the same or different and are each an organic group, preferably an aryl group or a substituted aryl group.

Examples of the carbonium cations include tri-substituted carbonium cations, such as triphenylcarbonium cation, tri(methylphenyl)carbonium cation and tri(dimethylphenyl)carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{31}$ is preferably carbonium cation or ammonium cation, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)r ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphhenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compound is triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex or a boron compound represented by the following formula (V) or (VI).

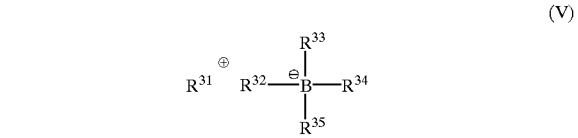

(V)

wherein Et denotes an ethyl group.

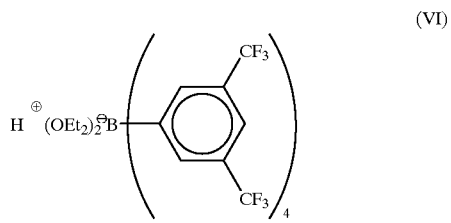

(VI)

Examples of the borane compounds include:
decaborane(14);
salts of anions, such as bis(tri(n-butyl)ammonium)nonaborate, bis(tri(n-butyl)ammonium)decaborate, bis(tri(n-butyl)ammonium)undecaborate, bis(tri(n-butyl)ammonium)dodecaborate, bis(tri(n-butyl)ammonium)decachlorodecaborate and bis(tri(n-butyl)ammonium)dodecachlorododecaborate; and
salts of metallic borane anions, such as tri(n-butyl)ammoniumbis(dodecahydridododecaborate)cobaltate(III) and bis(tri(n-butyl)ammonium)bis-(dodecahydridododecaborate)nickelate(III).

Examples of the carborane compounds include:
salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl- 7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and
salts of metallic carborane anions, such as tri(n-butyl)ammoniumbis(nonahydrido-1,3-dicarbanonaborate)cobaltate(III), tri(n-butyl)ammoniumbis (undecahydrido-7,8-dicarbaundecaborate)ferrate(III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris(tri(n-butyl)ammonium)bis(undecahydrido-7-carbaundecaborate)chromate(III), bis(tri(n-butyl)ammonium)bis(undecahydrido-7-carbaundecaborate)manganate(IV), bis(tri(n-butyl)ammonium)bis(undecahydrido-7-carbaundecaborate)cobaltate(III) and bis(tri(n-butyl)ammonium)bis(undecahydrido-7-carbaundecaborate)nickelate(IV).

The ionizing ionic compounds (B-3) mentioned above are used singly or in combination of two or more kinds.

In the olefin polymerization catalyst according to the invention, the below-described particulate carrier (C) can be used if necessary, in addition to the above-mentioned transition metal imine compound (A) and at least one compound (B) selected from the organometallic compound (B-1), the organoaluminum oxy-compound (B-2) and the ionizing ionic compound (B-3).

(C) Particulate Carrier

The particulate carrier (C) which can be optionally used in the invention is an inorganic or organic compound of a granular or particulate solid having a particle diameter of 10 to 300 $\mu$m, preferably 20 to 200 $\mu$m. As the inorganic compound, a porous oxide is preferable, and examples thereof include $SiO_2$, $Al_2O_3$, MgO, ZrO, $TiO_2$, $B_2O_3$, CaO, ZnO, BaO, $ThO_2$, and mixtures containing these oxides, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO2$—$TiO_2$—MgO. Of these, preferable are compounds containing at least one component selected from the group consisting of $SiO_2$ and $Al_2O_3$ as their major component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the particulate carriers (C) differ in their properties depending upon the type and the preparation process thereof, the carrier preferably used in the invention has a specific surface area of 50 to 1000 $m^2/g$, preferably 100 to 700 $m^2/g$, and a pore volume of 0.3 to 2.5 $cm^3/g$. The carrier may be calcined, if necessary, at 100 to 1000° C., preferably 150 to 700° C., prior to use.

Also employable as the particulate carrier (C) in the invention is an organic compound of granular or particulate solid having a particle diameter of 10 to 300 $\mu$m. Examples of the organic compounds include (co)polymers produced using an a-olefin of 2 to 14 carbon atoms such as ethylene, propylene, 1-butene or 4-methyl-1-pentene as a main ingredient, and (co)polymers produced using vinylcyclohexane or styrene as a main ingredient.

The olefin polymerization catalyst of the invention comprises the transition metal imine compound (A), at least one compound (B) selected from the organometallic compound (B-1), the organoaluminum oxy-compound (B-2) and the ionizing ionic compound (B-3), and optionally, the particulate carrier (C). In FIG. 1, an example of a process for preparing the olefin polymerization catalyst of the invention is shown.

In the polymerization, the components can be used in any way and in any order. For example, the following methods are available.

(1) The component (A) and at least one component (B) selected from the organometallic compound (B-1), the organoaluminum oxy-compound (B-2) and the ionizing ionic compound (B-3) (referred to as "component (B)" simply hereinafter) are fed to the polymerization reactor in an arbitrary order.

(2) A catalyst obtained by previously contacting the component (A) with the component (B) is fed to the polymerization reactor.

(3) A catalyst component obtained by previously contacting the component (A) with the component (B), and the component (B) are fed to the polymerization reactor in an arbitrary order. In this case, the components (B) may be the same or different.

(4) A catalyst component wherein the component (A) is supported on the particulate carrier (C), and the component (B) are fed to the polymerization reactor in an arbitrary order.

(5) A catalyst wherein the component (A) and the component (B) are supported on the particulate carrier (C) is fed to the polymerization reactor.

(6) A catalyst component wherein the component (A) and the component (B) are supported on the particulate carrier (C), and the component (B) are fed to the polymerization reactor in an arbitrary order. In this case, the components (B) may be the same or different.

(7) A catalyst component wherein the component (B) is supported on the particulate carrier (C), and the component (A) are fed to the polymerization reactor in an arbitrary order.

(8) A catalyst component wherein the component (B) is supported on the particulate carrier (C), the component (A) and the component (B) are fed to the polymerization reactor in an arbitrary order. In this case, the components (B) may be the same or different.

An olefin may be prepolymerized onto a solid catalyst component wherein the component (A) and the component (B) are supported on the particulate carrier (C).

In the process for olefin polymerization according to the invention, an olefin is polymerized or copolymerized in the presence of the aforesaid olefin polymerization catalyst to obtain an olefin polymer.

In the present invention, the polymerization can be carried out as any of liquid phase polymerization, such as solution polymerization or suspension polymerization, and gas phase polymerization.

Examples of inert hydrocarbon media employable in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent. Of these, the aliphatic hydrocarbons, the alicyclic hydrocarbons and the olefin itself are preferable.

In the polymerization of an olefin using the olefin polymerization catalyst, the component (A) is used in an amount of usually $10^{-8}$ to $10^{-2}$ mol, preferably $10^{-7}$ to $10^{-3}$ mol, based on 1 liter of the reaction volume.

The component (B-1) is used in such an amount that the molar ratio ((B-1)/(M)) of the component (B-1) to the transition metal atom (M) in the component (A) becomes usually 0.01 to 5000, preferably 0.05 to 2000. The component (B-2) is used in such an amount that the molar ratio ((B-2)/(M)) of the aluminum atom in the component (B-2) to the transition metal atom (M) in the component (A) becomes usually 10 to 5000, preferably 20 to 2000. The component (B-3) is used in such an amount that the molar ratio ((B-3)/(M)) of the component (B-3) to the transition metal atom (M) in the component (A) becomes usually 1 to 10, preferably 1 to 5.

In the olefin polymerization using the olefin polymerization catalyst, the polymerization temperature is in the range of usually −50 to 200° C., preferably 0 to 170° C. The polymerization pressure is in the range of usually atmospheric pressure to 100 kg/cm², preferably atmospheric pressure to 50 kg/cm². The polymerization reaction can be carried out by any of batchwise, semi-continuous and continuous processes. The polymerization can be conducted in two or more stages under different reaction conditions.

The molecular weight of the resulting olefin polymer can be regulated by allowing hydrogen to be present in the polymerization system or by changing the polymerization temperature.

The olefin polymerization catalyst of the invention is suitable also for preparing oligomers of olefins.

Examples of the olefins which can be polymerized by the use of the olefin polymerization catalyst include:

α-olefins of 2 to 20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene;

aromatic vinyl compounds, such as styrene, dimethylstyrenes, allylbenzene, allyltoluenes, vinylnaphthalenes and allylnaphthalenes;

alicyclic vinyl compounds, such as vinylcyclohexane, vinylcyclopentane, vinylcycloheptane and allylnorbornane;

cycloolefins, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene;

chain polyenes of 4 to 20 carbon atoms, such as 1,4-pentadiene and 1,5-hexadiene; and cyclopolyenes, such as 5-ethylidene norbornene and dicyclopentadiene.

EFFECT OF THE INVENTION

The olefin polymerization catalyst according to the invention exhibits high polymerization activity, and by the use of the catalyst, olefin polymers having narrow molecular weight distribution can be obtained.

By the process for olefin polymerization according to the invention, olefin polymers having narrow molecular weight distribution can be obtained with high polymerization activity.

EXAMPLE

The present invention is further described with reference to the following examples.

Example 1

To a 500-ml glass autoclave thoroughly purged with nitrogen, 250 ml of toluene was introduced. Then, ethylene was passed through the autoclave at a rate of 100 l/hr, and the system was allowed to stand for 10 minutes at 25° C. Thereafter, 1.25 mmol (in terms of aluminum atom) of methylaluminoxane was added, and 0.0005 mmol of a transition metal imine compound represented by the following formula (a) was successively added to initiate polymerization. An ethylene gas was continuously fed at a rate of 100 l/hr, and the polymerization was conducted at 25° C. for 30 minutes at ordinary pressure. Then, a small amount of methanol was added to terminate the polymerization. The polymerization reaction solution was introduced into a large excess of a methanol/hydrochloric acid solution, and the resulting polymer was dried at 130° C. for 12 hours under reduced pressure. As a result, 0.41 g of a polymer was obtained.

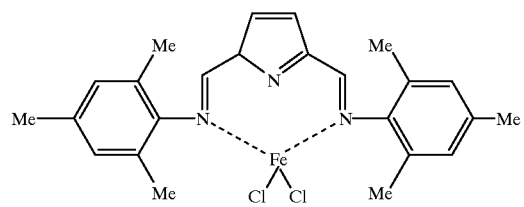

Example 2

To a 500-ml glass autoclave thoroughly purged with nitrogen, 250 ml of toluene was introduced. Then, ethylene was passed through the autoclave at a rate of 100 1/hr, and the system was allowed to stand for 10 minutes at 25° C. Thereafter, 0.5 mmol of triisobutylaluminum, 0.005 mmol of a transition metal imine compound represented by the above formula (a) and 0.006 mmol of triphenylcarbeniumtetrakispentafluorophenyl borate were added in this order to initiate polymerization. An ethylene gas was continuously fed at a rate of 100 l/hr, and the polymerization was conducted at 25° C. for one hour at ordinary pressure. Then, a small amount of methanol was added to terminate the polymerization. The polymerization reaction solution was introduced into a large excess of a methanol/hydrochloric acid solution, and the resulting polymer was dried at 130° C. for 12 hours under reduced pressure. As a result, 0.2 g of a polymer was obtained.

What is claimed is:

1. An olefin polymerization catalyst comprising:

(A) a transition metal imine compound represented by the following formula (I-a),(I-b) or (I-c), and (B) at least one compound selected from the group consisting of:

(B-1) an organometallic compound, (B-2) an organoaluminum oxy-compound, and (B-3) a compound which reacts with the transition metal imine compound (A) to form an ion pair;

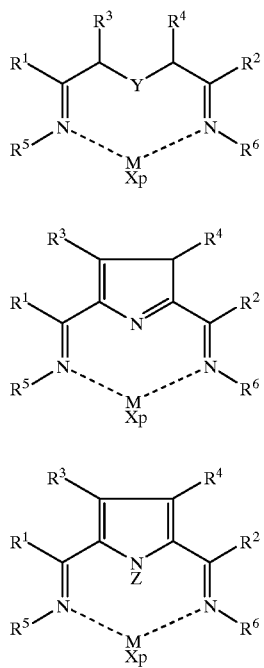

(I-a)

(I-b)

(I-c)

wherein M is a transition metal atom of Group 8 to Group 11 of the periodic table,

- $R^1$ to $R^4$ may be the same or different and are each a hydrogen atom, a halogen atom, a halogenated hydrocarbon group, a hydrocarbon group, a hetercyclic compound residual group, an oxygen-containing group, a nitrogen-containing group, a boron-containing group, a sulfur-containing group, a phosphorus-containing group, a silicon-containing group, a germanium-containing group or tin-containing group,
- $R^5$ and $R^6$ may be the same or different and are each a halogen atom, a halogenated hydrocarbon group, a hydrocarbon group, a heterocyclic compound residual group, an oxygen-containing group, a nitrogen-containing group, a boron-containing group, a slfur-containing group, a phosphorus-containing group, a silicon-containing group, a germanium-containing group or a tin-containing group,
- $R^1$ and $R^5$ may be bonded to each other to form a ring, $R^2$ and $R^6$ may be bonded to each other to form a ring, $R^1$ and $R^3$ may be bonded to each other to form a ring, and $R^2$ and $R^4$ may be bonded to each other to form a ring,
- P is a number satisfying a valence of M,
- X is a hydrogen atom, a halogen atom, a hydrocarbon group 1 to 20 carbon atoms, a halogenated hydrocarbon group of 1 to 20 carbon atoms, an oxygen-containing group, a sulfur-containing group or silicon-containing group, and when P is 2 or greater, plural groups indicated by X may be the same or different,
- Y is a atom of Group 15 of the periodic table, and
- Z is hydrogen atom, a hydrocarbon group or a single bond bonded to the transition metal atom indicated by M.

2. The olefin polymerization catalyst as claimed in claim 1, wherein the transition metal imine compound represented by the formula (I-a), (I-b) or (I-c) is a transition metal imine compound represented by the following formula (II-a), (II-b) or (II-c):

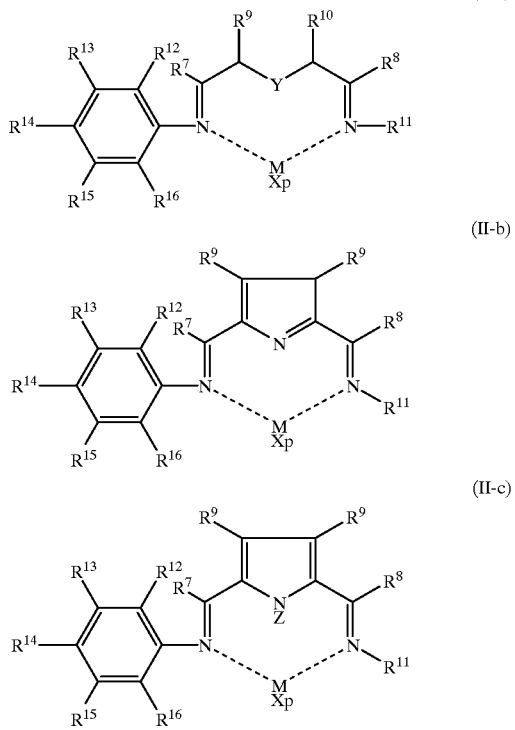

wherein M is a transition metal atom of Group 8 to Group 11 of the periodic table,

- $R^7$ to $R^{10}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group,
- each $R^{11}$ may be the same or different and is a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group,
- $R^7$ and $R^9$ may be bonded to each other to form a ring, $R^8$ and $R^{10}$ may be bonded to each other to form a ring, and $R^8$ and $R^{11}$ may be bonded to each other to form a ring,
- $R^{12}$ to $R^{16}$ may be the same or different, and are each a hydrogen atom, a halogen atom, a hydrocarbon group, a halogenated hydrocarbon group, a heterocyclic compound residual group, a hydrocarbon-substituted silyl group, a hydrocarbonsubstituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group, at least one of $R^{12}$ to $R^{16}$ is a group other than a hydrogen atom, and two or more of the groups indicated by $R^{12}$ to $R^{16}$ may be bonded to each other to form a ring, p is a number satisfying a valence of M, X is a hydrogen atom, a halogen atom, a hydrocarbon group of 1 to 20 carbon atoms, a halogenated hydrocarbon group of 1 to 20carbon atoms, an oxygen-containing group, a sulfur-containing group or a silicon-containing group, and when p is 2 or greater, plural groups indicated by X may be the same or different, Y is an atom of Group 15 of the periodic table, and Z is hydrogen atom, a hydrocarbon group or a single bond bonded to the transition metal atom indicated by M.

3. The olefin polymerization catalyst as claimed in claim 1, wherein the transition metal imine compound represented by the formula (I-a), (I-b) or (I-c) is a transition metal imine compound represented by the óllowing formula (III-a), (III-b) or (III-c):

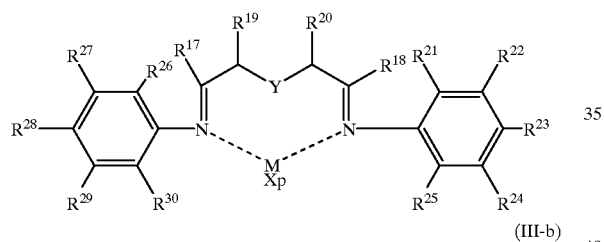

(III-a)

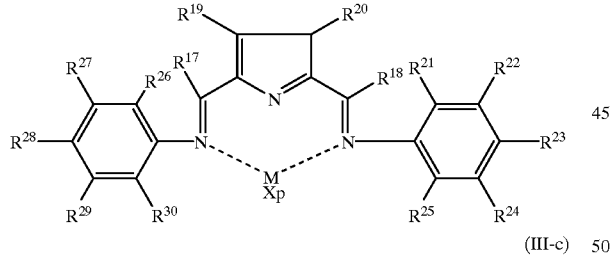

(III-b)

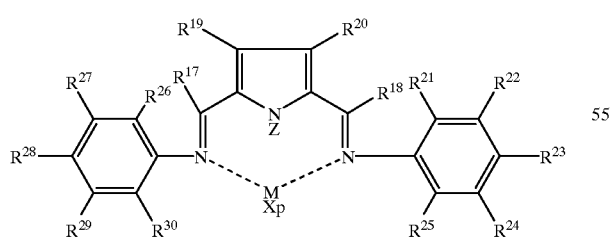

(III-c)

wherein M is a transition metal atom of Group 8 to Group 11 of the periodic table, $R^{17}$ to $R^{20}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group, $R^{17}$ and $R^{19}$ may be bonded to each other to form a ring, and $R^{18}$ and $R^{20}$ may be bonded to each other to form a ring, $R^{21}$ to $R^{30}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group, at least one of $R^{21}$ to $R^{25}$ is a group other than a hydrogen atom, at least one of $R^{26}$ to $R^{30}$ is a group other than a hydrogen atom, two or more of the groups indicated by $R^{21}$ to $R^{2}5$ may be bonded to each other to form a ring, and two or more of the groups indicated by $R^{26}$ to $R^{30}$ may be bonded to each other to form a ring, p is a number satisfying a valence of M, X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and when p is 2 or greater, plural groups indicated by X may be the same or different, Y is an atom of Group 15 of the periodic table, and Z is hydrogen atom, a hydrocarbon group or a single bond bonded to the transition metal atom indicated by M.

4. A process for olefin polymerization, comprising polymerizing or copolymerizing an olefin in the presence of the olefin polymerization catalyst as claimed in claim 1.

5. The olefin polymerization catalyst as claimed in claim 2, wherein the transition metal imine compound represented by the formula (I-a), (I-b) or (I-c) is a transition metal imine compound represented by the following formula (III-a), (III-b) or (III-c):

(III-a)

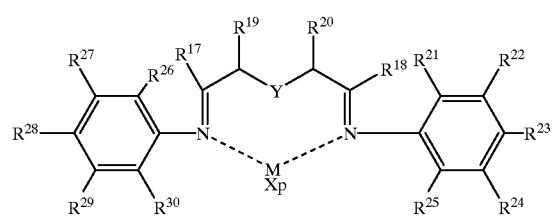

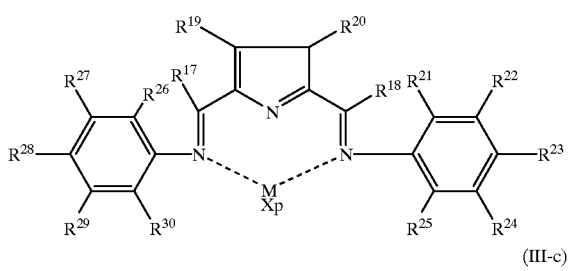

(III-b)

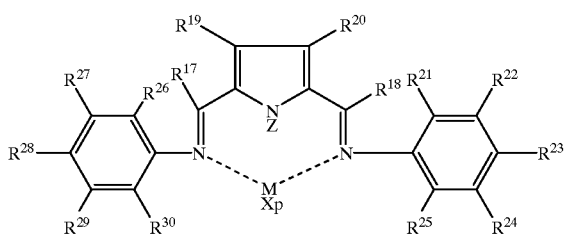

(III-c)

wherein M is a transition metal atom of Group 8 to Group 11 of the periodic table, $R^{17}$ to $R^{20}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group, $R^{17}$ and $R^{19}$ may be bonded to each other to form a ring, and $R^{18}$ and $R^{20}$ may be bonded to each other to form a ring, $R^{21}$ to $R^{30}$ may be the same or different and are each a hydrogen atom, a halogen atom, a hydrocarbon group, a halogenated hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonic acid ester group, a sulfonamido group, a cyano group, a nitro group, a carboxyl group, a sulfonyl group, a mercapto group or a hydroxyl group, at least one of $R^{21}$ to $R^{25}$ is a group other than a hydrogen atom, at least one of $R^{26}$ to $R^{30}$ is a group other than a hydrogen atom, two or more of the groups indicated by $R^{21}$ to $R^{25}$ may be bonded to each other to form a ring, and two or more of the groups indicated by $R^{26}$ to $R^{30}$ may be bonded to each other to form a ring, p is a number satisfying a valence of M, X is a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and when p is 2 or greater, plural groups indicated by X may be the same or different, Y is an atom of Group 15 of the periodic table, and Z is hydrogen atom, a hydrocarbon group or a single bond bonded to the transition metal atom indicated by M.

6. A process for olefin polymerization, comprising polymerizing or copolymerizing an olefin in the presence of the olefin polymerization catalyst as claimed in claim 2.

7. A process for olefin polymerization, comprising polymerizing or copolymerizing an olefin in the presence of the olefin polymerization catalyst as claimed in claim 3.

8. The olefin polymerization catalyst as claimed in claim 5, wherein the transition metal imine compound represented by the formula (I-a) is a transition metal imine compound represented by the following formula (III-a):

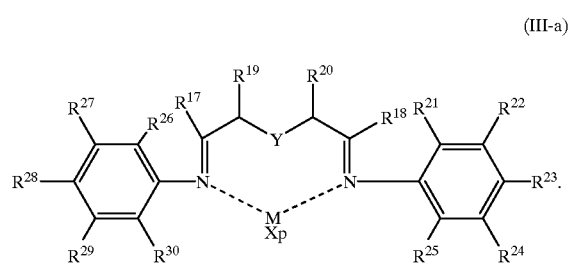

9. The olefin polymerization catalyst as claimed in claim 5, wherein the transition metal imine compound represented by the formula (I-b) is a transition metal imine compound represented by the following formula (III-b):

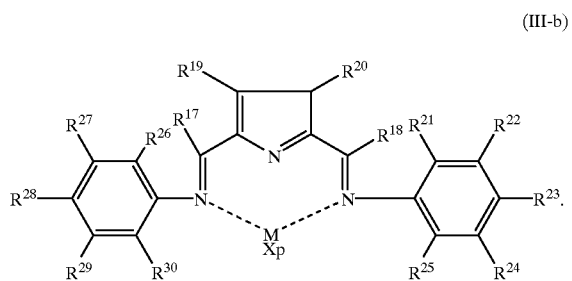

10. The olefin polymerization catalyst as claimed in claim 5, wherein the transition metal imine compound represented by the formula (I-c) is a transition metal imine compound represented by the following formula (III-C):

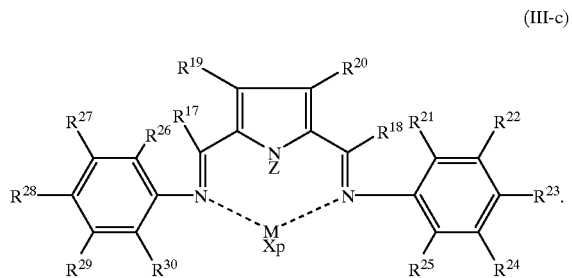

* * * * *